US007609687B2

(12) United States Patent
Kobayashi et al.

(10) Patent No.: US 7,609,687 B2
(45) Date of Patent: Oct. 27, 2009

(54) HOME AGENT APPARATUS, MOBILE ROUTER COMMUNICATION SYSTEM, AND COMMUNICATION METHOD

(75) Inventors: Hirokazu Kobayashi, Kawasaki (JP); Tatsuya Hagiwara, Nara (JP)

(73) Assignee: Panasonic Corporation, Osaka (JP)

( * ) Notice: Subject to any disclaimer, the term of this patent is extended or adjusted under 35 U.S.C. 154(b) by 455 days.

(21) Appl. No.: 11/012,498

(22) Filed: Dec. 15, 2004

(65) Prior Publication Data
US 2005/0128975 A1 Jun. 16, 2005

(30) Foreign Application Priority Data
Dec. 15, 2003 (JP) ............... 2003-416224

(51) Int. Cl.
*H04L 12/66* (2006.01)
*H04L 12/28* (2006.01)
*H04W 40/00* (2009.01)

(52) U.S. Cl. .................. 370/356; 370/397; 370/395.31; 370/351; 455/428; 455/445

(58) Field of Classification Search ................ 370/356, 370/355, 395.52, 401, 238, 392, 397, 395.31; 455/428, 445
See application file for complete search history.

(56) References Cited

U.S. PATENT DOCUMENTS

| | | | |
|---|---|---|---|
| 2003/0095523 A1* | 5/2003 | Korus et al. .................. 370/338 |
| 2003/0117965 A1* | 6/2003 | Markki et al. ................ 370/254 |
| 2005/0053054 A1* | 3/2005 | Das et al. ..................... 370/352 |

FOREIGN PATENT DOCUMENTS

| | | |
|---|---|---|
| EP | 1 011 245 A1 | 6/2000 |
| JP | 2000-031944 | 1/2000 |

OTHER PUBLICATIONS

"Mobile IP", 1994-2006 China Academic Journal Electronic Publishing House (with English translation).
"Mobility Support In IPv6 draft-ietf-mobileip-ipv6-22.txt", IETF Mobile IP Working Group, Internet- Draft, D. Johnson, C. Perkins, J. Arkko, May 26, 2003.
"IPv6 Textbook", Hiroshi Ezaki, Editor, IDG Japan Publishing, Sep. 20, 2002, pp. 84-86 (w/English translation).

* cited by examiner

*Primary Examiner*—Nick Corsaro
*Assistant Examiner*—Shannon R Brooks
(74) *Attorney, Agent, or Firm*—RatnerPrestia

(57) ABSTRACT

A mobile router notifies a care-of address to a home agent apparatus, and generates a tunnel for local scope packet transmission between it and the home agent apparatus, and thereby, even if a terminal device moved onto a foreign link, communication becomes available in the same manner as on a home link. In addition, the home agent apparatus and the mobile router carry out transfer only to a necessary destination, by use of information of the terminal device which is accommodated in itself. Further, the home agent apparatus manages information of the terminal device which is accommodated in the mobile router, and thereby, it is possible to carry out packet communication only to the terminal device which corresponded to a destination, and it becomes possible to reduce useless transmission processing and reception processing in a network.

16 Claims, 29 Drawing Sheets

Fig.3

| HOME ADDRESS OF MOBILE ROUTER | CARE-OF ADDRESS OF MOBILE ROUTER | SEQUENCE NUMBER | LIFETIME (TU) |
|---|---|---|---|
| 3ffe::1:280:45ff:fe18:e205 | 3ffe::7:280:45ff:fe18:e205 | 32 | 255 |
| 3ffe::1:280:45ff:fe18:e250 | 3ffe:381:5a:1:280:45ff:fe18:e250 | 2 | 33875 |
| 3ffe::1:207:e9ff:fe0d:6d45 | 3ffe::86aa:207:e9ff:fe0d:6d45 | 50 | 2 |
| 3ffe::1:200:86ff:fe47:b3cf | 3ffe:925:2:1:200:86ff:fe47:b3cf | 1 | 63221 |

| HOME ADDRESS OF MOBILE ROUTER | CARE-OF ADDRESS OF MOBILE ROUTER | ADDRESS OF HOME AGENT | LIFETIME (TU) |
|---|---|---|---|
| 3ffe::1:280:45ff:fe18:e205 | 3ffe::7:280:45ff:fe18:e205 | 3ffe::1:280:45ff:fe32:5507 | 255 |

| HOME ADDRESS OF MOBILE ROUTER 701 | TERMINAL DEVICE ADDRESS 702 |
|---|---|
| 3ffe::1:280:45ff:fe18:e205 | fe80::207:21ff:fe33:9864 |
| | fe80::280:45ff:fe18:e435 |
| 3ffe::1:207:e9ff:fe0d:6d45 | fe80::207:e9ff:fe0d:2241 |
| 3ffe::1:200:86ff:fe47:b3cf | fe80::203:a6ff:fe15:ae3c |

Fig.9

| TERMINAL DEVICE ADDRESS |
|---|
| fe80::207:21ff:feaa:8625 |
| fe80::280:77ff:fe10:1250 |
| fe80::207:e9ff:fe0d:2243 |
| fe80::203:a6ff:fe15:ae41 |

901

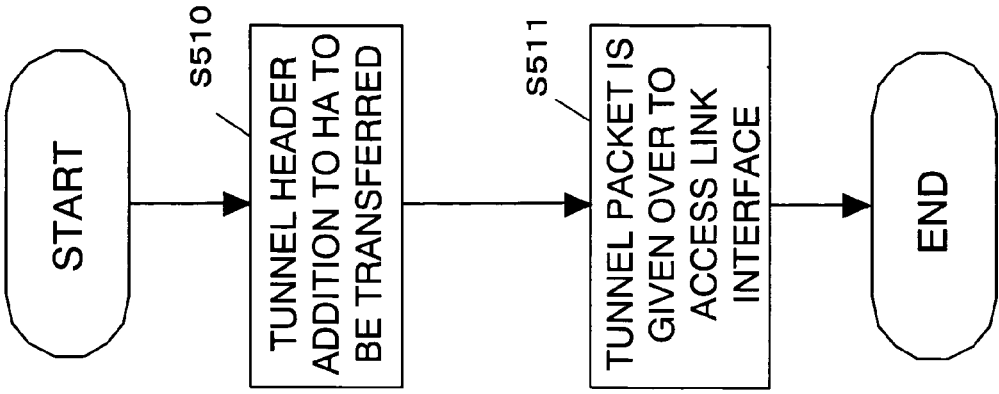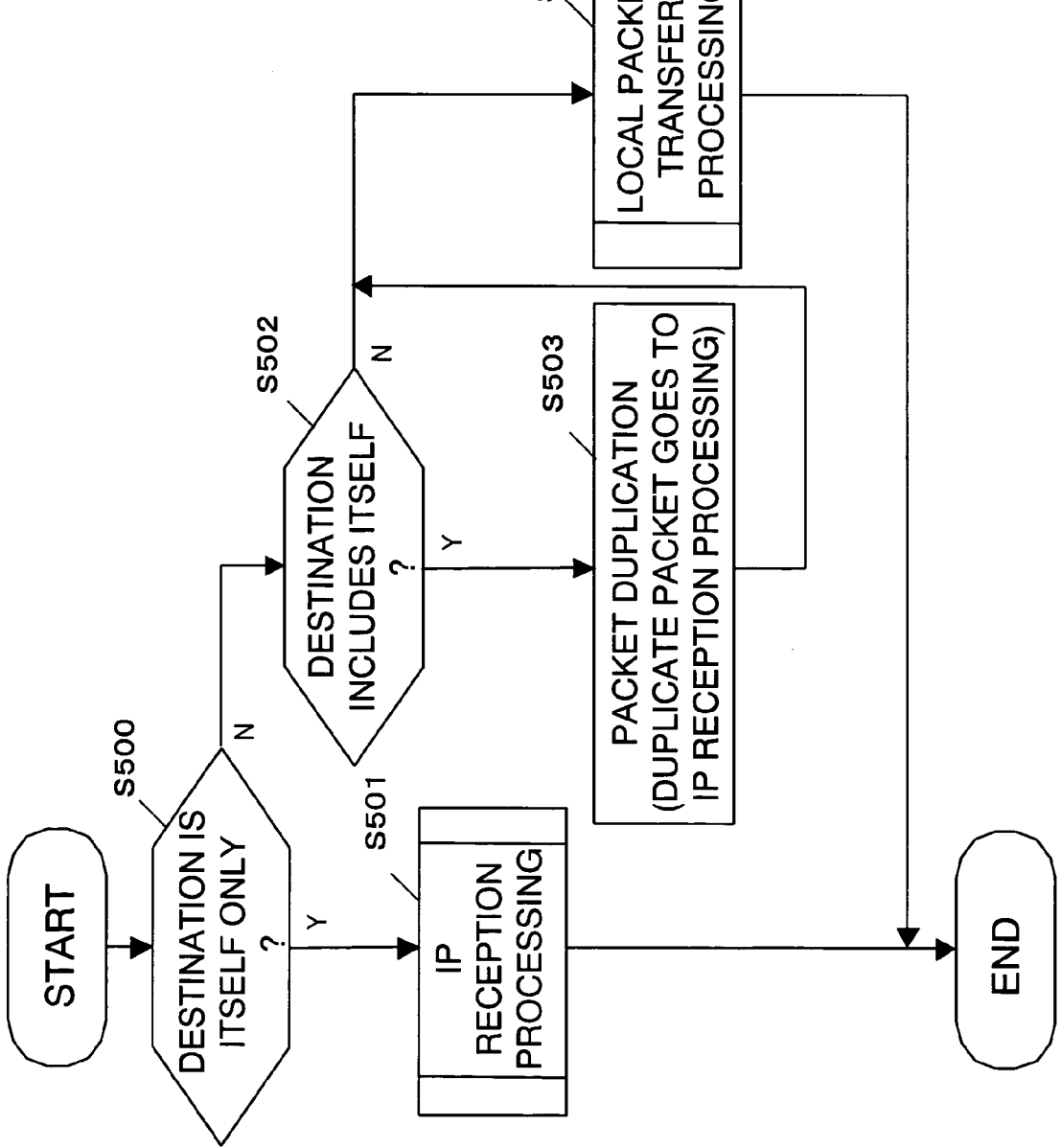

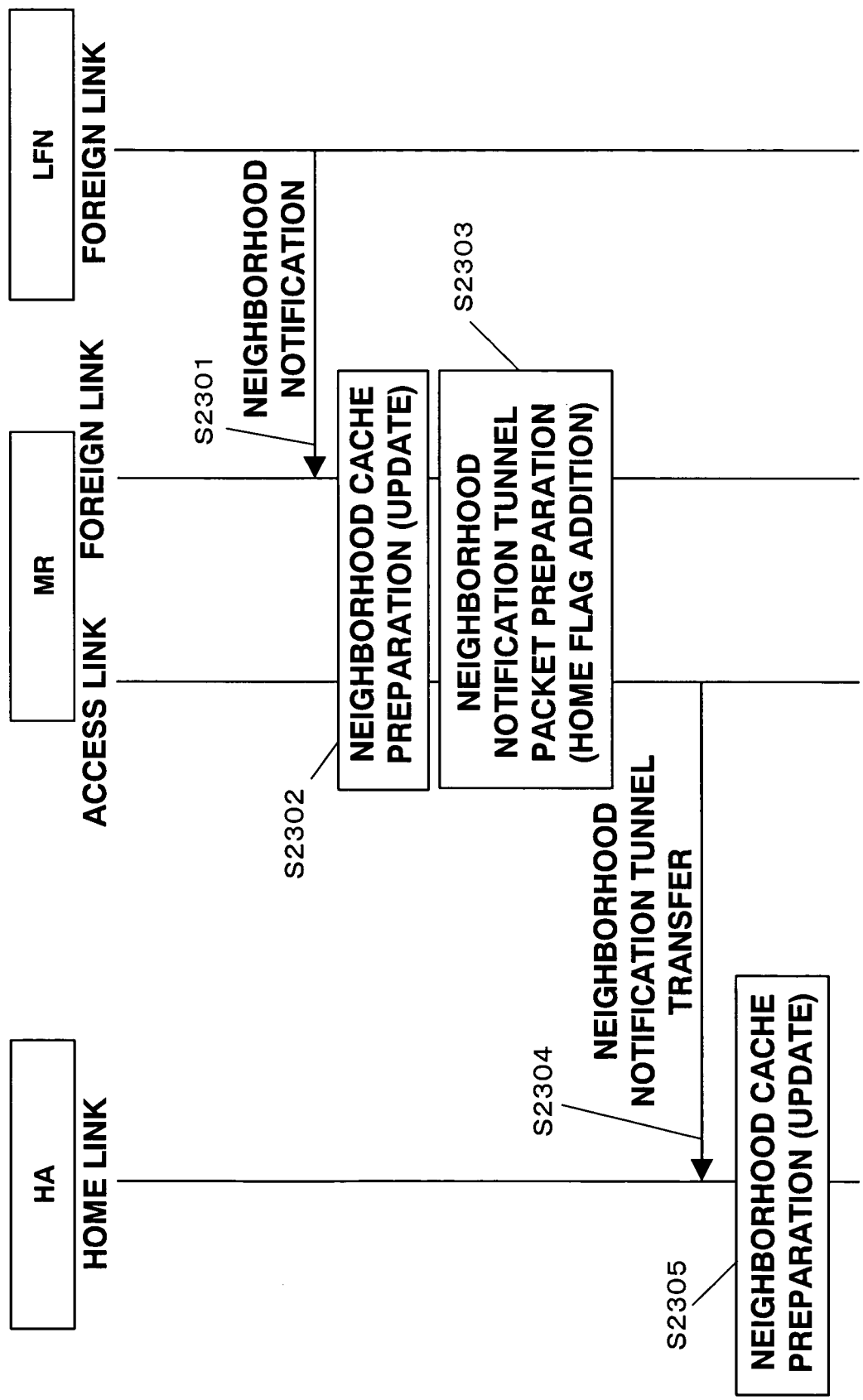

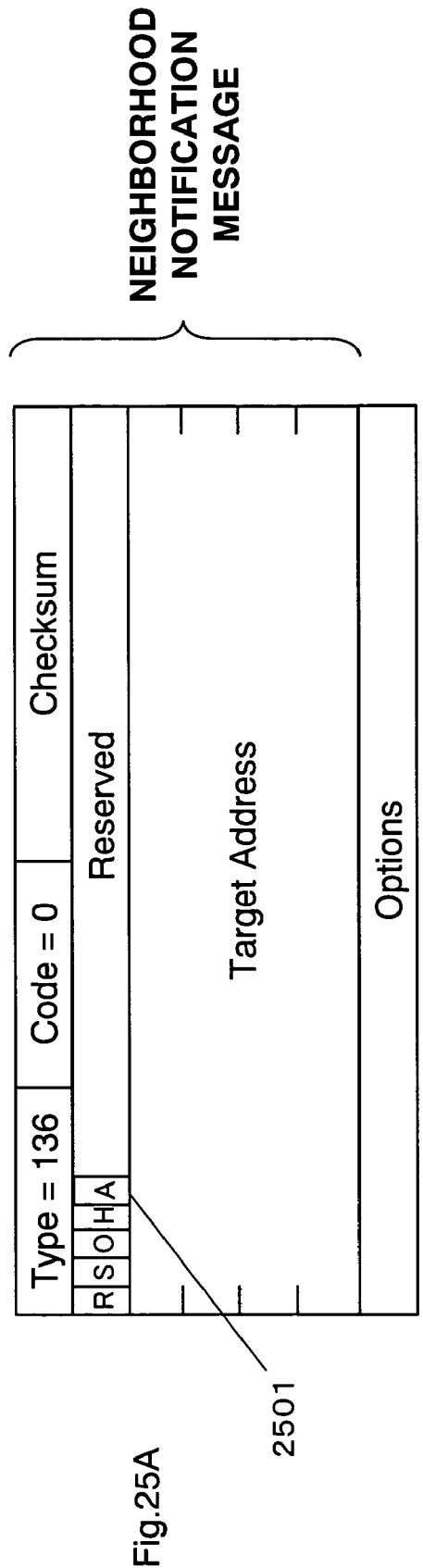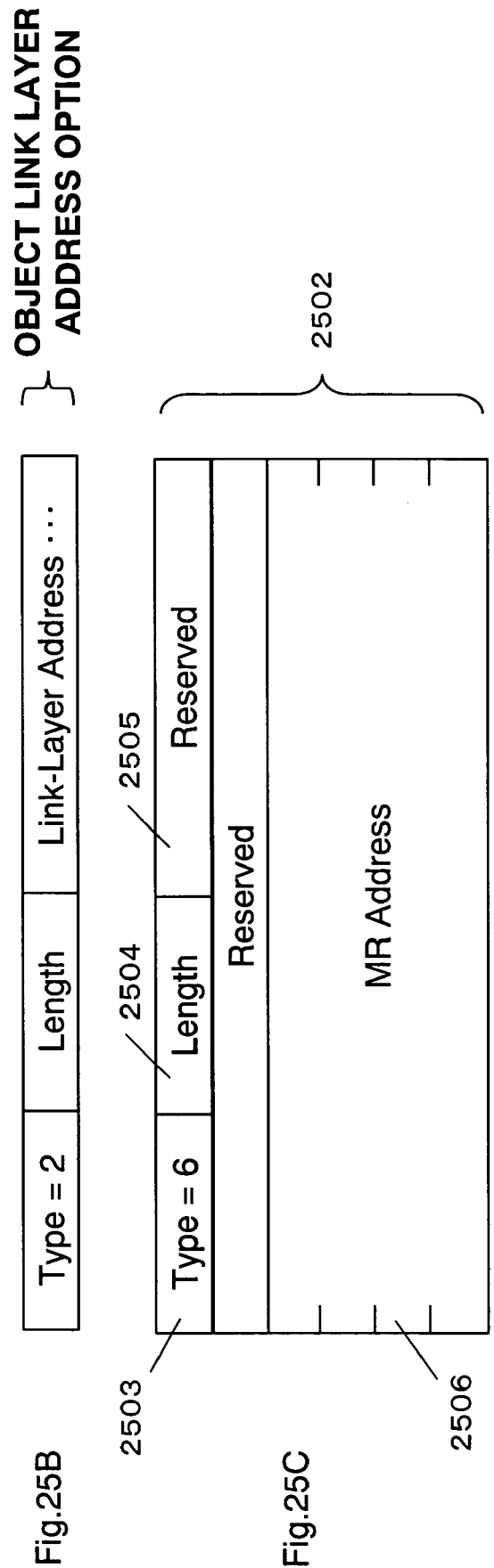
Fig.25A Fig.25B Fig.25C

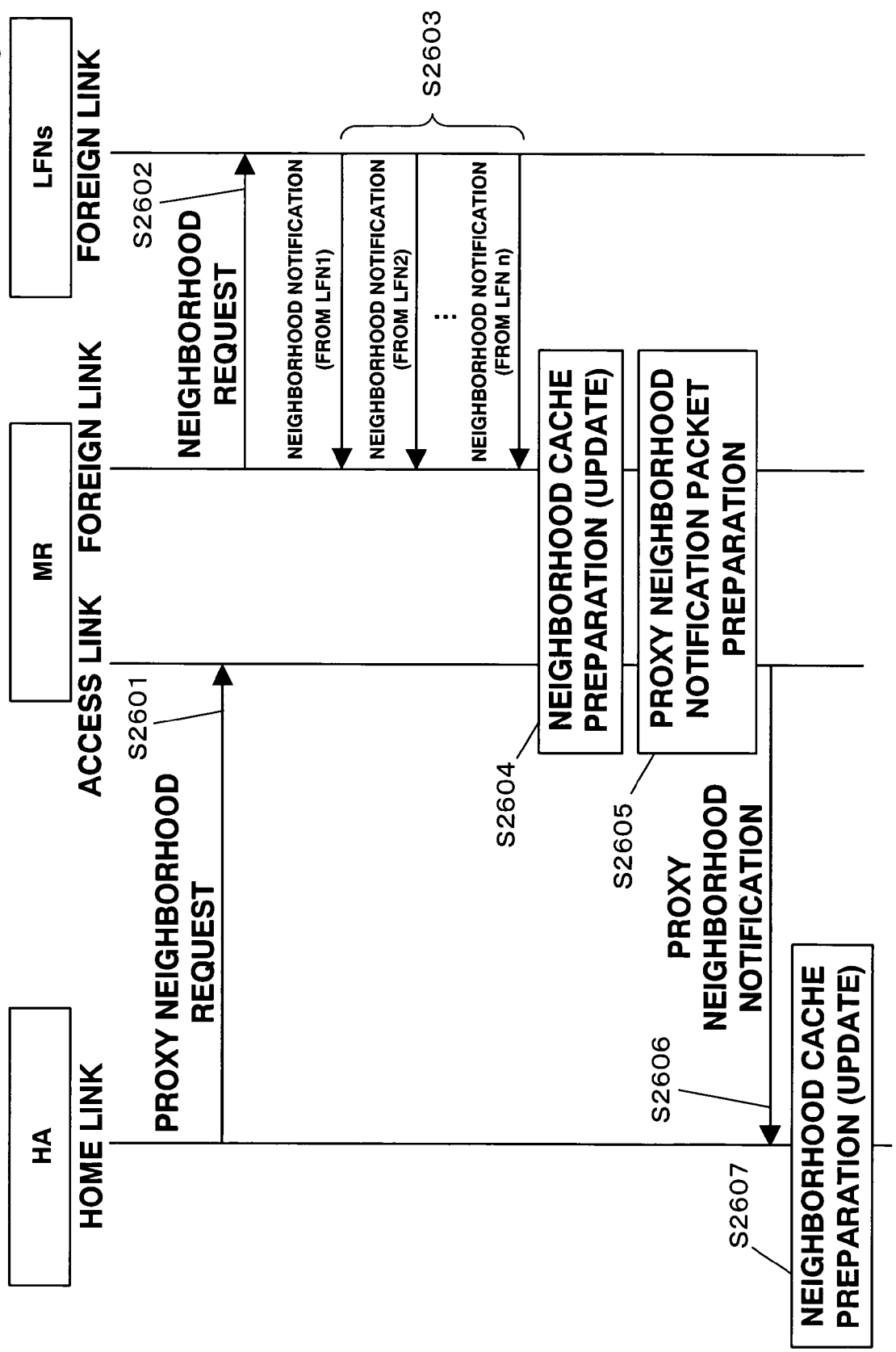

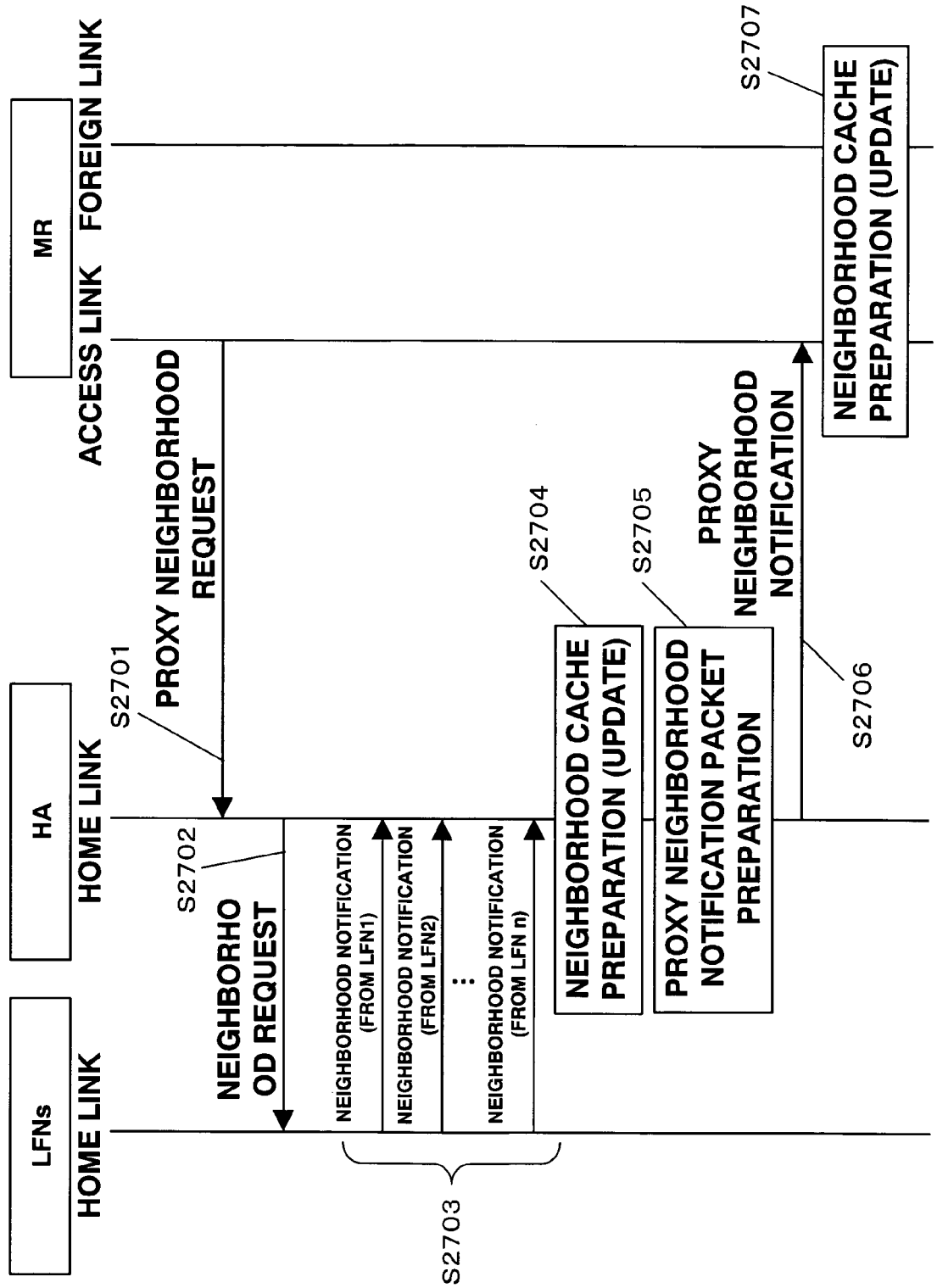

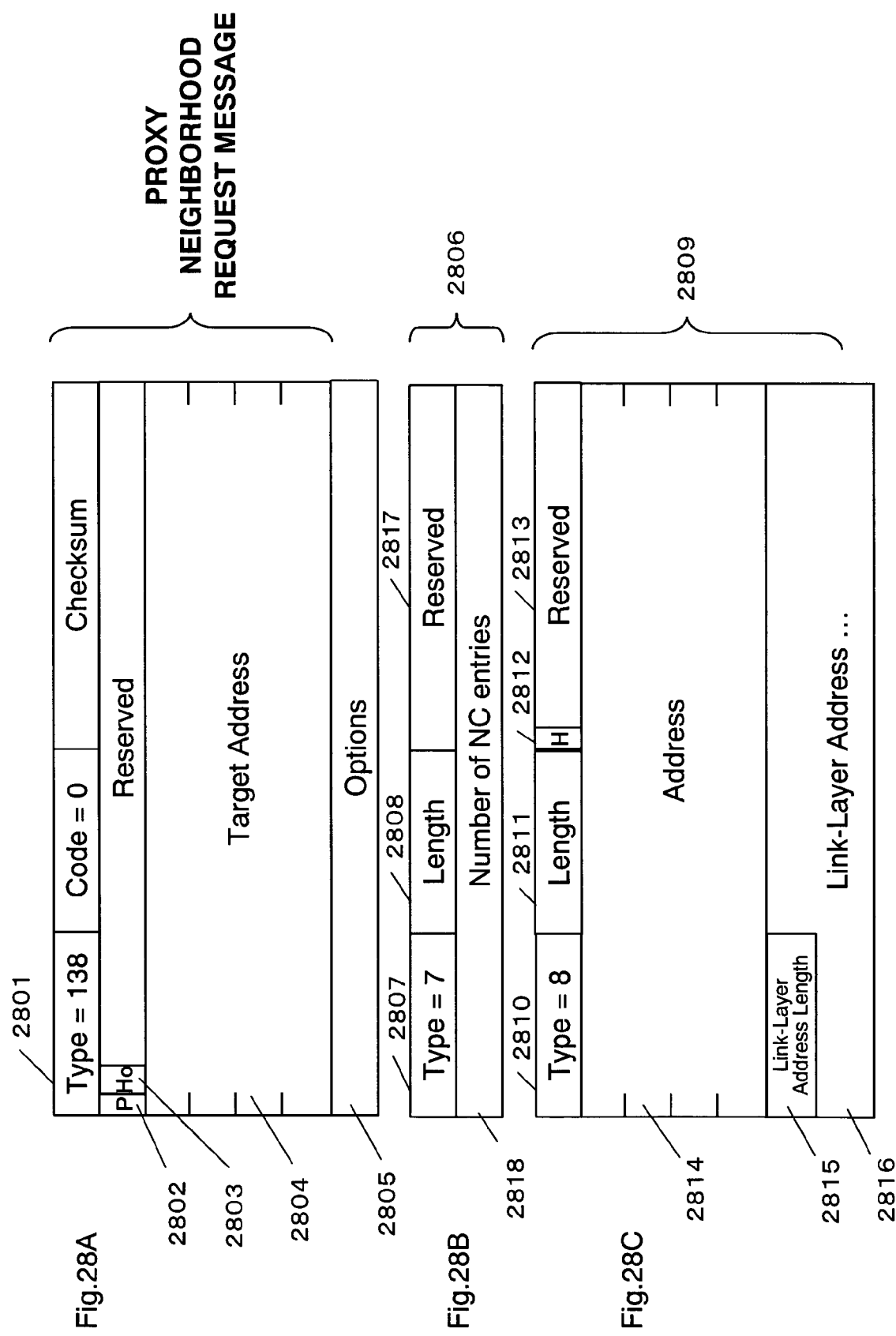

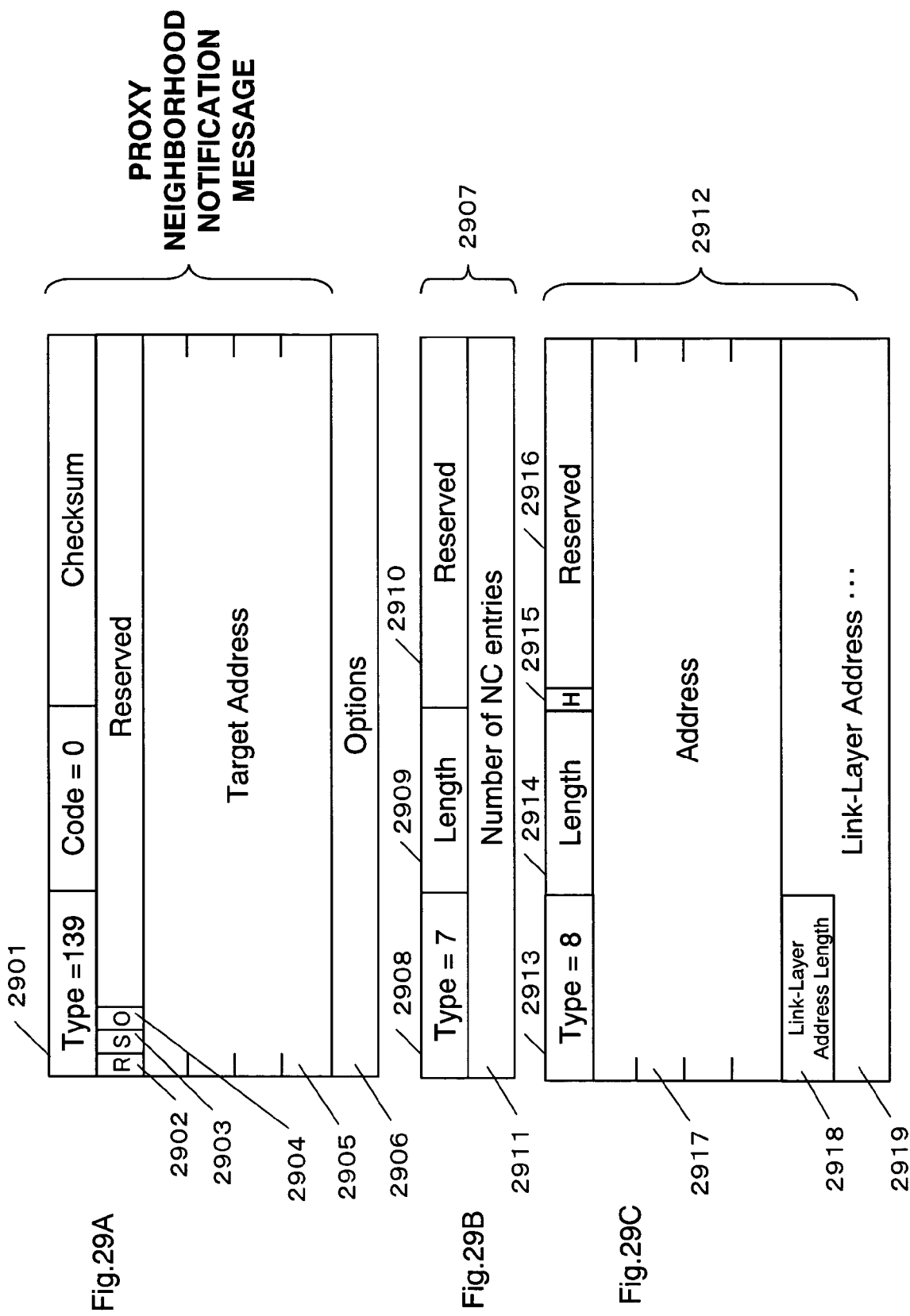

HOME AGENT APPARATUS, MOBILE ROUTER COMMUNICATION SYSTEM, AND COMMUNICATION METHOD

FIELD OF THE INVENTION

This invention relates to a mobile communication system which was designed in such a manner that mobile terminal devices can communicate with each other through a communication network such as Internet, and relates to a home agent apparatus, a mobile router, a communication system, and a communication method, which relate to a mobile communication system which was designed in such a manner that a terminal device, which belongs in a specific network, can communicate as if it exists in that network, even after it moved to outside of the specific network.

BACKGROUND OF THE INVENTION

In the past, such a structure that, even in case that one of two computers, which are connected to one sub-network and communicate with each other, was moved to a different sub-network, these computers can communicate with each other, has been devised. As one example thereof, Internet protocol Mobile IP has been known, which is as described in IETF draft "draft-ietf-mobileip-ipv6-22.txt" and literature "Ipv6 Textbook" (under the editorship of Hiroshi EZAKI, IDG Japan publishing, Sep. 20, 2002, p84-86).

In addition, tried is realization of a mobile computer system which can communicate with a computer in a sub-network at home, or a computer in another network, by use of simple communication procedures, without changing parameters etc. of network environment at all, by connecting a computer which is connected to a sub-network at home and uses normal IP, to a remote network. As this example, there is a thing as described in JP-A-10-23076 publication. This is such a thing that, in order to enable a computer which was moved to another sub-network to be used in parameters of the same network environment as one which was connected to a sub-network at home, a special router, which is called as a VPN (Virtual Private Network) router, is disposed in advance, in another sub-network. It is designed that, by this means, (1) certification of a mobile computer and establishment of connection to a home sub-network, (2) accommodation of a mobile computer by use of address resolution protocol, are carried out, and then, (3) communication with a computer in a home sub-network, or (4) communication with a computer other than that in the home sub-network, is carried out.

In addition, there is also a system which was designed in such a manner that VPN setup service according to IP Sec tunnel between arbitrary terminals is provided, coordinating with location registration procedure in mobile IP, without giving a special function for VPN. In this system, it is composed of a mobile terminal device, a certificate server, a VPN database, and a network device, and a home certificate server extract VPN information of a user who requested certification at the time of requesting for location registration from the mobile terminal device, from the VPN database, and notifies the VPN information to each network device by use of predetermined location registration message and certification response message. The network device is designed to setup VPN paths according to IPSec, between a home network device and an external network device, between the home network device and a predetermined network device, and/or between the external network device and the predetermined network device, respectively, on the basis of the notified VPN information.

However, in the method as shown in the IETF draft "draft-ietf-mobileip-ipv6-22.txt" and the literature "Ipv6 Textbook" p84-86, there is a necessity to implement unique protocol to all terminal devices to be used, and therefore, there is such a problem that it can not be used in the conventional mobile terminal device.

In addition, in the communication system as shown in JP-A-10-23076 publication and JP-A-2002-44141 publication, it has such a problem that there is a necessity to have a terminal device executed a specific procedure at a destination.

The invention is made so as to solve the above-described conventional problem, and aims to provide a mobile communication system which can make the same communication as that before movement, even after it was moved, without disposing a special structure in a terminal device.

SUMMARY OF THE INVENTION

A home agent apparatus, which relates to the invention, has a mobile router movement management section which manages a location of a mobile router which accommodates a terminal device away from a home network, which is connected to an external network, a tunnel packet processing section which uncapsulates a tunnel packet received, and sends out the packet from an interface which is connected to a home link in case that a destination of the packet is a local scope, and a local packet transfer processing section which, in case that a destination of a non-tunnel packet received by the interface which is connected to the home link is the local scope, and has a destination other than that of a home agent apparatus itself, the non-tunnel packet is encapsulated to a tunnel packet addressed to a mobile router and then, transmitted.

In addition, the home agent apparatus, which relates to the invention, further has a terminal device management section which manages, in which mobile router, a terminal device is accommodated, and the local packet transfer processing section encapsulates the non-tunnel packet to a tunnel packet addressed to a relevant mobile router, in case that it was detected by the terminal device management section that a terminal device as a destination of the non-tunnel packet is accommodated in some kind of a mobile router.

In addition, the local packet transfer processing section of the home agent apparatus which relates to the invention encapsulates the uncapsulated packet to a tunnel packet addressed to a mobile router other than a mobile router which is managed by the mobile router movement management section and is a transmission source of the packet, and then, transmits it.

In addition, the home agent apparatus, which relates to the invention, further has a terminal device management section which manages, in which mobile router, a terminal device is accommodated, and only in case of a terminal device which is accommodated in some kind of a mobile router which is managed by the terminal device management section, the local packet transfer processing section encapsulates the uncapsulated packet to a tunnel packet addressed to a mobile router other than a transmission source mobile router, and then, transmits it.

In addition, the home agent apparatus, which relates to the invention, further has a terminal device management section which manages, in which mobile router, a terminal device is accommodated, and in case that a terminal device as a destination of the uncapsulated packet is accommodated in a mobile router other than the transmission source mobile router, which is managed by the mobile router management section, the local packet transfer processing section encapsulates the uncapsulated packet to a tunnel packet addressed to a mobile router which accommodates a terminal device as a destination, and then, transmits it.

A mobile router, which relates to the invention, has a packet inspection section which has a first interface for accommodating at least one terminal device, and a second interface for connecting with Internet, and can carry out communication over moving on Internet, or between access networks for connecting with Internet, and judges, from which of the two interfaces, a packet was received, a tunnel packet processing section which uncapsulates a tunnel packet which was received from the second interface, and transmits it to a terminal device which is accommodated, in case that a destination of the packet is a local scope, and a local packet transfer processing section which, in case that a transmission source of a received packet which received from the first interface is a terminal device which is accommodated, and a destination is the local scope, and when a mobile router itself is not connected to a home link, encapsulates the received packet to a tunnel packet, and then, transmit it to a home agent apparatus in which a home address of the mobile router itself is registered.

In addition, a mobile router, which relates to the invention, has a section which manages whether a terminal device is accommodated in the mobile router itself or in a home link, and a unit adapted to generate and transmit a tunnel packet to a home agent apparatus in which the mobile router itself registers a home address, only in case that a terminal device which becomes a destination of a packet addressed to a local scope is connected to the home link.

In addition, a mobile router, which relates to the invention, has an accommodated terminal management section which manages a terminal device which is accommodated in the mobile router itself, and in case that a destination of a packet, which was received from a terminal device which is being managed, is the local scope, and a terminal device which is not accommodated in the mobile router itself is included in a destination, the local packet transfer processing section encapsulates the received packet to a tunnel packet addressed to a home agent device in which a home address of the mobile router itself is registered, and transmits it.

In addition, a mobile router, which relates to the invention, has an accommodated terminal management section which manages a terminal device which is accommodated in the mobile router itself, and in case that a destination of a packet which was uncapsulated is the local scope, and includes a terminal device which is being accommodated, the tunnel packet processing section transmits the uncapsulated packet to a terminal device which is accommodated.

A communication system, which relates to the invention, has a gateway device for connecting Internet and a home network, at least one access router for connecting Internet with an external network, at least one terminal device, a home agent apparatus which relates to the invention, and a mobile router which relates to the invention.

A communication method, which relates to the invention, has, in a communication method between either a terminal device on a home network or a home agent apparatus, and either a terminal device on an external network or a mobile router, a step in which a home agent apparatus changes a packet addressed to a local scope which is generated on a home network, to a tunnel packet addressed to a mobile router, and then, transmits it to the mobile router, and a step in which the mobile router uncapsulates the tunnel packet received, and transmits the uncapsulated packet addressed to a local scope, to a terminal device on the external network.

In addition, a communication method, which relates to the invention, has, in a communication method between either a terminal device on a home network or a home agent apparatus, and either a terminal device on an external network or a mobile router, a step in which the home agent apparatus, in case that a destination of a local scope packet which is generated on the home network includes some kind of a terminal device which is connected to the external network or some kind of a mobile router, encapsulates the local scope packet to a tunnel packet addressed to the mobile router, and then, transmits it, and a step in which the mobile router uncapsulates the tunnel packet, and transmits the packet to a terminal device on the external network, in case that a destination of the uncapsulated local scope packet is a terminal device.

In addition, a communication method, which relates to the invention, has, in a communication method between either a terminal device on a home network or a home agent apparatus, and either a terminal device on an external network or a mobile router, a step in which the home agent apparatus, in case that a destination of a local scope packet which is generated on the home network includes a terminal device which is connected to the external network or the mobile router, encapsulates the local scope packet to a tunnel packet addressed to a mobile router in which a terminal device, which becomes a destination, is accommodated, or to a mobile router which becomes a destination, and transmits it to the mobile router, and a step in which the mobile router transmits a packet to a terminal device on the external network, in case that a tunnel packet received is uncapsulated, and a destination of a local packet uncapsulated is a terminal device.

In addition, a communication method, which relates to the invention, has, in a communication method between either a terminal device on a home network or a home agent apparatus, and either a terminal device on an external network or a mobile router, a step in which the mobile router encapsulates a packet addressed to a local scope which is generated on the external network, and then, transmits it to the home agent apparatus, and a step in which the home agent apparatus uncapsulates the tunnel packet received, and transmits a uncapsulated packet addressed to the local scope to a terminal device on the home network.

In addition, a communication method, which relates to the invention, has, in a communication method between either a terminal device on a home network or a home agent apparatus, and either a terminal device on an external network or a mobile router, a step in which the mobile router, in case that a packet addressed to a local scope which is generated on the external network includes one other than a terminal device on the external network, encapsulates it to a tunnel packet addressed to the home agent apparatus, and then, transmits it, and a step in which the home agent apparatus uncapsulates the received tunnel packet, and transmits a uncapsulated packet addressed to the local scope to a terminal device on the home network.

In addition, a communication method, which relates to the invention, has, in a communication method between either a terminal device on a home network or a home agent apparatus, and either a plurality of terminal devices on an external network or a mobile router, a step in which a first mobile router encapsulates a packet addressed to a local scope which is generated on a first external network to a tunnel packet addressed to the home agent apparatus, and then, transmits it, and a step in which the home agent apparatus uncapsulates the received tunnel packet, and transmits a uncapsulated packet addressed to the local scope to a terminal device on the home network, and further, encapsulates the uncapsulated packet addressed to the local scope, to a tunnel packet addressed to a mobile router which is different from the first mobile router, and then, transmits it.

In addition, a communication method, which relates to the invention, has, in a communication method between either a terminal device on a home network or a home agent apparatus, and either a terminal device on an external network or a mobile router, a step in which a mobile router generates a tunnel packet to the home agent apparatus and transmits it to the home agent apparatus, in case that a destination of a packet addressed to a local scope which is generated on the external network includes a terminal device or the home agent apparatus which is connected on the home network, and a step in which the home agent apparatus uncapsulates a tunnel packet, and transmits it to a terminal device on the home network, in case that a destination of the uncapsulated packet addressed to the local scope is a terminal device.

In addition, a communication method, which relates to the invention, has, in a communication method between either a terminal device on a home network or a home agent apparatus, and either a terminal device on an external network or a mobile router, a step in which the mobile router, in case that a destination of a local scope packet which is generated on the external network includes a terminal device which is not accommodated in the mobile router itself, encapsulates the packet to a tunnel packet addressed to the home agent apparatus, and transmits it to the home agent apparatus, and a step in which the home agent apparatus uncapsulates the received tunnel packet, and in case that a destination of the uncapsulated packet addressed to the local scope includes a terminal device which is connected on the home network, transmits the uncapsulated packet to a terminal on the home network, and in case that the destination includes a mobile router which is different from a transmission source of a tunnel packet or a terminal device which is accommodated in the mobile router, encapsulates it to a tunnel packet addressed to a mobile router which is different from the transmission source, and then, transmits it.

BRIEF DESCRIPTION OF THE DRAWINGS

The invention, together with further advantages thereof, may best be understood by reference to the following description taken in conjunction with the accompanying drawings in which:

FIG. 3 is a view which shows one example of a mobile router movement management table which is used in the first exemplary embodiment of the invention;

FIG. 5 is a view which shows one example of a tunnel header table which is used in the first exemplary embodiment of the invention;

FIG. 7 is a view which shows one example of a terminal device management table which is used in the second exemplary embodiment of the invention;

FIG. 9 is a view which shows one example of accommodated terminal table which is used in the second exemplary embodiment of the invention;

FIGS. 15A, B are flow charts of processing procedures in the first exemplary embodiment of the invention;

FIG. 23 is a view of a communication procedure for neighbor discovery in a third exemplary embodiment of the invention;

FIGS. 25A,B,C are the neighbor advertisement message formats which are used in the third exemplary embodiment of the invention;

FIG. 26 is a view of a communication procedure for proxy neighbor discovery in the third exemplary embodiment of the invention;

FIG. 27 is a view of a different communication procedure for proxy neighbor discovery in the third exemplary embodiment of the invention;

FIGS. 28A,B,C are the proxy neighbor solicitation message formats which are used in the third exemplary embodiment of the invention; and FIGS. 29A,B,C are the proxy neighbor solicitation message formats which are used in the third exemplary embodiment of the invention.

DESCRIPTION OF THE PREFERRED EMBODIMENTS

Hereinafter, embodiments of a home agent apparatus, a mobile router, a communication system, and a communication method of the invention will be described with reference to the drawings. Meanwhile, in the following description of each embodiment, same numbers are given to same constituent elements.

1st Exemplary Embodiment

Figure 1:
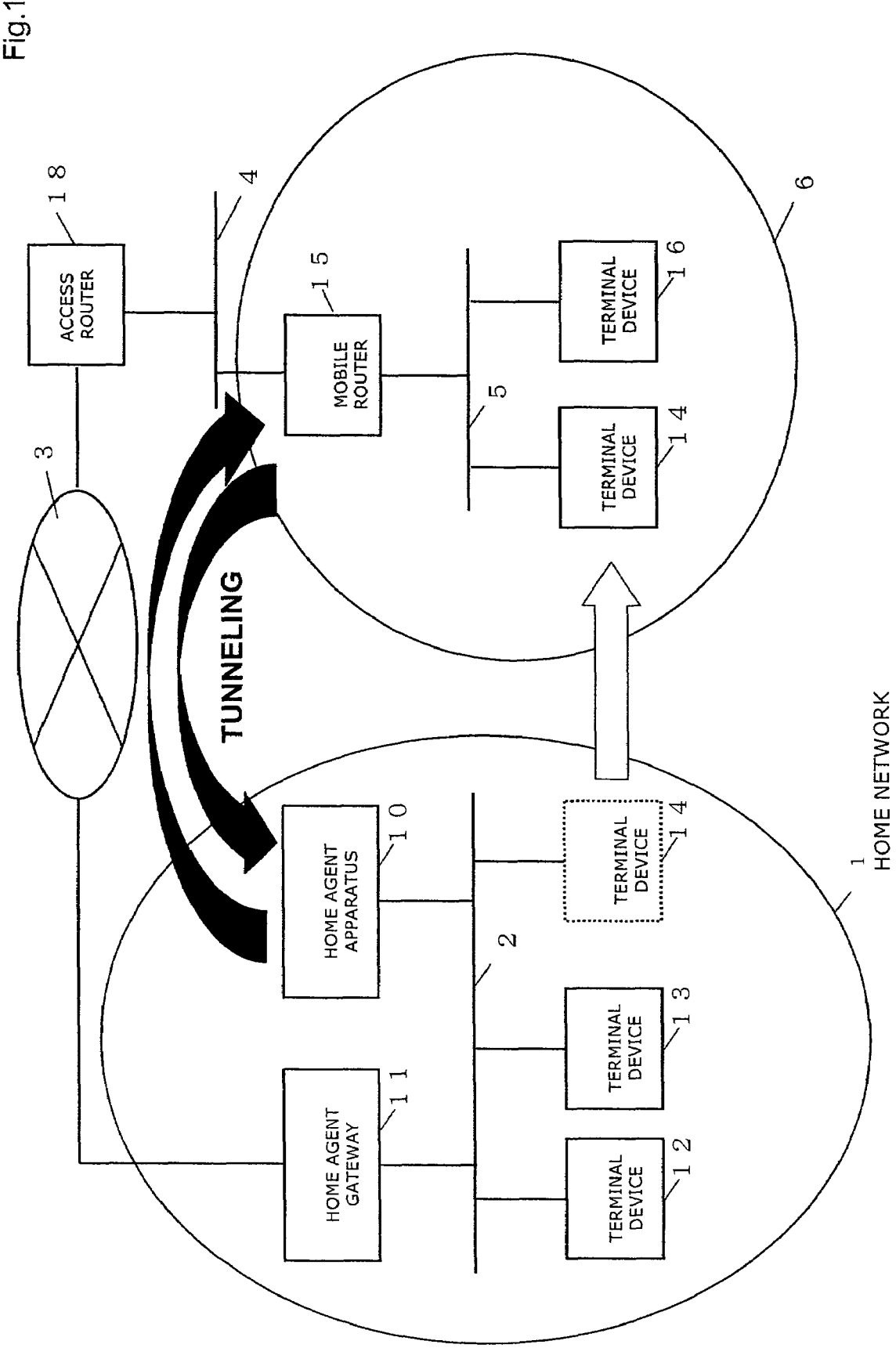
FIG. 1 is a network block diagram in a first exemplary embodiment of the invention.

FIG. 1 is a view of one example of a network configuration to which a mobile communication system of the invention was applied. In FIG. 1, a home network 1 is a sub-network in which a home agent apparatus 10 and terminal devices 12, 13 were coupled to a home link 2. The home network 1 is coupled to Internet 3 through a home gateway 11. An external network 6 is a network in which a mobile router 15 and terminal devices 14, 16 were coupled to a foreign link 5, and is an external network which related to the home link 2. The external network 6 is coupled to an access link 4 through a mobile router 15. The access link 4 is coupled to Internet 3 through an access router 18. The access link 4 is one sub-network in an Internet network.

The terminal device 14 was coupled to the home link 2 at first, as shown by a dotted line, but it shows such a state that it was moved and connected to the foreign link 5.

The home agent apparatus 10 and the mobile router 15 support Mobile Ipv6. In addition, each terminal device 14, 16, which exists under the mobile router 15, is to be of a relation of neighbor (within 1 hop) each other, including a mobile router.

In an IP address which shows a transmission source and a destination of communication, there are two kinds of scopes, i.e., a global scope and a local scope. A global address of the global scope is an IP address in case of widely communicating through a network such as Internet. A local address of the local scope is an IP address which is locally used, limiting in a specific network such as a home link 2.

These global scope address and local scope address are composed of 128 bits in an Ipv6 address system, and generated from one generally called as a prefix, and MAC address which is a data link layer address of an interface. In general, high-order 64 bits becomes the prefix. The prefix is obtained from a router which is positioned at an upper level, in case of the global address. On one hand, in case of the link local address, it is determined as bit train (fe80::). Meanwhile, (::) shows that a bit train is all 0. In general, a low-order bit train, which is composed of 64 bits, is called as interface ID, and generated by converting into 64 bits from a 48 bit MAC address which is assigned to each equipment or an interface of each equipment, on the basis of a predetermined rule. In addition, in Ipv6, a specific local multicast address is determined, and for example, (ff01::1), (ff02::1), (ff01::2), (ff02::2) etc. are cited. In this embodiment, as the local scope address, these local addresses are adopted.

The home agent apparatus 10 has both of the global address and the local address. On the home link 2, the terminal devices 12, 13, 14 and the home agent apparatus 10 can communicate with each other by use of the local address. In this case, as a transmission source address and a destination address, local addresses are used. In addition, the terminal devices 12, 13, 14 and the home agent apparatus 10 can communicate through the home gateway 11, to a node outside the home link, in case that a global address of the other party is known. In this case, global addresses are used for the transmission source address and the destination address.

In the invention, it enables the terminal device 14 to be able to communicate with each terminal device 12, 13 which is connected to the home link 2 and the home agent apparatus 10, by use of a local address which was used until then, without applying special treatment to a terminal device, even in case that it was moved from the home link 2 to the foreign link 5.

On this account, the mobile router 15 is prepared for the purpose of establishing the external network 6 which is used by the terminal device 14. This mobile router 15 is disposed in advance at an outside spot where the terminal device 14 is desired to be used, or a user of the terminal device uses the mobile router 15 over moving with it. To the mobile router 15, a global address is given, under the access link 4. In addition, between an equipment and a device on the foreign link 5, communication is carried out by use of a local address which is similar to a local address which is used in a home link 2. Meanwhile, a global scope address in case that the mobile router 15 and the terminal device 14 are located on the home link 2, or in case that it was assumed to be seated is called as a home address (HoA).

Meanwhile, in this embodiment, as a home link interface of the home agent apparatus, and a foreign link interface of the mobile router, or the access link interface, it is possible to use various wireless communication systems such as well-known IEEE802.11, IEEE802.11a, IEEE802.11b, IEEE802.11e, IEEE802.11g, IEEE802.15, Bluetooth, and UWB, and various wired communication system such as Ethernet, IEEE1394, USB, and USB2.0.

Hereinafter, the home agent apparatus (HA) will be described.

Figure 2:
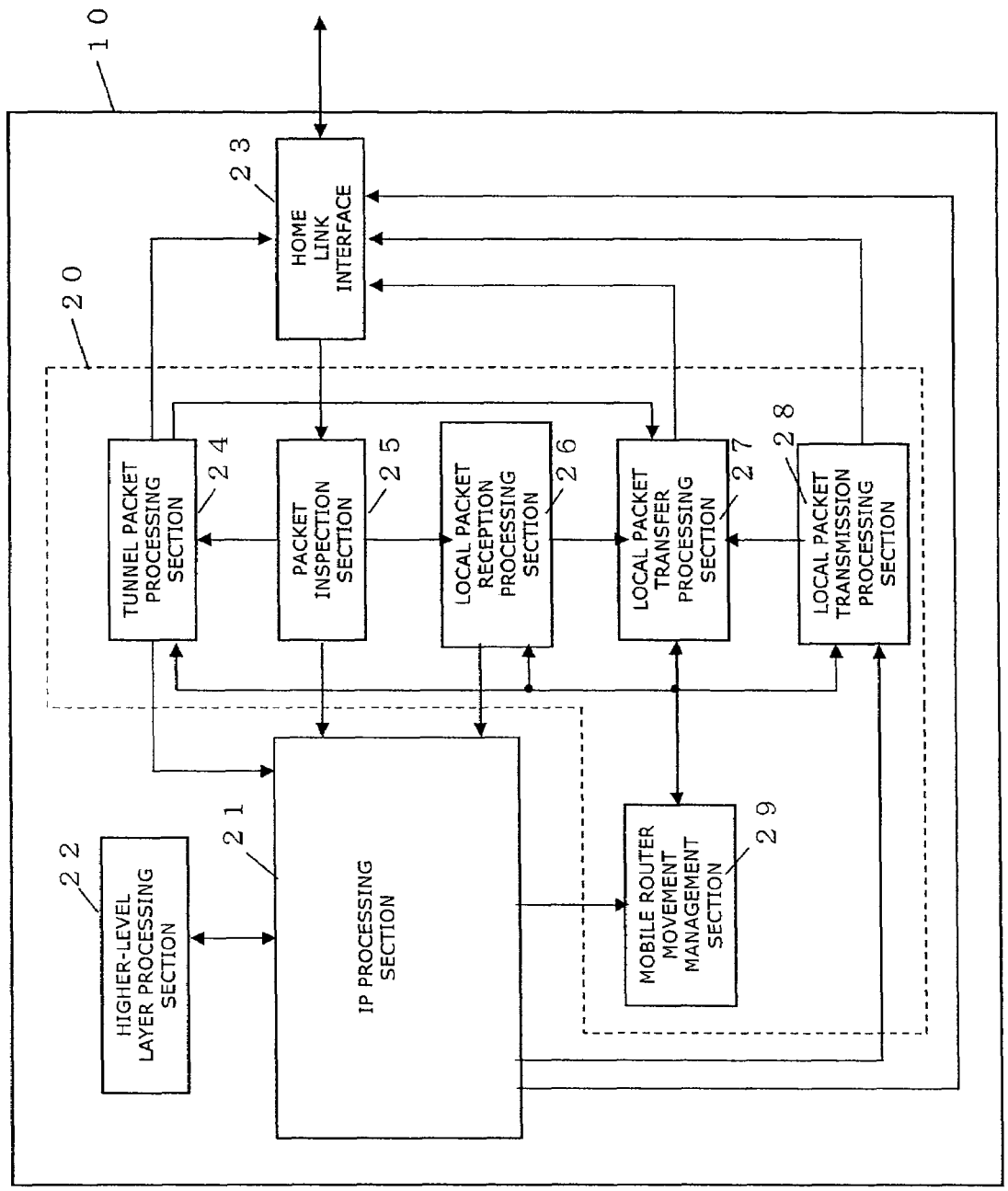
FIG. 2 is a block diagram of a home agent apparatus in the first exemplary embodiment of the invention.

FIG. 2 is a thing which shows a configuration of the home agent apparatus (HA) 10.

In FIG. 2, the home agent apparatus 10 has a local scope processing section 20, an IP processing section 21, a higher-level layer processing section 22, and a home link interface 23. The local scope processing section 20 has a tunnel packet processing section 24, a packet inspection section 25, a local packet reception processing section 26, a local packet transfer processing section 27, a local packet transmission processing section 28, and a mobile router movement management section 29.

The higher-level layer processing section 22 carries out processing of a higher-level (transport layer/session layer/presentation layer/application layer) than a network layer.

The IP processing section 21 carries out network layer processing. Concretely speaking, the IP processing section 21 carries out reception processing to a packet which was received from the packet inspection section 25 or the local packet reception processing section 26 or the tunnel packet processing section 24, and processing for adding an IP header to transmission data which was received from the high-level layer processing section 22 to generate a packet. Further, the IP processing section 21 carries out processing for judging a scope of a destination IP address, and giving it over to the local packet transmission processing section 28, in case of a local scope destination, and processing for giving it over to the home link interface 23 in case of a global scope address. In addition, the IP processing section 21 carries out also processing of Mobile Ipv6, and associates a care-of address (CoA) which is accommodated in a binding update message from the mobile router 15 with a home address (HoA), and gives it over to the mobile router movement management section 29, and records it in a table in the mobile router movement management section 29. In addition, the reception processing to a packet, which is carried out by the IP processing section 21, includes processing for deleting an IP header and giving over a received telegram message to the higher-level layer processing section 22, processing for discarding a packet in case that it is not a packet which is processed by itself, processing for activating transmission of a new packet, by reception of a packet, and so on.

The home link interface 23 carries out physical layer/data link layer processing. It adds a header, a tailer, which accords with a frame format defined in data link layer/physical layer, to a packet which was received from the local packet transmission processing section 28, the local packet transfer processing section 27, the IP processing section 21 and the tunnel packet processing section 24, and transmits it to the home link 2. Or, it gives over digital data which corresponds to a packet, among signals which were received from the home link 2, to the packet inspection section 25. This digital data is a frame having, as a header, a global scope address or a local scope address, which was included in a lower part of an address header of the data link layer.

The local scope processing section 20 has constituent elements as described above, and carries out processing for tunnel-transferring a packet of a local scope destination, from the home agent apparatus 10 to the mobile router 15, and processing for receiving the packet which was tunnel-transferred (hereinafter, referred to as "tunnel packet"), for the purpose of virtually integrating the external network 6 and the home network 1 as one network.

The packet inspection section 25 inspects a destination address of the packet which was received from the home link interface 23, and whether the packet is a tunnel packet or not. And, in case that the destination address is a local scope, the packet is given over to the local packet reception processing section 26. In case that the destination address is a global address addressed to itself, and is a tunnel packet, the packet is given over to the tunnel packet processing section 24. And, in case that some kind of conditions are not satisfied, the packet is give over to the IP processing section 21.

The tunnel packet processing section 24 carries out processing for uncapsulating a tunnel packet which was received from the packet inspection section 25. This packet is basically a packet which was sent from the mobile router 15 of the external network 6. The tunnel packet processing section 24 gives over a packet to the IP processing section 21, in case that a destination of a packet after uncapsulation is a unicast addressed to itself, i.e., a destination is only the home agent apparatus 10. In addition, in case that a destination of a packet after uncapsulation is multicast which includes itself, the packet after uncapsulation is duplicated, and given over to the IP processing section 21. Further, in case that there exists a valid binding cache which corresponds to a mobile router other than the mobile router 15 as a transmission source of a tunnel packet, in the mobile router movement management section 29, the packet after uncapsulation is duplicated, and given over to the local packet transfer processing section 27. In addition, in case that a destination of a packet after uncapsulation is a local scope address, the packet is given over to the home link interface 23. And, the tunnel packet processing section 24, in case that some kind of conditions are not satisfied, gives Over a packet to the IP processing section 21. Here, such a matter that a valid binding cache exists in the mobile router movement management section 29 to a mobile router other than the mobile router 15 as a transmission source of the above-described tunnel packet, means that there exists a different external network other than the external network 6, and a mobile router, which is different from the mobile router 15, exists in that external network, and there is a different foreign link. Meanwhile, the mobile router movement management section 29 will be described later.

The local packet reception processing section 26 duplicates a packet and gives it over to the IP processing section 21, in case that a destination of a non-tunnel packet which was received from the packet inspection section 25 includes the home agent apparatus 10 itself. In addition, in case that there exists a valid binding cache in the mobile router movement management section 29, a packet is give over to the local packet transfer processing section 27. In case that some kind of conditions are not satisfied, a packet is give over to the IP processing section 21. Meanwhile, since a packet, which is received by the local packet reception processing section 26, is not a tunnel packet, it is basically a packet at a local scope address destination which was transmitted by a terminal device on the home link 2.

The local packet transfer processing section 27 adds a tunnel header which was addressed to a care-of address of the mobile router 15 which is recorded in the mobile router movement management table in the mobile router movement management section 29, by using a global address of the home agent apparatus 10 itself as a transmission source, to a packet which was received from the local packet reception processing section 26, the local packet transmission processing section 28 and the tunnel packet processing section 24. Further, it carries out processing for tunnel transfer, and gives it over to the home link interface 23. In case that there are a plurality of mobile routers, it is transmitted to respective destinations. In this regard, however, as to a packet which was received from the tunnel packet processing section 24, it is transmitted to the mobile routers as a destination, except for a destination of a mobile router as a transmission source. Meanwhile, a packet, which was received from the local packet reception processing section 26, is basically a packet for an external network, as addressed to the mobile router 15 and a terminal device on the foreign link 5 from a terminal device on the home link 2. In addition, a packet, which was received from the local packet transmission processing section 28, is a packet for an external network, as addressed to the mobile router 15 or a terminal device on the foreign link 5 from the home agent apparatus 10. In addition, a packet, which was received from the tunnel packet processing section 24, is a communication packet between different foreign links, as a packet addressed to an equipment on another foreign link from an equipment on the foreign link 5.

The local packet transmission processing section 28 gives over a packet of a local scope destination which was generated in the IP processing section 21, to the home link interface 23. In addition, in case that there exists a valid binding cache in the mobile router movement management section 29, the local packet transmission processing section 28 duplicates the packet if needed, and gives it over to the local packet transfer processing section 27.

The mobile router movement management section 29 receives binding information of a home address and a care-of address of the mobile router 15 from the IP processing section 21, and records it in the mobile router movement management table, and manages a destination for movement of the mobile router 15. In addition, the tunnel packet processing section 24, the local packet reception processing section 26, and the local packet transmission processing section 28 refer to the mobile router movement management table, on the occasion of investigating whether there exists a valid binding cache in the mobile router movement management section 29. The local packet transfer processing section 27 obtains a care-of address of the mobile router 15, which is necessary for preparation of a tunnel packet, from the mobile router movement management table in the mobile router movement management section 29. Meanwhile, in case that there exists a mobile router other than the mobile router 15, the mobile router movement management section 29 records a valid binding cache information, in accordance with respective mobile router.

Here, the mobile router movement management table will be described.

FIG. 3 is one example of the mobile router movement management table. In FIG. 3, a home address (HoA) of a mobile router is an unchanged IP address which shows that the mobile router 15 is virtually connected to a home link, regardless of its connecting location. High-order 64 bits of the home address, which is composed of 128 bits, are a network prefix which is assigned with respect to each sub-network. This network prefix is the same as a network prefix of the home link 2. A care-of address (CoA) of a mobile router is an IP address which is obtained by the mobile router as a destination for movement. Its network prefix is obtained from an access router. Sequence number 303 is a sequence number which is included in a binding update message. This sequence number 303 exists for inspecting whether the binding update message from the mobile router 15 is the latest one or not. Lifetime 304 shows time in which a binding cache entry (a set of a home address and a care-of address) in the mobile router movement management table is useful. One time unit (TU) is set to 4 seconds as one example. When this value becomes 0, an entry becomes invalid. In addition, there is also such a case that the network prefix is one other than 64 bits. A lower level portion than a portion of the network prefix is determined by an Ipv6 terminal device etc. through the use of an appropriate algorithm. For example, it is generated on the basis of MAC address of an interface. Meanwhile, since it is all right if the mobile router movement management table can manage a global scope address of each mobile router, i.e., a care-of address, it is sufficient if there is a care-of address with respect to each mobile router. That is, for the purpose of search, it is all right if some kind of an identifier and care-of address of a mobile router exist in an entry. In case that there is description of a care-of address, a binding cache of the mobile router is to exist.

Meanwhile, the home agent apparatus 10 can also manage about a terminal device which is coupled on the home link 2, normally. Therefore, the tunnel packet processing section 24 and the local packet transmission processing section 28 investigate a destination IP address, and, as to packet which is a packet of a local scope destination and in which a destination of a terminal device on the home link 2 is not included, it is also possible not to transmit it from the home link interface 23.

An operation, and a function of the home agent apparatus 10 which was configured as above will be hereinafter described.

Figure 10B:
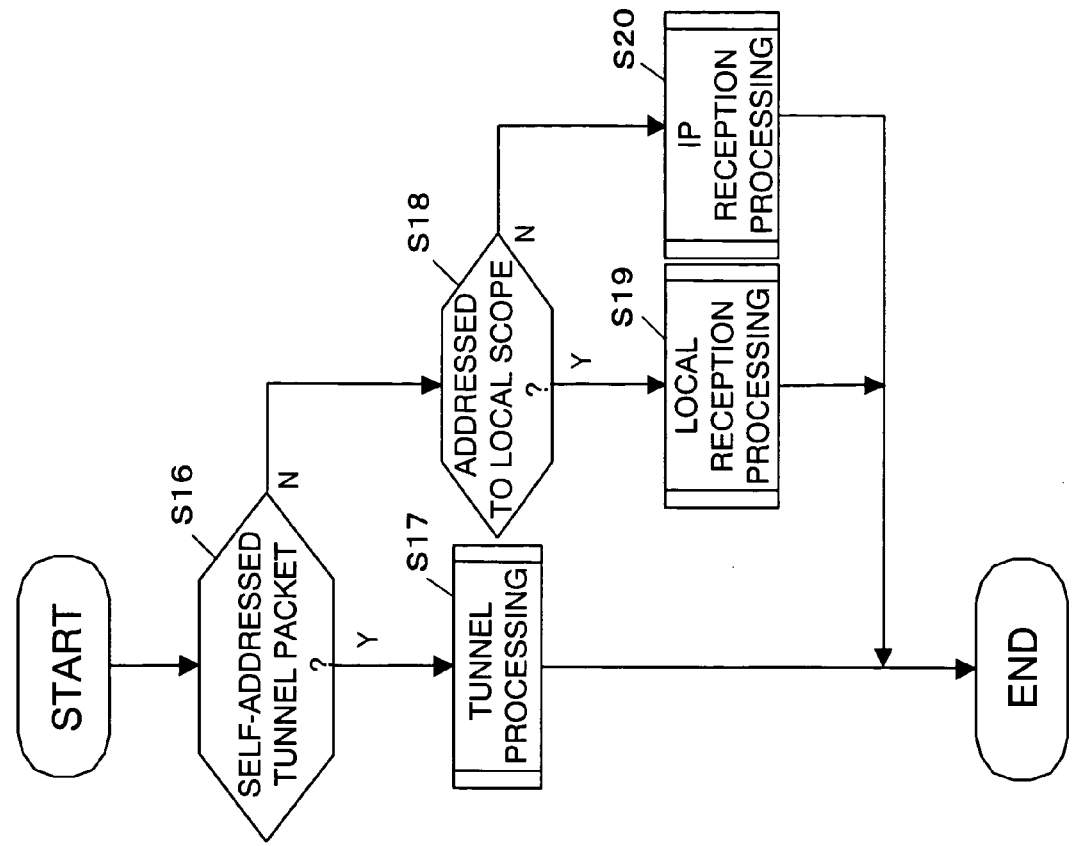
FIGS. 10A, B are flow charts of processing procedures in the first exemplary embodiment of the invention.
Figure 10A:
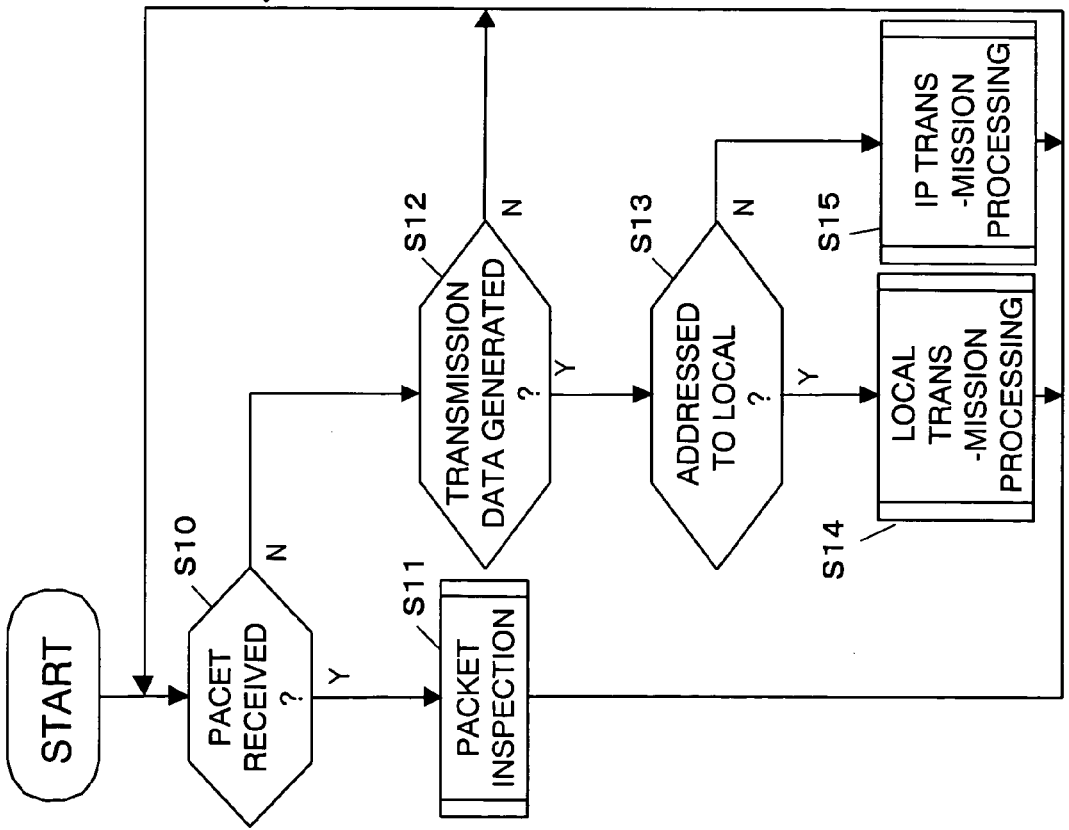

FIG. 10A is a flow chart which shows stand-by processing (basis state).

Firstly, the packet inspection section 25 judges presence or absence of reception of a packet through the home link interface 23 (step S10). The packet inspection section 25 carries out packet inspection, when it receives a packet (step S11).

On one hand, in case that the packet inspection section 25 judged that there is no reception, the IP processing section 21 judges presence or absence of generation of transmission data (step S12), and in case that there is generation of transmission data, the packet inspection section 25 carries out judgment of whether a destination of transmission data is a local scope or not (step S13). In case that a transmission packet addressed to the local scope is generated, the local packet transmission processing section 28 carries out local transmission processing (step S14).

In the step S13, in case that a transmission packet addressed to the global scope is not generated, the IP processing section 21 carries out IP transmission processing (step S15). This IP transmission processing is processing of transmitting transmission data, which was generated in the home agent apparatus 10, to the global scope address, and normal IP transmission processing, and transmission processing in Mobile Ipv6 are carried out. That is, the IP processing section 21 gives over a packet to the home link interface 23, and transmits it to the home link 2. If a destination address is a global scope address which does not have an identifier of a home network, i.e., a prefix of a home link, the home gateway 11 sends out the packet to Internet 3. In case that the destination address is a global scope address of a terminal device on the home link 2, that terminal device receives it.

In the step S12, in case that the IP processing section 21 judges that there is no generation of transmission data, it returns to the step S10. Meanwhile, packet inspection in the step S11 includes not only narrowly-defined packet inspection, but also packet inspection and transmission and reception/transfer processing on the basis of its result, as described later.

Meanwhile, FIG. 10A shows a flow chart for judging packet reception, transmission processing periodically, but even if it is designed that the reception processing, and the transmission processing are activated by interruption processing, same thing will happen.

FIG. 10B is a flowchart which showed a processing procedure of packet inspection (step S11) described in FIG. 10A.

Firstly, the packet inspection section 25 judges whether a packet received is a tunnel packet addressed to itself or not (step S16), and in case that it is the tunnel packet addressed to itself, it notifies to the tunnel packet processing section 24, and it goes to tunnel processing (step S17). In case that it is not the tunnel packet addressed to itself, the packet inspection section 25 judges whether a packet received is one addressed to a local scope or not (step S18). In case that it is one addressed to the local scope, it proceeds on to local reception processing (step S19).

In the step S18, in case that it is not one addressed to the local scope, it proceeds on to IP reception processing (step S20). In this IP reception processing, the IP processing section 21 carries out conventional reception processing of IP and Mobile IP, such as self-addressed packet reception processing, routing processing, packet discard, packet reception processing of Mobile Ipv6, and transfer processing, but here, it carries out packet reception processing addressed to a global scope of itself, among them. Other packets are discarded.

Figure 11:
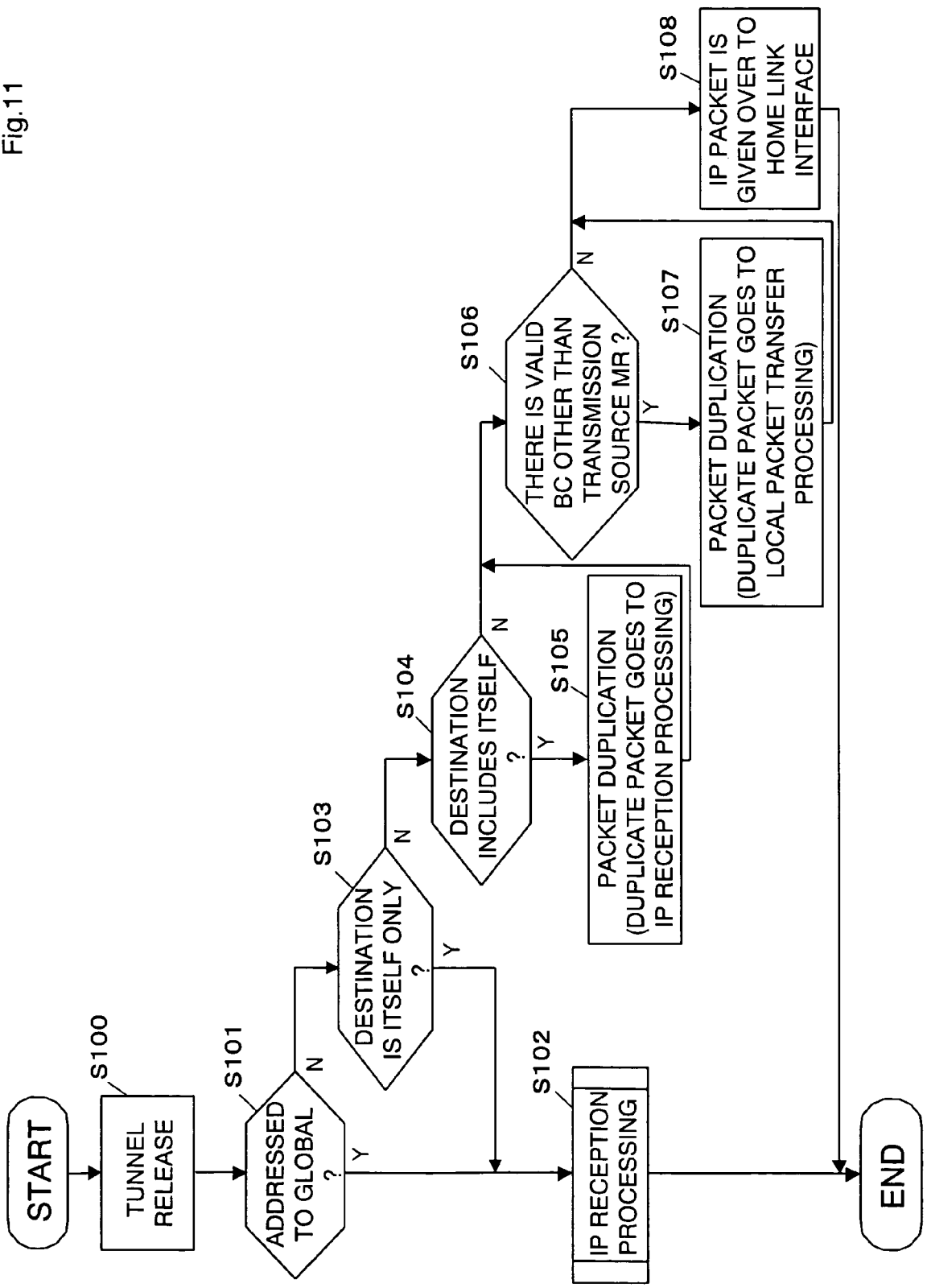
FIG. 11 is a flow chart of a processing procedure in the first exemplary embodiment of the invention.

FIG. 11 is a flow chart which showed a procedure of tunnel processing (step S17) described in FIG. 10B.

Firstly, the tunnel packet processing section 24 deletes a tunnel header of a tunnel packet received, to uncapsulate a tunnel format.

Next, the tunnel packet processing section 24 judges whether a destination of a uncapsulated packet is a global address or not (step S101), and if it is one addressed to global, IP reception processing is carried out (step S102).

On one hand, in case that it is not one addressed to global, the tunnel packet processing section 24 judges whether a destination is only the home agent apparatus 10 itself or not (step S103), and if it is the home agent apparatus 10 itself, it proceeds on to the step S102, to carry out IP reception processing. Here, reception processing of a packet addressed to a local address of itself is carried out.

In case that a destination is not the home agent apparatus 10 itself, it is a packet of unicast or multicast addressed to a local scope other than the home agent apparatus 10 itself, or multicast including destinations of itself and others, and therefore, the tunnel packet processing section 24 judges whether the home agent apparatus 10 itself is included in a destination or not (step S104). In case that the home agent apparatus 10 is included in the destination, the tunnel packet processing section 24 duplicates a packet, and carries out IP reception processing of the duplicated packet, and it proceeds on to a step S106 (step S105).

In the step S104, in case that the home agent apparatus 10 is not included in the destination, the tunnel packet processing section 24 judges whether an address of a mobile router other than a transmission source mobile router (MR) exists in the mobile router movement management table (binding cache BC) or not (step S106). In case that it exits in the mobile router movement management table, the local packet transfer processing section 27 duplicates a packet, and carries out local packet transfer processing which will be described later in FIG. 13A (step S107), and it moves to a step S108.

In case that it does not exist in the mobile router movement management table, the tunnel packet processing section 24 gives over an IP packet to the home interface 23 (step S108). The home interface 23 transmits a packet to the home link 2. In this procedure, in case that a local scope address other than the home agent apparatus 10 itself is included in the destination, regardless of such a fact that a terminal device, which corresponds to its address, exits or does not exist actually on the home link 2 and the foreign link 5, a packet is to be transmitted. At this time, each terminal device receives only a packet addressed to itself, and therefore, malfunction never occurs.

Meanwhile, in the step S105, in case that the tunnel packet processing section 24 carried out packet duplication, it may be all right even if it proceeds on to the step S106, and IP reception processing of the duplicated packet is carried out by parallel processing, in parallel with carrying out subsequent processing.

Figure 12:
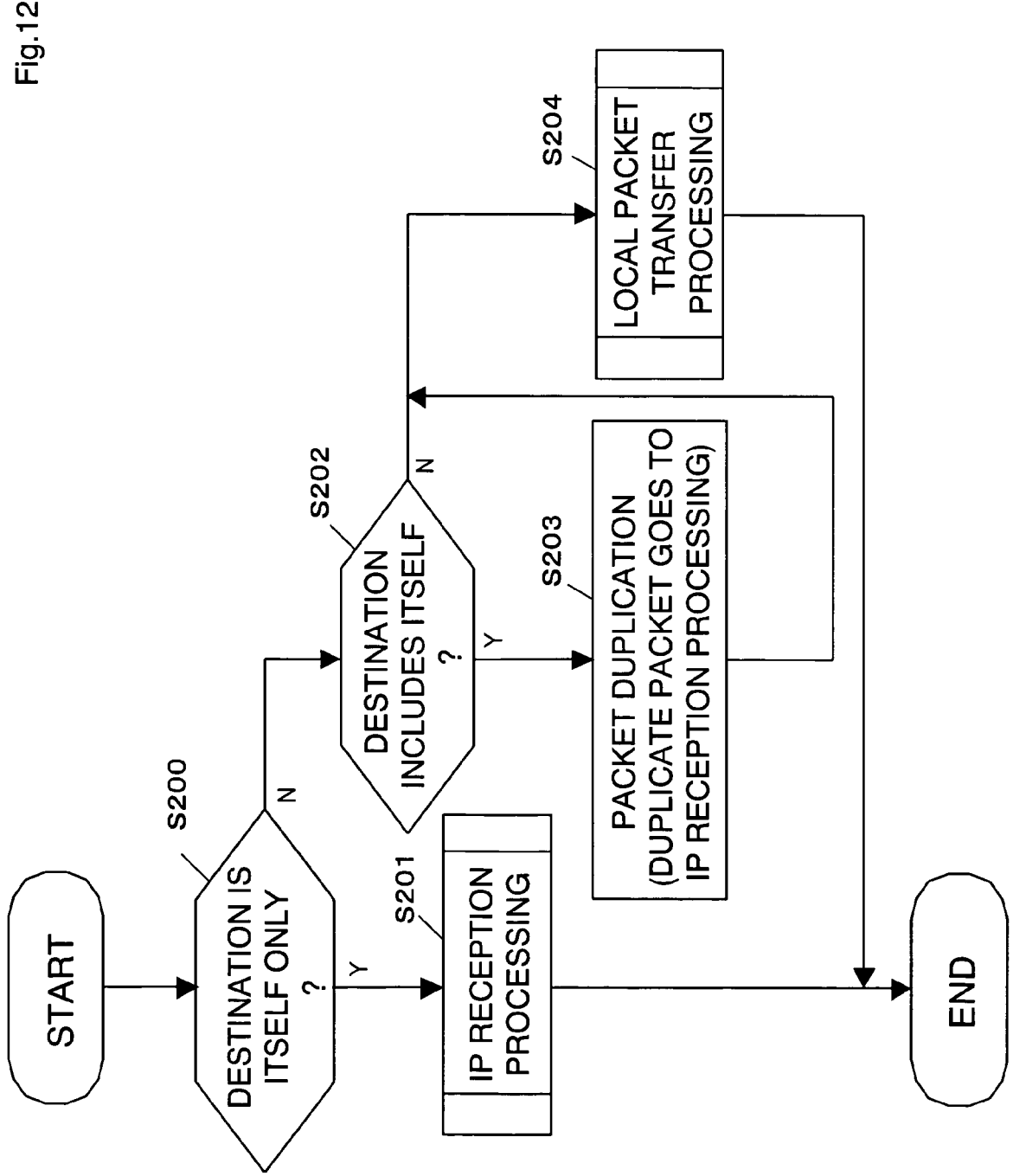
FIG. 12 is a flow chart of a processing procedure in the first exemplary embodiment of the invention.

Next, a procedure of local reception processing (step S19) described in FIG. 12 will be shown.

Firstly, the local packet reception processing section 26 judges whether a destination of a packet is only the home agent apparatus 10 itself or not (step S200). If it is only the home agent apparatus 10 itself, the local packet reception processing section 26 carries out IP reception processing (step S201). Here, the local packet reception processing section 26 carries out reception processing of a packet addressed to a local scope address of the home agent apparatus 10 itself.

On one hand, if it is not the home agent apparatus 10 itself only, it is judged whether an address of the home agent apparatus 10 itself is included or not (step S202). In case that the address of the home agent apparatus 10 itself is included, the local packet reception processing section 26 duplicates a packet, and carried out IP reception processing (step S203), and it proceeds on to a step S204.

Figure 13B:
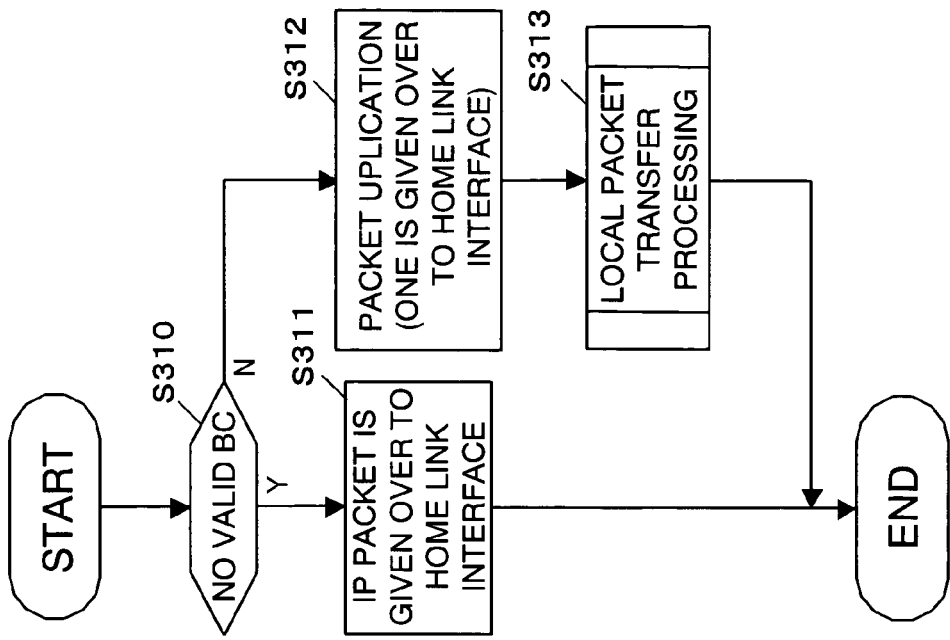
FIGS. 13A, B are flow charts of processing procedures in the first exemplary embodiment of the invention.
Figure 13A:
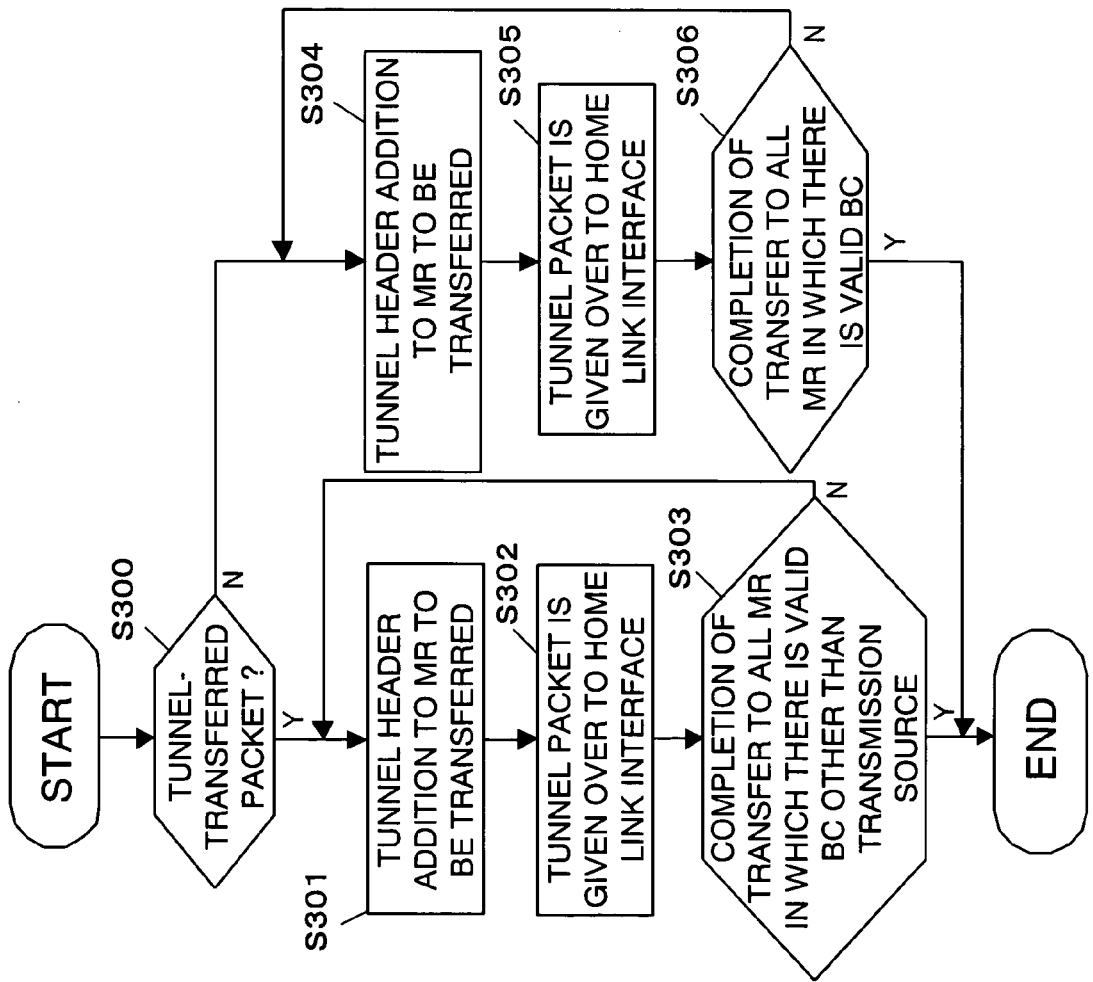

In case that the address of the home agent apparatus 10 itself is not included, the local packet reception processing section 26 carries out processing which corresponded to a local scope address destination other than that of the home agent apparatus itself, i.e., local packet transfer processing shown in FIG. 13A.

Here, a procedure of the local packet transfer processing (step S204) is shown in FIG. 13A.

Firstly, the local packet transfer processing section 27 judges whether the given packet has been tunnel-transferred or not (step S300). If it is the tunnel-transferred packet, the local packet transfer processing section 27 adds a tunnel header of a mobile router destination to which transfer is carried out (step S301). The local packet transfer processing section 27 refers to the mobile router movement management table, and investigates whether an address other than that of a mobile router as a transmission source is recorded in the table or not. And, in case that it is recorded, the local packet transfer processing section 27 adopts its care-of address as a global address of a transmission destination, and gives over a tunnel packet prepared, to the home link interface 23 (step S302). The home link interface 23 transmits a packet to the home link 2, and the home gateway 11 sends it out to Internet 3.

Next, the local packet transfer processing section 27 judges whether tunnel transfer to all mobile routers, in which there are binding caches other than that of the transmission source, was completed or not (step S303). That is, the local packet transfer processing section 27 judges whether there disappears a mobile router of non-transmission, in the mobile router movement management table, or not, and in case that there still exists the mobile router of non-transmission, it returns to the step S301, and it is repeated until the mobile router of non-transmission disappears. In addition, the local packet transfer processing section 27 refers to the mobile router movement management table, and investigates whether an address other than that of a mobile router as a transmission source is recorded in the table or not, and in case that it is not recorded, processing of tunnel transfer, among steps S301 through S303, is skipped.

In the step S300, in case that it is not a packet which has been tunnel-transferred, that packet is a packet addressed to a local scope address, which has been sent to a foreign link from a terminal device on the home link 2. In this case, the local packet transfer processing section 27 refers to the mobile router movement management table, and prepares such a tunnel packet that has a tunnel header which destination address is care-of address of the mobile router that is recorded in the table.(step S304).

And, the local packet transfer processing section 27 gives over this tunnel packet to the home link interface 23, and sends it out to the home link 2 (step S305). The home gateway 11 sends out a tunnel packet to Internet 3.

Next, the local packet transfer processing section 27 judges whether transfer was completed or not, as to all mobile routers in the mobile router movement management table (step S306), and in case that transfer has not yet completed, it returns to the step S304, to repeat it until all is completed.

On one hand, in case that transfer has been completed, the local packet transfer processing section 27 finishes local packet transfer processing. In case that valid binding caches of plural mobile routers are described in the mobile router movement management table, the local packet transfer processing section 27 is to tunnel-transfer them to all mobile routers, regardless of such a fact that a terminal device of the other party exists or does not exits.

Next, local transmission processing (step S14) shown in FIG. 10A will be described by use of a flow chart shown in FIG. 13B.

Firstly, the local packet transmission processing section 28 judges whether there is not valid binding cache (BC) or not, i.e., whether a care-of address of a mobile router is recorded in the mobile router movement management table or not (step S310). In case that there is no entry of a care-of address of a mobile router at all, the local packet transmission processing section 28 gives over a packet to the home link interface 23, and sends it out to the home link 2 (step S311). If a destination address is a global scope address which does not have an identifier of a home network, i.e., a prefix of a home link, the home gateway 11 sends out the packet to Internet 3. In case that the destination address is a local scope address, a terminal device with a corresponding address, among terminal devices on the home link 2, receives it. Even if the destination address is a global scope address, in case that the global scope address if an address of itself, a terminal device, which can respond to the global scope address, receives it.

On one hand, in the step S310, in case that a care-of address of some kind of a mobile router is described in the mobile router movement management table, the local packet transmission processing section 28 duplicates a packet, and gives it over to the home link interface 23, and sends it out to the home link 2 (step S312). This packet is received by a terminal device with a corresponding address, among terminal devices on the home link 2.

Next, the local packet transfer processing section 27 carries out the above-described local packet transfer processing which was shown in FIG. 13A (step S313).

By the above-described series of processing procedures, the home agent apparatus 10 can carry out transmission and reception and transfer processing of various packets.

Next, the mobile router 15 will be described.

Figure 4:
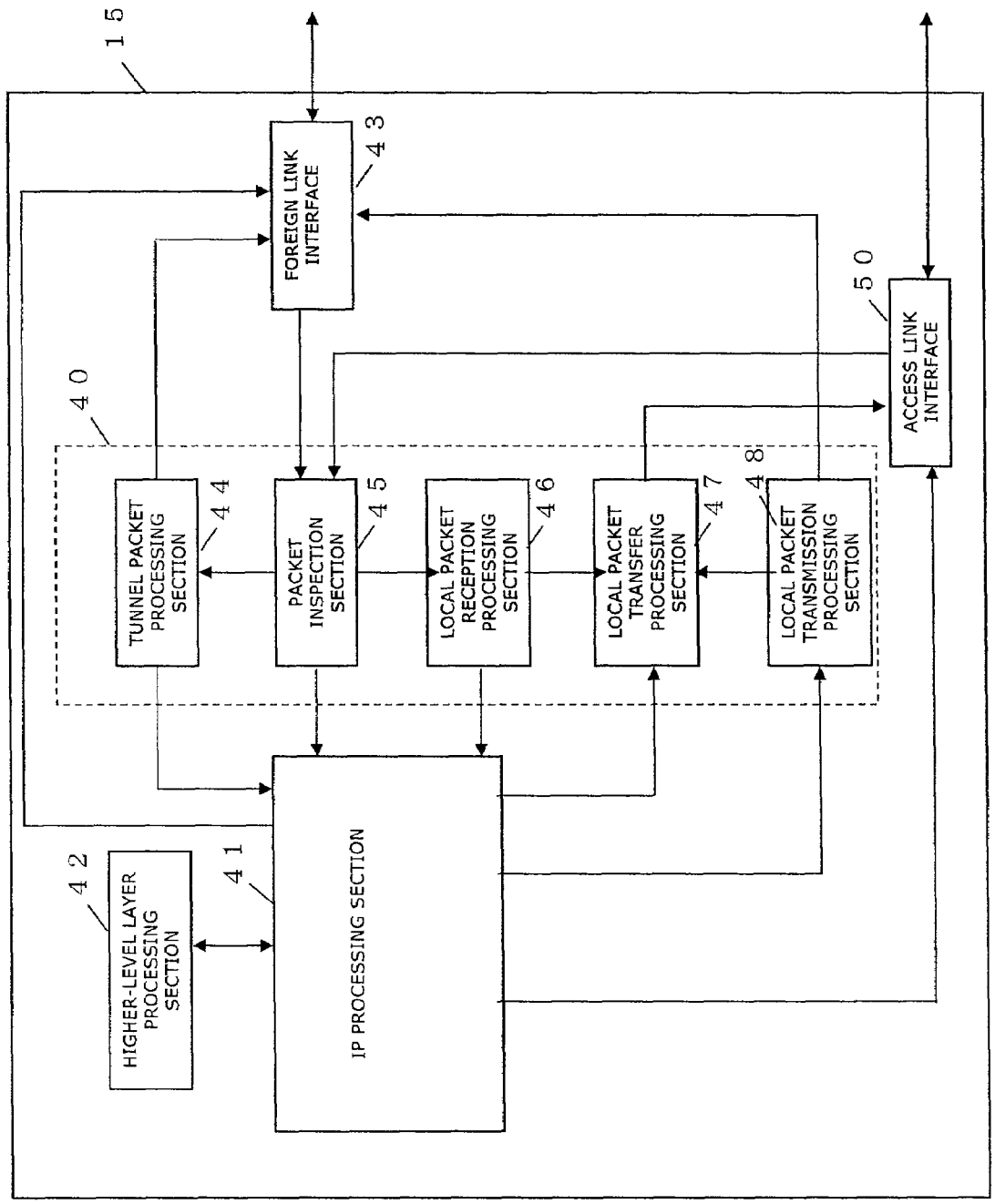
FIG. 4 is a block diagram of a mobile router in the first exemplary embodiment of the invention.

FIG. 4 is a view which shows a configuration of the mobile router 15 which relates to the invention.

In FIG. 4, the mobile router 15 has a local scope processing section 40, an IP processing section 41, a higher-level layer processing section 42, a foreign link interface 43, and an access link interface 50. The local scope processing section 40 has a tunnel packet processing section 44, a packet inspection section 45, a local packet reception processing section 46, a local packet transfer processing section 47, and a local packet transmission processing section 48.

The higher-level layer processing section 42 carries out processing of a higher-level (transport layer/session layer/presentation layer/application layer) than a network layer.

The IP processing section 41 carries out network layer processing. Concretely speaking, it carries out reception processing to a packet which was received from the packet inspection section 45 or the local packet reception processing section 46 or the tunnel packet processing section 44, and processing for generating a packet by adding an IP header to transmission data which was received from the higher-level layer processing section 42. Further, the IP processing section 41 discriminates a scope of a destination address, and, in case of a local scope, it carries out processing for giving it over to the local packet transmission processing section 48, and in case of a global scope, it carries out processing for giving it over to the foreign link interface 43 or the access link interface 50, in accordance with a routing table in the IP processing section 41. In addition, in the IP processing section 41, also carried out is such processing of Mobile Ipv6 that it obtains a sub-network name, a prefix, from a router advertisement message which comes from the access router 18, and generates a care-of address, and transmits a binding update message to the home agent apparatus 10. The IP processing section 41 gives over a home address and a care-of address to the local packet transfer processing section 47, and has them stored in a tunnel header table which will be described later.

In addition, reception processing to a packet, which is carried out by the IP processing section 41, includes processing for deleting an IP header and giving a received telegraph message to the higher-level layer processing section 42, processing for discarding a packet in case that it is not a packet which is processed by the mobile router 15 itself, processing for activating transmission of a new packet, due to reception of a packet, and so on.

The foreign link interface 43 caries out physical layer/data link layer processing for connecting to the foreign link 5. It adds a header and a tailer, which accord with a frame format defined in data link layer/physical layer, to a packet which was received from the local packet transmission processing section 48, the IP processing section 41 and the tunnel packet processing section 44, and transmits it to the foreign link 5. Or, it gives over digital data which corresponds to a packet, among signals which were received from the foreign link 5, to the packet inspection section 45.

The access link interface 50 carries out physical layer/data link layer processing for connecting to the access link 4. The access link interface 50 adds a header and a tailer, which accord with a frame format defined in data link layer/physical layer, to a packet which was received from the local packet transfer processing section 47 and the IP processing section 41, and transmits it to the access link 4. In addition, the access link interface 50 gives over digital data which corresponds to a packet, among signals which were received from the access link 4, to the packet inspection section 45.

The local scope processing section 40 is, as described above, composed of the tunnel packet processing section 44, the packet inspection section 45, the local packet reception processing section 46, the local packet transfer processing section 47, and the local packet transmission processing section 48, carries out processing for tunnel-transferring a packet addressed to a local scope from the mobile router 15 to the home agent apparatus 10, for the purpose of virtually integrating the external network 6 and the home network 1 as one network.

The packet inspection section 45 carries out inspection of packets which were received from the access link interface 50 and the foreign link interface 43. The packet inspection section 45 inspects a destination address of a packet, and whether the packet is a tunnel packet or not, with regard to the packet which was received from the access link interface 50. And, in case that the destination address is a global address addressed to the mobile router 15 itself, and is a tunnel packet, the packet inspection section 45 gives over a packet to the tunnel packet processing section 44, and in case that conditions are not satisfied, gives over the packet to the IP processing section 41. The packet inspection section 45 inspects a destination address of a packet, with respect to a non-tunnel packet which was received from the foreign link interface 43, and in case that the destination address if a local scope, gives over the packet to the local packet reception processing section 46, and in case that conditions are not satisfied, gives over the packet to the IP processing section 41.

The tunnel packet processing section 44 carries out processing for uncapsulating a tunnel packet which was received from the packet inspection section 45. And, in case that a destination of a packet after uncapsulation is unicast addressed to the mobile router 15 itself, the tunnel packet processing section 44 gives over a packet to the IP processing section 41, and in case that the packet after uncapsulation includes itself, duplicates the packet after uncapsulation, and gives it over to the IP processing section 41. In addition, in case that a destination of the packet after uncapsulation includes a local scope address, the tunnel packet processing section 44 gives over a packet to the foreign link interface 43, and in case that some kind of conditions are not satisfied, it gives over the packet to the IP processing section 41.

The local packet reception processing section 46 gives over a packet to the IP processing section 41, in case that a destination of a non-tunnel packet, which was received from the packet inspection section 45, is itself only, and in case that the destination includes itself, it duplicates a packet, and gives it over to the IP processing section 41. In addition, in case that a destination of an IP address received includes a local scope address other than that of itself, the local packet reception processing section 46 gives over a packet to the local packet transfer processing section 47, and in case that some kind of conditions are not satisfied, it gives over a packet to the IP processing section 41.

The local packet transfer processing section 47 owns a tunnel header table which stores a home address and a care-of address of itself, and an address of a home agent apparatus. The local packet transfer processing section 47 gives over a packet in which a tunnel header having a care-of address of itself as a transmission source and a global address of the home agent apparatus 10 as a destination, was added to a packet which was received from the local packet reception processing section 46 and the local packet transmission processing section 48, to the access link interface 50.

The local packet transmission processing section 48 gives over a packet which was received from the IP processing section 41, to at least one of the local packet transfer processing section 47 and the foreign link interface 43, in compliance with its destination.

Here, the tunnel header table will be described.

FIG. 5 shows one example of the tunnel header table. A home address 501 of a mobile router is an unchanged IP address on the home link 2 of the mobile router 15, and has a network prefix on the home link 2. A care-of address (CoA) of a mobile router 502 is an IP address which was obtained by the mobile router 15 while visiting home network external. High-order bits (e.g., high-order 64 bits) of an IP address is a network prefix for making a discrimination of a network, and is obtained from an access router. A home agent address 503 is a global scope address of the home agent apparatus 10. In this embodiment, this tunnel header table is disposed in the local packet transfer processing section 47, but may be disposed in the IP processing section 41. In this case, the local packet transfer processing section 47 refers to a content of this tunnel table, and generates a tunnel header.

The mobile router 15 manages and knows IP addresses of terminal devices which are connected to the foreign link 5. Therefore, it can be designed in such a manner that the tunnel packet processing section 44, and the local packet transmission processing section 48 investigate a destination address, on the occasion of giving over a packet of a local scope to the foreign link interface 43, and does not give over a packet to the foreign link interface 43, as to the packet in which a local address of a terminal device connected on the foreign link 5 is not included in a destination address. According to this, it is possible to prevent transmission of useless packets. In addition, it may be also configured in such a manner that the local packet transmission processing section 48 investigates a destination address, on the occasion of giving over a packet of a local scope to the local packet transfer processing section 27, and does not give over a packet to the local packet transfer processing section 27, as to the packet in which a destination address other than a local address of a terminal device connected on the foreign link 5 is not included. According to this, it is possible to prevent preparation and transmission of useless tunnel packets.

An operation, and a function of the mobile router 15 which was configured as above will be hereinafter described.

FIGS. 14 and 15 are flow charts which show processing procedures which are carried by the mobile router 15. Meanwhile, with regard to stand-by processing (basis state), it is the same as the processing shown in FIG. 10A. In addition, subsequent IP reception processing carries out normal IP reception processing such as reception processing of a packet addressed to a mobile router itself, routing processing, packet discard, Mobile Ipv6 packet reception processing, and transfer processing.

In the beginning, packet processing in the stand-by processing will be described by use of FIG. 14A.

Figure 14A:
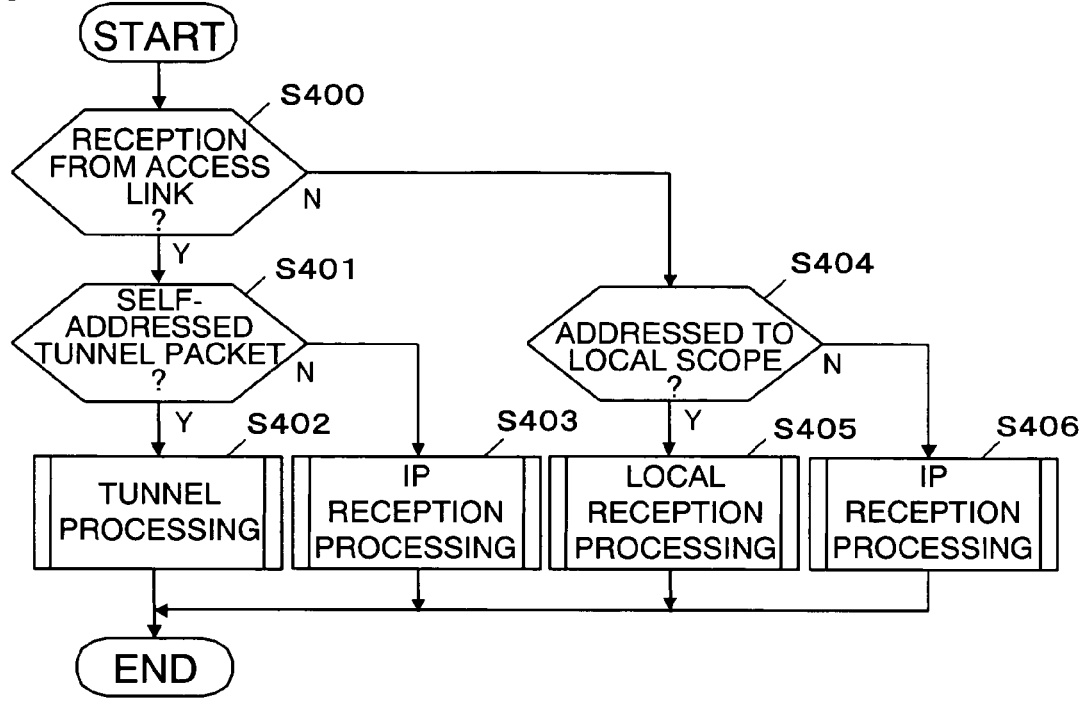
FIGS. 14A, B are flow charts of processing procedures in the first exemplary embodiment of the invention.
Figure 14B:
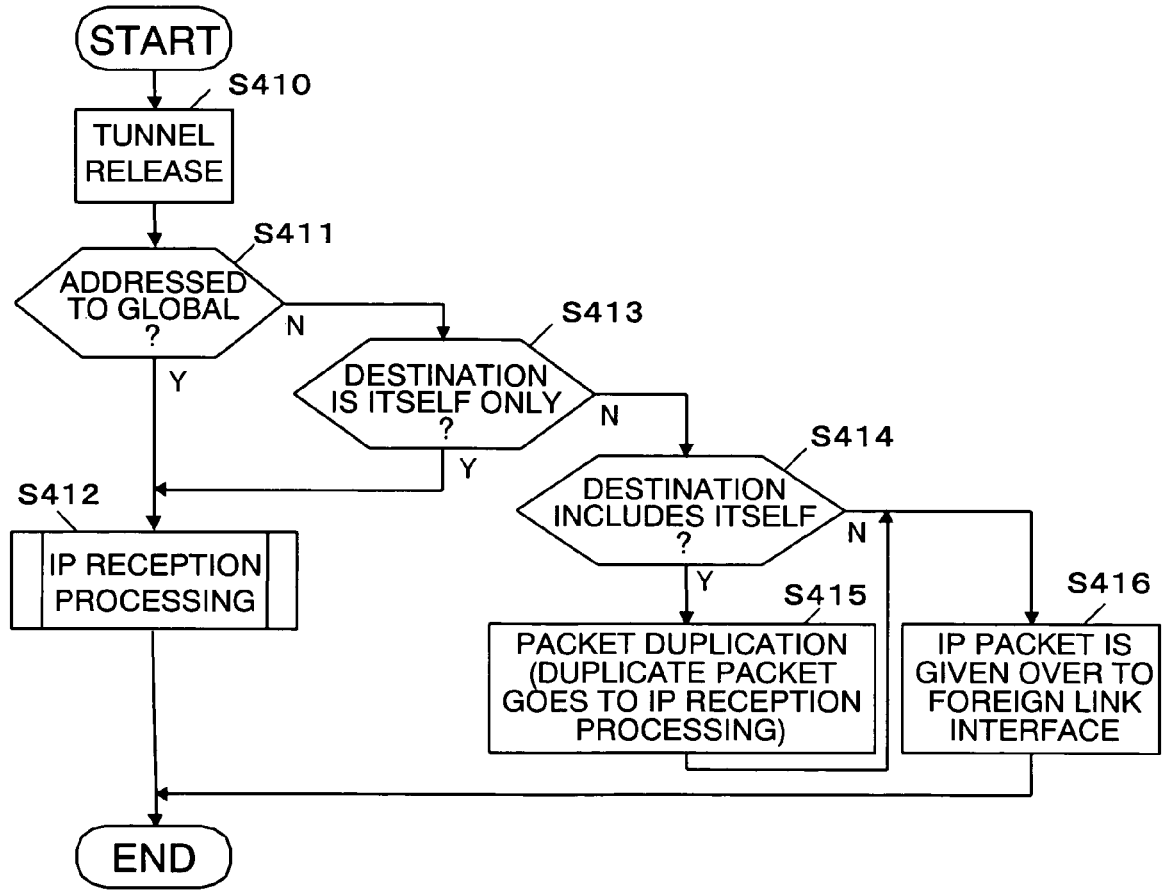

In FIG. 14A, firstly, the packet inspection section 45 judges whether a packet as an object for inspection is a received packet from the access link 4 or not (step S400). In case that it is the received packet from the access link 4, the packet inspection section 45 judges whether it is a tunnel packet addressed to the mobile router 15 itself or not (step S401). In case that it is a tunnel packet which passed through the access link 4, tunnel processing, which will be described later in FIG. 14B, is carried out (step S402). In the step S401, in case that it is a normal packet with non-tunnel addressed to a global scope address through the access link 4, the IP processing section 41 carries out IP reception processing (step S403). That is, in case of a global scope address destination of the mobile router 15 itself, it carries out reception processing by itself, and in case of a global scope address destination of another terminal device, it gives it over to the foreign link interface 43, in accordance with a routing table, according to need. Meanwhile, in case that it does not have the routing table, it may be all right even it if gives over to the foreign link interface 43 unconditionally.

On one hand, in the step S400, in case that it was judged that it is a packet from the foreign link 5, the packet inspection section 45 carries out judgment of whether it is a local scope address destination or not (step S404). In case that it is addressed to a local scope address, it proceeds on to local reception processing (step S405) which will be described later in FIG. 15A for the purpose of reception processing in the mobile router 15 and tunnel transfer.

On one hand, in case that it is a global scope address destination, the IP processing section 41 carries out reception processing of the mobile router 15 itself, and in case of a global scope address destination of another equipment, it carries out processing for giving it over to the access link interface 50 according to need, in accordance with the routing table in the IP processing section 41 (step S406). Meanwhile, in case that it does not have the routing table, it may be all right even it if gives over to the access link interface 50 unconditionally.

Next, tunnel processing, which is shown in FIG. 14B, will be described. Here, uncapsulation of a tunnel packet and subsequent processing are carried out.

Firstly, the tunnel packet processing section 44 carries out uncapsulation of a tunnel packet (step S410). That is, deleting a tunnel header portion of a packet, it enables to refer to an original transmission source address and a destination address, which exist in the packet.

Next, the tunnel packet processing section 44 judges whether a destination address if a global scope address or not (step S411). In case that it is a global scope address destination, IP reception processing is carried out (step S412). Here, in case that a packet is of a global scope address destination of the mobile router 15 itself, it carries out reception processing by itself, and in case of a global scope address destination of another equipment, it carries out processing for giving over to the foreign link interface 43, according to need, in accordance with a routing table in the IP processing section 41.

On one hand, in case that a destination address is a local scope address, it is judged whether a destination is the mobile router 15 itself or not (step S413). In case that the destination is the mobile router 15 itself, it is only a local scope address destination of the mobile router 15 itself, it carries out reception processing by itself (step S412). Meanwhile, in case that it does not have the routing table, it may be all right even if it carries out processing for giving over to the foreign link interface 43 unconditionally.

In the step S413, in case that a destination address is of a local scope address destination, and is not only a destination other than that of the mobile router 15 itself, the local scope processing section 40 judges whether a destination of the mobile router 15 itself is included or not (step S414). In case that the destination of the mobile router 15 itself is included, a packet is duplicated, and the duplicate packet is IP-reception-processed and processed by itself (step S415), and it proceeds on to a step S416.

On one hand, in case that a destination is another terminal device other than the mobile router 15 itself, a packet is give over to the foreign link interface 43, and sent to the foreign link 5 (step S416). A terminal on the foreign link 5 receives a packet, in case that it is a destination of a local address of itself.

Next, by use of FIG. 15A, local reception processing in the step S405 will be described. In this local reception processing, carried out is processing of a packet with a local scope address destination, which was received from the foreign link 5.

Firstly, the local packet reception processing section 46 judges whether a destination is the mobile router 15 itself or not (step S500). In case that the destination is the mobile router 15 itself, it carries out IP reception processing (step S501). That is, it carries out reception processing of a packet addressed to the mobile router 15 from a terminal device on the foreign link 5.

On one hand, in case that the destination includes a destination other than the mobile router 15, it is judged whether a destination of the mobile router 15 itself is included or not (step S502). In case that the destination includes the mobile router 15 itself, a packet is duplicated, and the duplicate packet is IP-reception-processed (step S503), and it proceeds on to a step S504.

In the step S502, in case that the mobile router 15 itself is not included in the destination, local packet transfer processing, which corresponded to a destination other than itself, is carried out (step S504).

FIG. 15B is a flow chart which shows a procedure of this local packet transfer processing (step S504).

Firstly, the local packet transfer processing section 47 prepares a header with a global scope address format, addressed to the home agent apparatus 10 to which transfer is carried out, from the tunnel header table of FIG. 5, and adds it to a packet, to prepare a tunnel packet (step S510).

Next, the local packet transfer processing section 47 gives over the tunnel packet prepared, to the access link interface 50, and sends it out to the access link 4 (step S511). By this, the home agent apparatus 10 can receive this tunnel packet.

Figure 16:
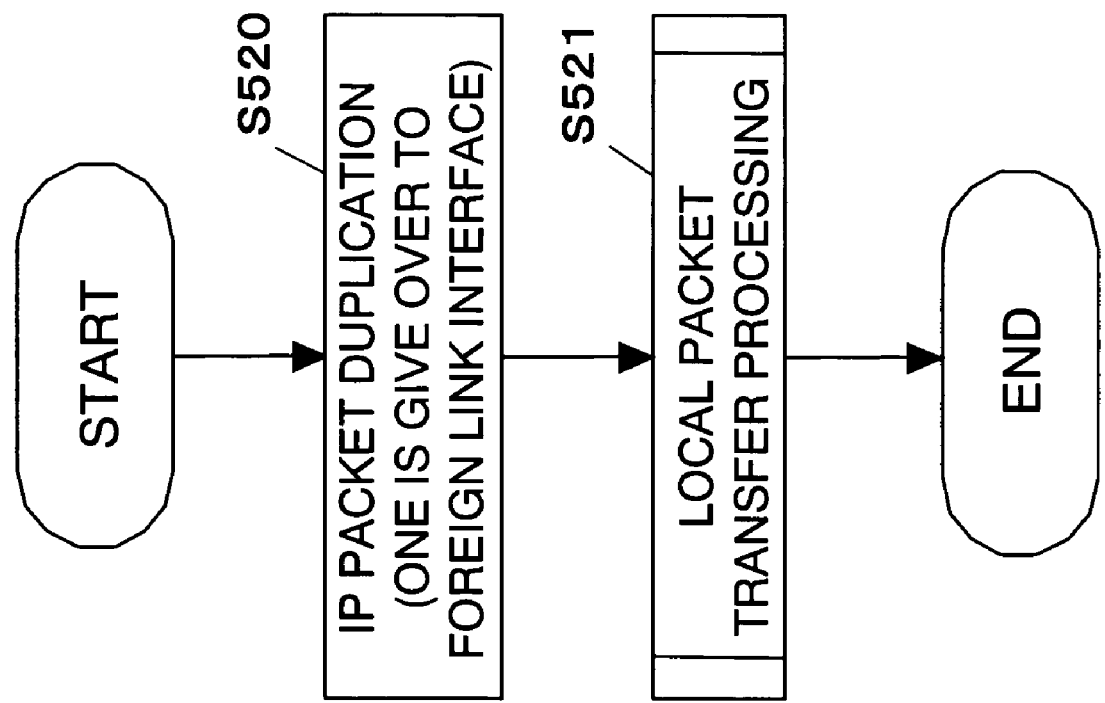
FIG. 16 is a flow chart of a processing procedure in the first exemplary embodiment of the invention.

Next, a content of local transmission processing, in the stand-by processing (basis state), will be hereinafter described by use of FIG. 16.

Firstly, in case that a transmission packet addressed to a local scope is generated in an inside of the mobile router 15, the local packet transmission processing section 48 duplicates a packet and gives it over to the foreign link interface 43, and sends it out on the foreign link 5 (step S520).

Next, local packet transfer processing, which was described in FIG. 15B, is carried out (step S521). Meanwhile, in this example, assumed was such a case that the mobile router 15 does not manage terminal devices on the foreign link 5, but in case that it manages them, it is all right if it is designed in such a manner that a packet is give over to the foreign link interface 43, only in case that a destination address of the packet is a terminal device on the foreign link. In case of multicast on the foreign link 5 and on the home link 2, it is all right if a procedure is carried out as in FIG. 16.

In addition, a content of IP transmission processing, in stand-by processing (basic state), is not shown in the figure, but here, normal IP transmission processing, and transmission processing in Mobile Ipv6 are carried out to a transmission packet with a global scope address destination, which was generated in an inside of the mobile router 15. That is, in case that the transmission packet with a global scope address destination was generated in an inside of the mobile router 15, the IP processing section 41 carries out processing for giving over to the access link interface 50 or the foreign link interface 43, according to need, in accordance with a routing table in the IP processing section 41.

In this first explanatory embodiment, the home agent apparatus 10 manages a mobile router which exists in an external network, by the mobile router movement management table of the mobile router movement management section 29, but does not manage about terminal devices which exist in respective external networks. Therefore, by a simple configuration and control, it is possible to expand a local scope of the home link 2 to a remote place and set up it. In addition, it is possible to use a terminal device as a mobile terminal device, without having a new function.

In addition, in this embodiment, in case that the home agent apparatus 10 and the mobile router 15 receive a packet by itself, which packet is transmitted from itself as a transmission source, they discard this packet. This is because, if this packet is re-transmitted, there is such a possibility that an equipment as a transmission destination receives it again. In this regard, however, in such a system that a packet, which was sent out from a transmission source, is received again, it is not limited to this, and it is all right if processing, which corresponded to that system, is carried out.

Meanwhile, IP reception processing to a packet which was duplicated in packet duplication processing in the step S105, the step S203, the step S415, and the step S503 shown in FIGS. 11, 12, 14, and 15, processing for giving over to the home link interface, or processing for giving over to the foreign link interface, and so on may be carried out in parallel with next processing which follows these.

In addition, the home agent apparatus 10 and the home gateway 11 are shown in the figure as different devices, respectively, but it is possible to integrate them as one device, by making the home gateway hold a home agent function.

Further, in this embodiment, it was described on the assumption of an address system of Ipv6, but not-limiting to this, it is also possible to accomplish the object of the invention, by setting up a global scope address and a local scope address, in an Ipv4 system. For example, in this case, it is possible by disposing a foreign agent which was designed to manage movement even on a foreign link and has the same function as that of the home agent apparatus.

In addition, in this embodiment, it was described that an address of a network layer is used as a local scope address, but an address of a data link layer may be adopted as the local scope address. That is, in case of communicating in the home link 2 and in the foreign link 5, by a packet which used only an address header due to an address of a data link layer as a local scope address, the home link interface 23, and the foreign link interface 43 are designed to give over to a local scope processing section without removing an address header of the data link layer. In the local scope processing section and the IP processing section, packet processing is carried out, by considering the address header of the data link layer as a local scope address. In addition, in order to carry out transmission and reception between the home link 2 and the foreign link 5, the home agent apparatus and the mobile router are to add a global scope address header to a packet which has an address header of a data link layer, to encapsulate it to a tunnel packet, and then, transmit and receive it. Meanwhile, a home address was described as a global scope address, but may be a local scope address.

As above, according to the invention, a mobile router notifies a care-of address of itself to a home agent apparatus, and thereby, between the home agent apparatus and the mobile router, packets with local scope address destinations, which are generated on a home link or a foreign link, are all transfer-processed. By this, after a terminal device, which has been connected to the home link, moves to the foreign link, a packet which is transferred to the mobile router is sent out on the foreign link, without registering it in the mobile router, and therefore, a terminal device can receive packets addressed to itself, in the same manner as on the home link. In addition, a packet addressed to a terminal device on the home link from a terminal device which moves to the foreign link is also transferred between the mobile router and the home agent apparatus, and therefore, a terminal device can carry out communication with a terminal device on the home link and the home agent apparatus after it moves to external network.

2nd Exemplary Embodiment

In this 2nd exemplary embodiment, it is different from the first exemplary embodiment on such a point that the home agent apparatus 10 manages not only mobile routers, which exist on the external network, by the mobile router movement management table of the mobile router movement management section 29, but also terminal devices which exist on the external network. By this, it is possible to sending-out of useless packets in case that there are a plurality of external networks and mobile routers.

Hereinafter, a home agent apparatus will be described.

Figure 6:
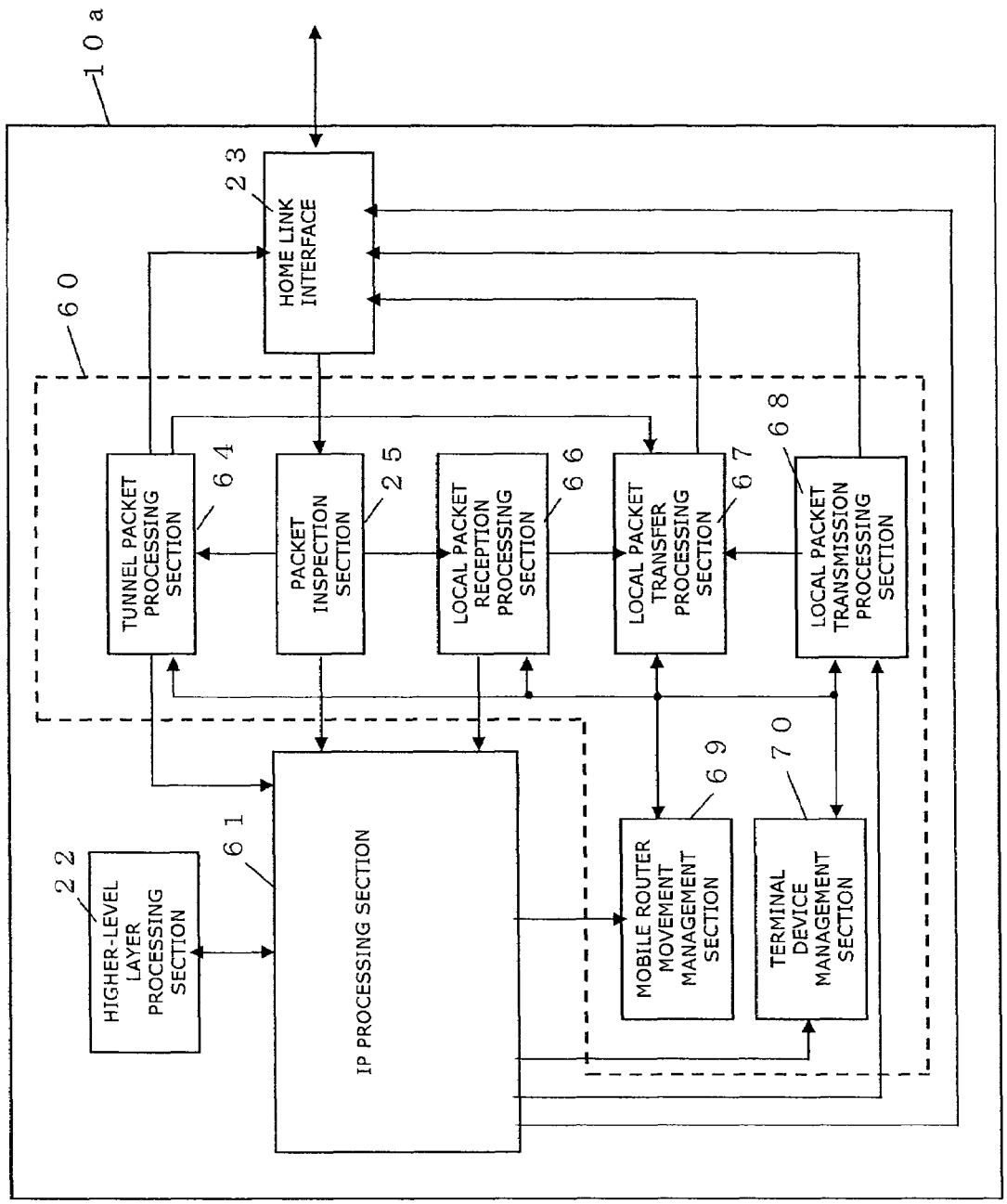
FIG. 6 is a block diagram of a different one embodiment of a home agent apparatus in a second exemplary embodiment of the invention.

FIG. 6 is a block diagram of a home agent apparatus 10a of the invention, which relates to the 2nd exemplary embodiment.

A higher-level layer processing section 22 and a home link interface 23 and a packet inspection section 25 are the same as the higher-level layer processing section 22 and the home link interface 23 and the packet inspection section 25 in FIG. 2 of the first exemplary embodiment.

Hereinafter, it will be described with a focus on a point which is different from the first exemplary embodiment.

In FIG. 6, a terminal device management section 70 is newly disposed. This terminal device management section 70 receives address information on a home link of terminal device from an IP processing section 61, or on a foreign link which is accommodated, i.e., a local scope address, and records mapping with local addresses of a mobile router and a terminal device, in a terminal device management table, and manages a location of a terminal device.

The IP processing section 61 records, in addition to processing of the IP processing section 21 of FIG. 2, addresses of respective mobile routers, and addresses of terminal devices which are accommodated in their mobile routers, in the terminal device management section 70.

The local scope processing section 60 discriminates each terminal device which is connected to each external network, by use of the terminal device management section 70, and tunnel-transfers only a necessary packet with regard to packets addressed to a local scope, between the home agent apparatus 10a and a relevant mobile router.

The tunnel packet processing section 64 uncapsulates a tunnel packet which was received from the packet inspection section 35, and gives over a packet to the IP processing section 61, in case that a destination of a packet after uncapsulation is unicast addressed to the home agent apparatus 10a itself. In addition, in case that a valid entry regarding a destination of the uncapsulated packet exists in the terminal device management section 70, and a valid binding cache of a mobile router as an accommodation destination, which is shown by the terminal device management section 70, exists in a mobile router movement management section 69, it gives over to a local packet transfer processing section 67. In this case, in case of multicast in which a destination includes even itself, a packet is duplicated and given over also to the IP processing section 61. In case that a destination of the uncapsulated packet includes an IP address of a local scope on the home link 2 other than the home agent apparatus 10a, a packet is give over to the home link interface 23.

The local packet reception processing section 66 gives over a packet to the local packet transfer processing section 67, in case that a valid entry regarding a destination of a packet which was received from the packet inspection section 25 exists in the terminal device management section 70, and a valid binding cache of an accommodation destination mobile router which is shown by the terminal device management section 70 exists in the mobile router movement management section 69. At this time, in case that a destination includes the home agent apparatus 10a itself, a packet is duplicated and given over to the IP processing section 61. In case that this condition is not satisfied, a packet is given over to the IP processing section 61.

The local packet transfer processing section 67 gives over a packet in which a tunnel header having a global address of itself as a transmission source and a care-of address as a destination, of a mobile router which accommodates a terminal device as a final destination of a packet, was added to a packet which was received from the local packet reception processing section 66, the local packet transmission processing section 68, and the tunnel packet processing section 64, to the home link interface 23. Meanwhile, in case that a destination is multicast and there is a necessity to transfer it to a plurality of mobile routers, the local packet transfer processing section 67 duplicates packets, and adds a tunnel header to them, and gives over them to the home link interface 23. In this regard, however, the local packet transfer processing section 67 does not transmits this tunnel packet to a mobile router as a transmission source, as to a packet which was received from the tunnel packet processing section 64.

In case that a destination of a packet which was received from the IP processing section 61 includes a destination of a terminal device which exists on the home link 2, the local packet transmission processing section 68 gives over a packet to the home link interface 23. In addition, in case that a valid entry regarding a destination of a packet exists in the terminal device management section 70, and a valid banding cache of a mobile router as an accommodation destination, which is shown by the terminal device management section 70, exists in the mobile router movement management section 69, it duplicates a packet, and gives it over to the local packet transfer processing section 67. In addition, in case that a destination of a packet does not exists on the home link 2, and a valid entry regarding a destination of a packet exists in the terminal device management section 70, and a valid binding cache of an accommodation destination mobile router, which is shown by the terminal device management section 70, exists in the mobile router movement management section 69, it is all right if only transmission of a tunnel packet is carried out, and therefore, a packet is given over to the local packet transfer processing section 67.

Here, a terminal device management table will be described.

FIG. 7 shows one example of the terminal device management table of the terminal device management section 70. In this terminal device management table, the terminal device management section 70 makes mapping of addresses of plural mobile routers, and addresses of terminal devices which are accommodated in each mobile router, and records it. A home address (HoA) 701 of a mobile router is an unchanged IP address of a global scope which is held in each mobile router, respectively. A network prefix of this is the same value as the network prefix of the home link 2. A terminal device address 702 is a local scope address of each terminal device. In the example of this terminal device management table, the home agent apparatus 10a is to know that, as a local scope, three pieces of mobile routers have moved to an external network, and two pieces of terminal devices are coupled to a first mobile router, and one piece of a terminal device is coupled to remaining mobile routers, respectively.

Meanwhile, in FIG. 6, the mobile router movement management section 69 is separated from the terminal device management section 70, but it is possible to integrate them as one, if similar information is stored therein.

An operation, and a function of the home agent apparatus 1a which was configured as above will be hereinafter described.

Firstly, as to stand-by processing (basic state), local transmission processing (step S14) is different from the first exemplary embodiment shown in FIG. 10A.

Figure 17:
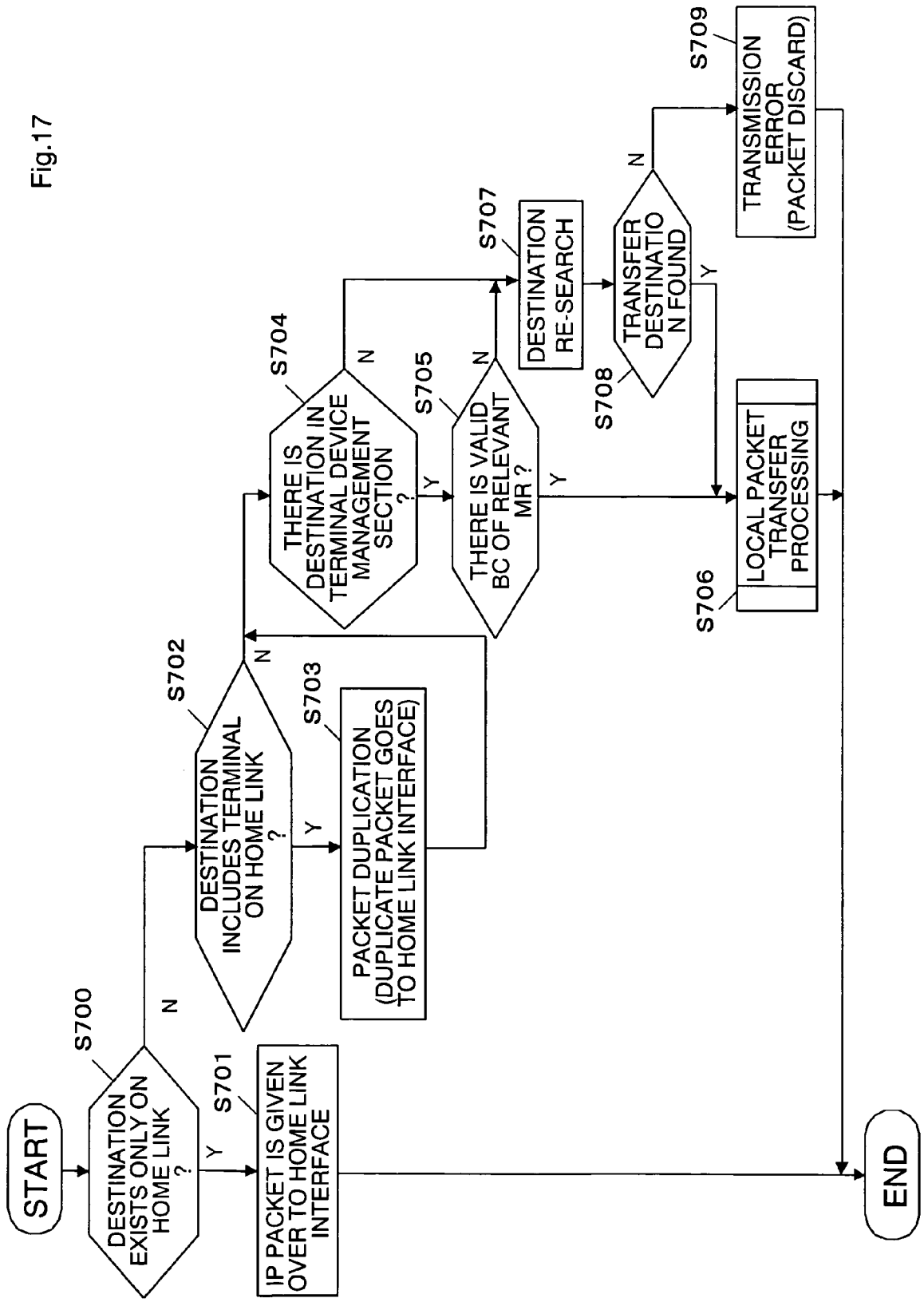
FIG. 17 is a flow chart of a processing procedure in the embodiment 2 of the invention.

FIG. 17 is a flow chart which shows an operation of this local transmission processing (step S14).

Firstly, the local packet transmission processing section 68 judges whether a destination of the packet is only a destination of a terminal device on the home link 2 or not (step S700). In case that it is only a destination of a terminal device on the home link 2, the local packet transmission processing section 68 gives over a packet to the home link interface 23, and sends it out on the home link 2 (step S701). On one hand, in case that it is not a destination only of a terminal device on the home link 2, i.e., in case that it is only a destination of a terminal device on one other than the home link 2, or includes a destination of a terminal device on one other than the home link 2, the local packet transmission processing section 68 judges whether a destination of a terminal device on the home link 2 is included or not (step S702). In case that a destination of a terminal device on the home link 2 is included, a packet is duplicated, and a duplicate packet is given over to the home link interface 23, and sent out on the home link 2 (step S703), and then, it proceeds on to a step S704.

In case that a destination of a terminal device on the home link 2 is not included, the local packet transmission processing section 68 investigate a terminal device management table of the terminal device management section 70, and judges whether a destination is recorded in this terminal device management table or not (step S704).

Figure 19A:
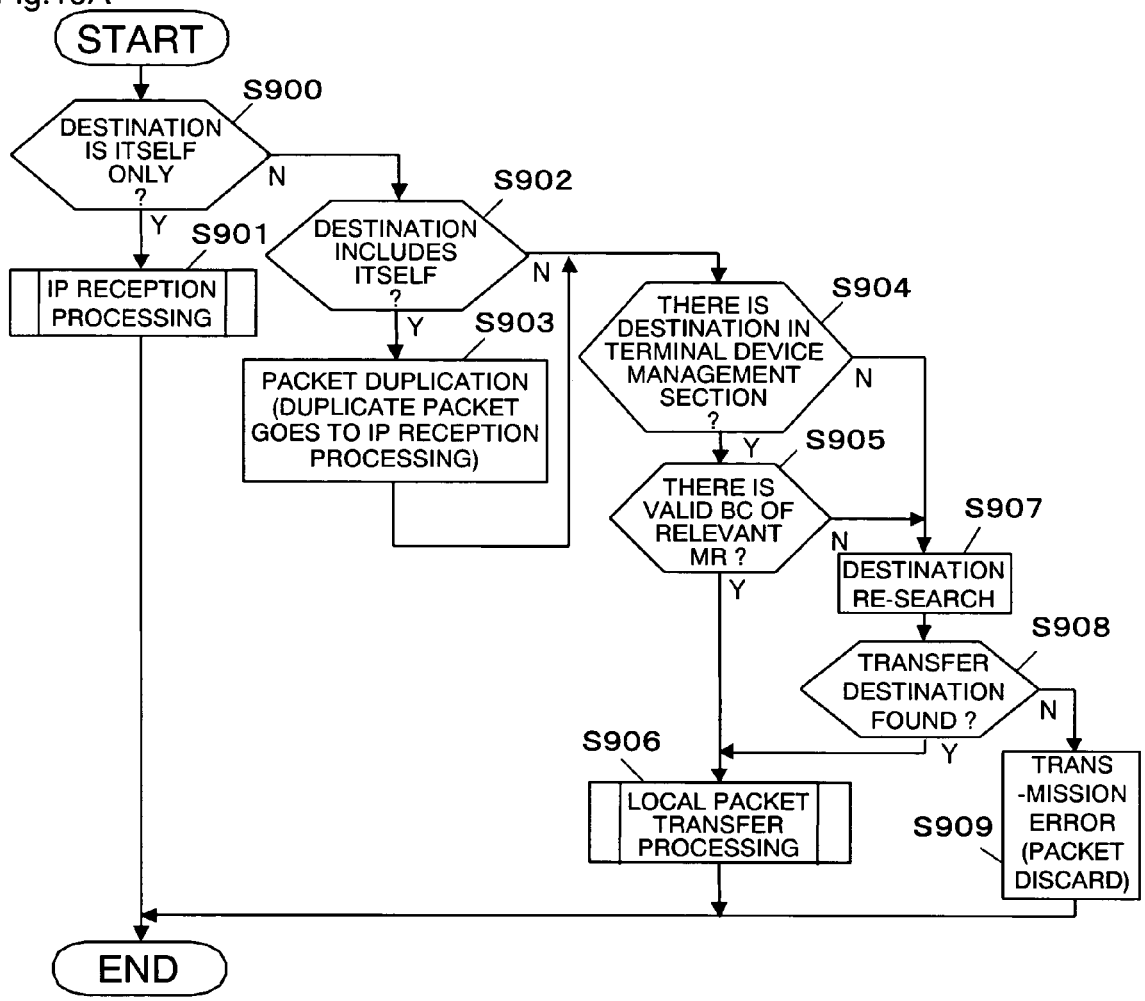
FIGS. 19A, B are flow charts of processing procedures in the second exemplary embodiment of the invention.

In case that a destination is recorded in the terminal device management table, it is judged whether a valid binding cache (BC) of a relevant mobile router exits on the mobile router movement management table of the mobile router movement management section 69 (step S705). In case that it exists in the mobile router movement management table, local packet transfer processing, which will be described later in FIG. 19A, is carried out (step S706).

On one hand, in the step S704, in case that a destination of a packet is not recorded in the terminal device management table of the terminal device management section 70, and in the step S705, in case that a destination of a packet is recorded in a table for use in terminal device management, of the terminal device management section 70, but a valid binding cache (BC) of a relevant mobile router does not exits in the mobile router movement management table of the mobile router movement management section 69, it is re-searched whether a destination address exist in some kind of an external network and a foreign link (step S707). As a result of this re-search, in case that a transfer destination is revealed, local packet transfer processing, which will be described later, is carried out (step S708).

On one hand, in case that a transfer destination is not revealed, it is deemed that some kind of an error is occurring, and the relevant packet is discarded. And, according to need, an error message is issued (step S709).

What was described above is an operation of local transmission processing which is carried out by the local packet transmission processing section 68.

Next, an operation of tunnel processing S17, which is carried out in packet inspection processing S11, will be described.

Figure 18:
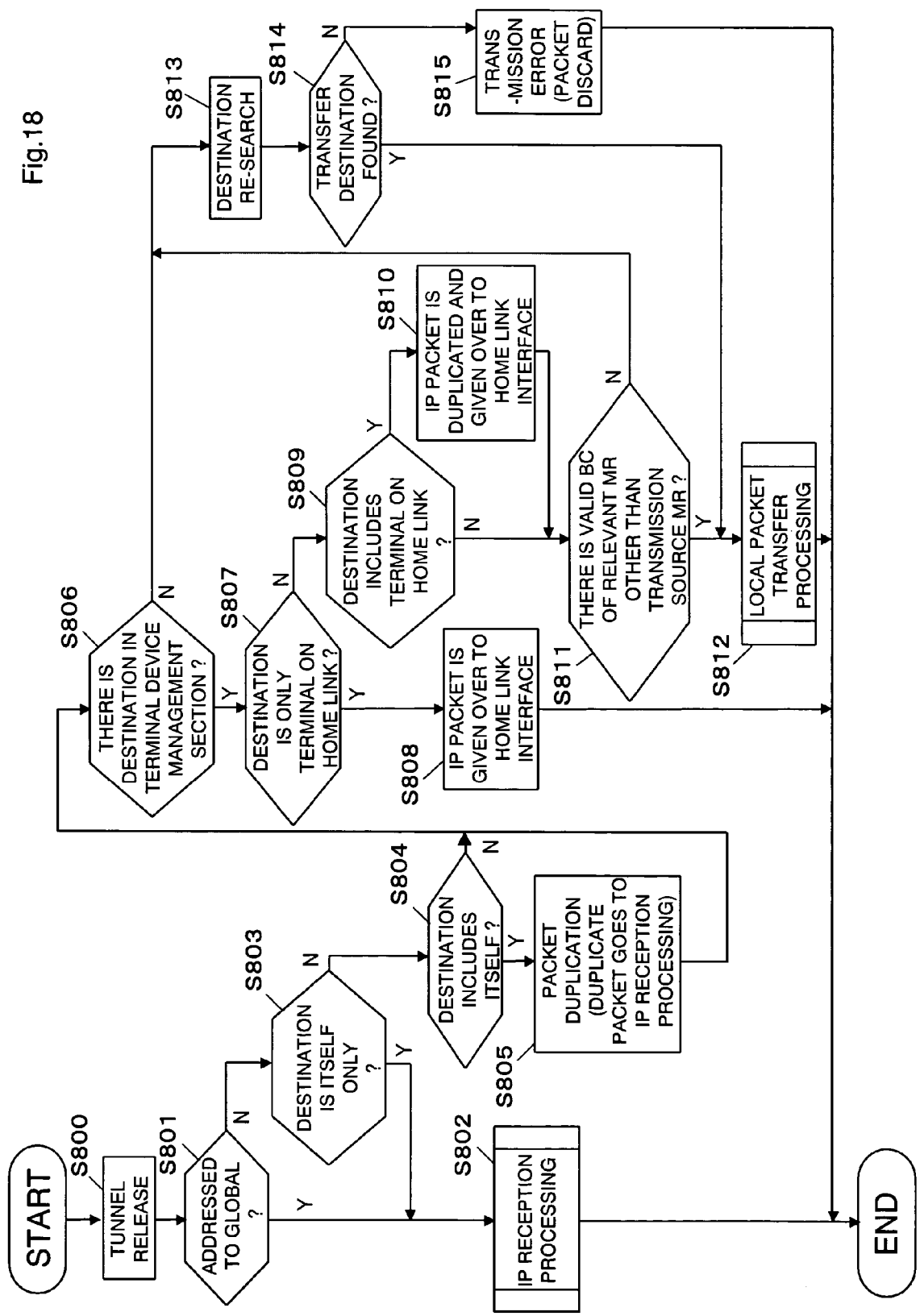
FIG. 18 is a flow chart of a processing procedure in the second exemplary embodiment of the invention.

FIG. 18 is a flow chart which shows an operation of the tunnel processing.

Firstly, the tunnel packet processing section 64 deletes a tunnel header of a tunnel packet which was received, and uncapsulates a tunnel format (step S800).

Next, the tunnel packet processing section 64 judges whether a destination of the uncapsulated packet is a global address or not (step S801). If a destination is a global address, the IP processing section 61 carries out IP reception processing (step S802).

In case that a destination is not a global address, i.e., in case that it is a local scope, the tunnel packet processing section 64 judges whether a destination is the home agent apparatus 10a itself only (step S803). If a destination is the home agent apparatus 10a itself only, it proceeds on to the step S802. Here, the IP processing section 61 carries out reception processing of a packet with a local address destination of itself.

On one hand, in case that a destination of a received packet is not the home agent apparatus 10a itself only, i.e., it is a packet of unicast and multicast with a local scope destination other than itself, or a packet of multicast including itself and a destination of another local scope, the tunnel packet processing section 64 judges whether itself is included in a destination or not (step S804). If itself is included in a destination, the tunnel packet processing section 64 duplicates a packet, and IP-reception-processes the duplicated packet (step S805), and it proceeds on to a step S806.

In case that a destination of a received packet does not includes itself, the tunnel packet processing section 64 judges whether a destination address is described in the terminal device management table in the terminal device management section 70 or not (step S806). In case that it is recorded in the terminal device management table, the tunnel packet processing section 64 judges whether a destination address is a terminal device only on the home link 2 or not (step S807). Here, in case that it is a terminal device only on the home link 2, it gives over a packet to the home link interface 23, and the home link interface 23 sends it out on the home link 2 (step S808). Even in case of multicast addressed to a plurality of terminal devices on the home link 2, it is processed by transmission of one packet.

On one hand, in the step S807, in case that a destination is not a terminal device only on the home link 2, it is judged whether a terminal device on the home link 2 is included or not (step S809). In case that a terminal device on the home link 2 is included, a packet is duplicated, and the duplicate packet is give over to the home link interface 23, and sent out on the home link 2 (step S810).

In case that a terminal device on the home link 2 is not included, i.e., in case that a destination is a terminal device only which does not exist on the home link 2, the tunnel packet processing section 64 judges whether an address of a mobile router which is accommodating terminal devices described in the terminal device management table of the terminal device management section 70, other than a transmission source mobile router, exists in the mobile router movement management table (binding cache) or not (step S811). If it exits in the mobile router movement management table, the tunnel packet processing section 64 carries out local packet transfer processing which will be described later in FIG. 19B, to a packet (step S812).

On one hand, in case that it does not exist in the mobile router movement management table, it means that a packet is tunnel-transferred to a terminal device as to which the home agent apparatus 10*a* does not recognize that it exits on the home link 2 and on the foreign link 5. The such like state is assumed to be, for example, such a state that a terminal device is in midstream of movement, and has not yet been connected to a mobile router 15*a*. Consequently, the tunnel packet processing section 64 re-searches whether a destination exits in some kind of an external network and a foreign link (step S813).

As a result of re-search, the tunnel packet processing section 64 judges whether a transfer destination was revealed or not (step S814), and in case that a transfer destination was found, carries out local packet transfer processing which will be described later (step S812). In case that a transfer destination is not found even if search is continued for predetermined time, the tunnel packet processing section 64 regards that some kind of an error is occurring, and discards the relevant packet, and issues an error message according to need (step S815).

What was described above is an operation of tunnel processing.

Next, local reception processing will be described.

FIG. 19A is a flow chart which shows a procedure of local reception processing (step S19).

Firstly, the local packet reception processing section 66 judges whether a destination is itself only or not (step S900). If a destination is itself only, it carries out IP reception processing (step S901). Here, it reception-processes a packet with a local scope address destination of itself.

In case that a destination is not itself only, i.e., includes a local scope address destination other than itself, the local packet reception processing section 66 judges whether an address of the home agent apparatus 10*a* itself is included or not (step S902). In case that an address of the home agent apparatus 10*a* itself is included, it duplicates a packet and carries out IP reception processing (step S903), and it proceeds on to a step S904. In case that an address of the home agent apparatus 10*a* itself is not included, the local packet reception processing section 66 investigates a table (see, FIG. 7) for use in terminal device management, of the terminal device management section 70, and judges whether a destination is recorded in the table or not (step S904).

In case that a destination is recorded in the table, the local packet reception processing section 66 judges whether a valid binding cache (BC) of a relevant mobile router exists in the mobile router movement management table of the mobile router movement management section 69 or not (step S905). In case that it exits in the mobile router movement management table, it carries out local packet transfer processing which will be described later in FIG. 19B (step S906).

On one hand, in the step S904, in case that a destination is not recorded in the table, i.e., in case that a destination of a packet is not recorded in the terminal device management table of the terminal device management section 70, and in the step S905, in case that it does not exist in the mobile router movement management table, i.e., in case that a destination of a packet is recorded in the terminal device management table of the terminal device management section 70 but a valid binding cache (BC) of a relevant mobile router does not exist in the mobile router movement management table of the mobile router movement management section 69, it proceeds on to a step S907.

In the step S907, the local packet reception processing section 66 re-searches whether a destination exists in some kind of an external network and a foreign link or not. As a result of re-search, it is judged whether a transfer destination has been revealed or not (step S908), and in case that a transfer destination has been found, the local packet reception processing section 66 carries out local packet transfer processing which will be described later (step S906). In case that a transfer destination has not been found, the local packet reception processing section 66 regards that some kind of an error is occurring, and discards the relevant packet (step S909). And, it issues an error message according to need.

What was described above is an operation of local reception processing.

Figure 19B:
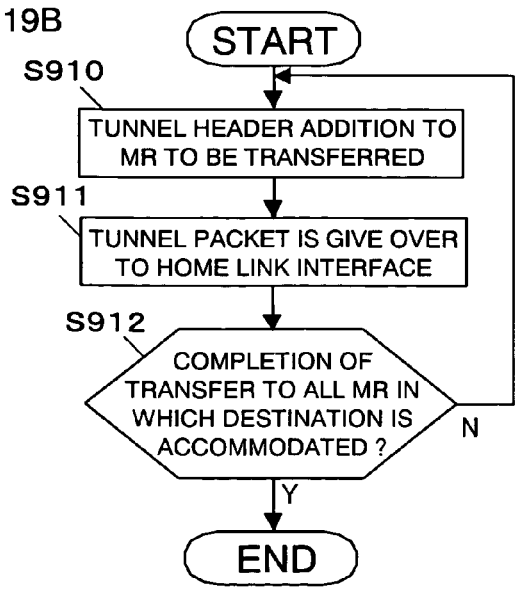

Next, local packet transfer processing will be described. FIG. 19B is a flow chart which shows a procedure of local packet transfer processing.

Firstly, the local packet transfer processing section 67 adds a tunnel header at a mobile router (MR) destination to which transfer is carried out (step S910). On that account, the local packet transfer processing section 67 refers to the mobile router movement management table, and investigates whether an address of a mobile router other than a mobile router as a transmission source, to which transfer should be carried out, is recorded in the table. And, in case that it is recorded, the local packet transfer processing section 67 adopts its care-of address as a global address of a transmission destination, and prepares a tunnel packet.

Next, the local packet transfer processing section 67 gives over the prepared tunnel packet, to the home link interface 23 (step S911). The home link interface 23 sends out a packet to the home link 2, and the home gateway 11 sends it out to Internet 3.

Next, the local packet transfer processing section 67 judges whether tunnel transfer to all mobile router other than a transmission source, to which transfer should be carried out, was completed or not (step S912). That is, it judges whether a mobile router of non-transmission disappears or not, among mobile routers to which transfer should be carried out, out of those described in the mobile router movement management table, and repeats processing of the step S910 and the step S911 until a mobile router of non-transmission disappears. Although it is not shown in the figure, the local packet transfer processing section 67 refers to the mobile router movement management table, and investigates whether an address of one other than a mobile router as a transmission source is recorded in the table or not, and in case that it is not recorded, skips processing of tunnel transfer, among the steps S910 through S912.

Next, a mobile router in this 2nd exemplary embodiment will be described.

Figure 8:
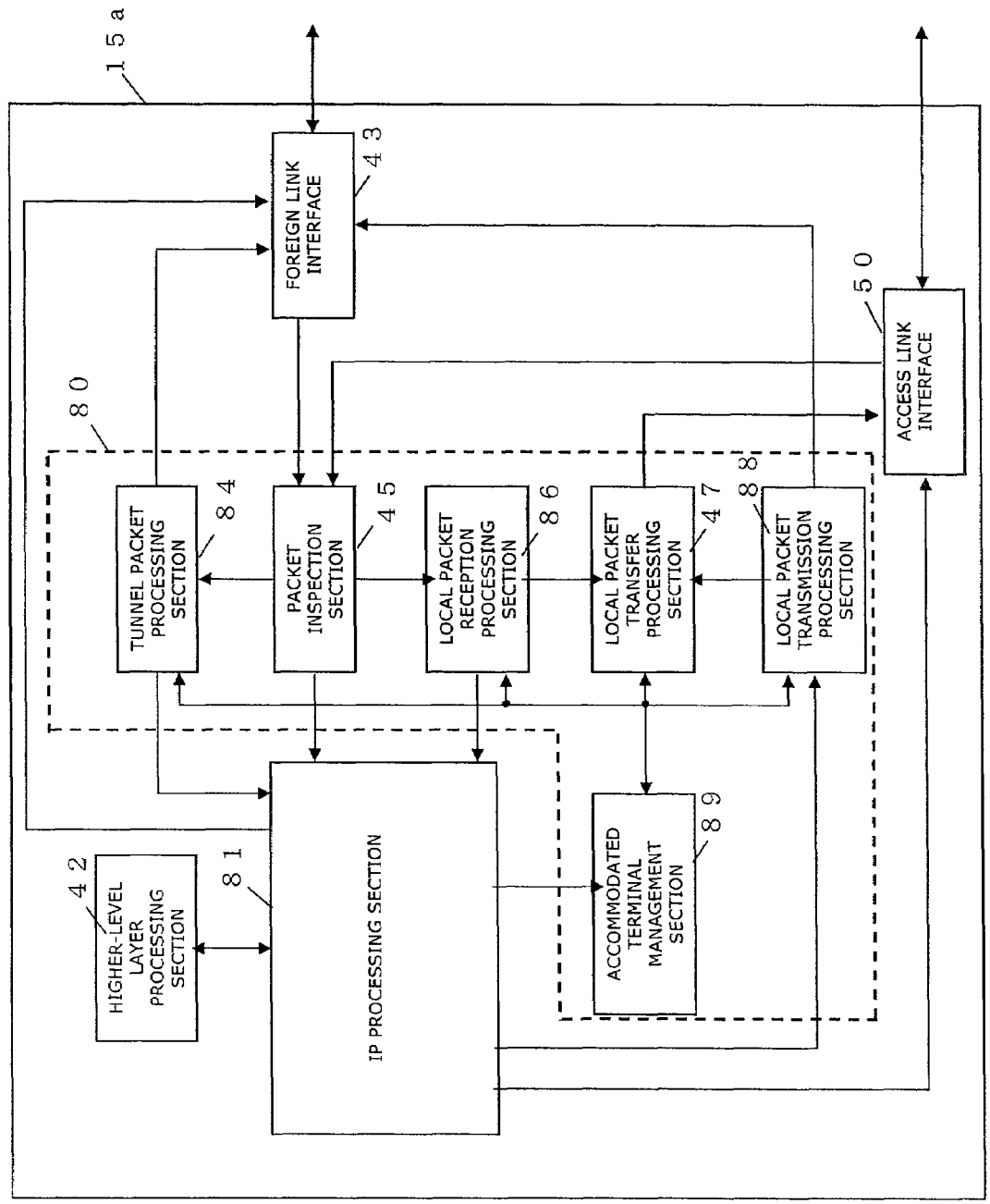
FIG. 8 is a block diagram of a mobile router in the second exemplary embodiment of the invention.

FIG. 8 shows a configuration of a mobile router 15*a*.

In FIG. 8, a higher-level layer processing section 42, a foreign link interface 43, a packet inspection section 45, a local packet transfer processing section 47, and an access link interface 50 carry out the same processing as the higher-level layer processing section 42, the foreign link interface 43, the packet inspection section 45, the local packet transfer processing section 47, and the access link interface 50, which were described in FIG. 4.

Hereinafter, it will be described with a focus on a point which is different from the mobile router of the first exemplary embodiment.

An accommodated terminal management section 89 is a thing which was additionally disposed, and goes along with an IP processing section 81, and carries out processing for recording a local address of a terminal device which is accommodated by the mobile router 15*a* itself, in an accommodated terminal table.

The IP processing section 81, in addition to the processing operation which was explained in the IP processing section 41, carries out also processing for recording an address of a terminal device which is accommodated by the mobile router 15a, in the accommodated terminal management section 89.

A local scope processing section 80 further provide the above-described accommodated terminal management section 89, and discriminates a terminal device which is accommodated by the mobile router 15a itself, and carries out tunnel transfer of a packet with a local scope destination to a terminal device which is not currently accommodated in itself but is an object for management, between the home agent apparatus 10a and the mobile router 15a.

A tunnel packet processing section 84 uncapsulates a tunnel packet which was received from the packet inspection section 45, and in case that a destination of a packet after uncapsulation is unicast addressed to itself, gives over a packet to the IP processing section 81. In addition, in case that a valid entry regarding a destination of a packet after uncapsulation exists in the accommodated terminal management section 89, it carries out processing for giving over a packet to the foreign link interface 43. At this time, in case that a destination includes itself, it duplicates a packet and gives it over also to the IP processing section 81. Even in case that the above-described any kind of conditions are not satisfied, it gives over a packet to the IP processing section 81.

In case that a destination of a packet which was received from the packet inspection section 45 is a terminal device which is not recorded in the accommodated terminal management section 89, a local packet reception processing section 86 gives over a packet to the local packet transfer processing section 47. At this time, in case that a destination of a packet includes itself, it duplicates a packet and gives it over also to the IP processing section 81. On one hand, in case that it is addressed to a terminal device which is recorded in the accommodated terminal management section 89, it gives over a packet to the IP processing section 81.

In case that a destination of a packet which was received from the IP processing section 81 is a terminal only which is recorded in the accommodated terminal management section 89, a local packet transmission processing section 88 gives over a packet to the foreign link interface 43. In addition, the local packet transmission processing section 88, in case that a destination includes a terminal which is not recorded in the accommodated terminal management section 89 and a terminal device which is not recorded therein, duplicates a packet and gives it over to the foreign link interface 43 and the local packet transfer processing section 47, and in case that a destination is a terminal device only which is not recorded in the accommodated terminal management section 89, gives over a packet to the local packet transfer processing section 47.

Here, an accommodated terminal table will be described.

FIG. 9 shows one example of the accommodated terminal table which is in the accommodated terminal management section 89. In a terminal device address 901, a local address of a terminal device is recorded, and it is possible to discriminate a terminal which is accommodated in itself.

Next, a processing procedure, which is carried out by the mobile router 15a, will be described by use of FIGS. 20 through 22. Meanwhile, with regard to stand-by processing (basic state), it is identical to one shown in FIG. 10A. In addition, subsequent IP reception processing carries out normal IP reception processing such as reception processing of a packet addressed to a mobile router itself, routing processing, packet discard, Mobile Ipv6 packet reception processing, and transfer processing.

Figure 20:
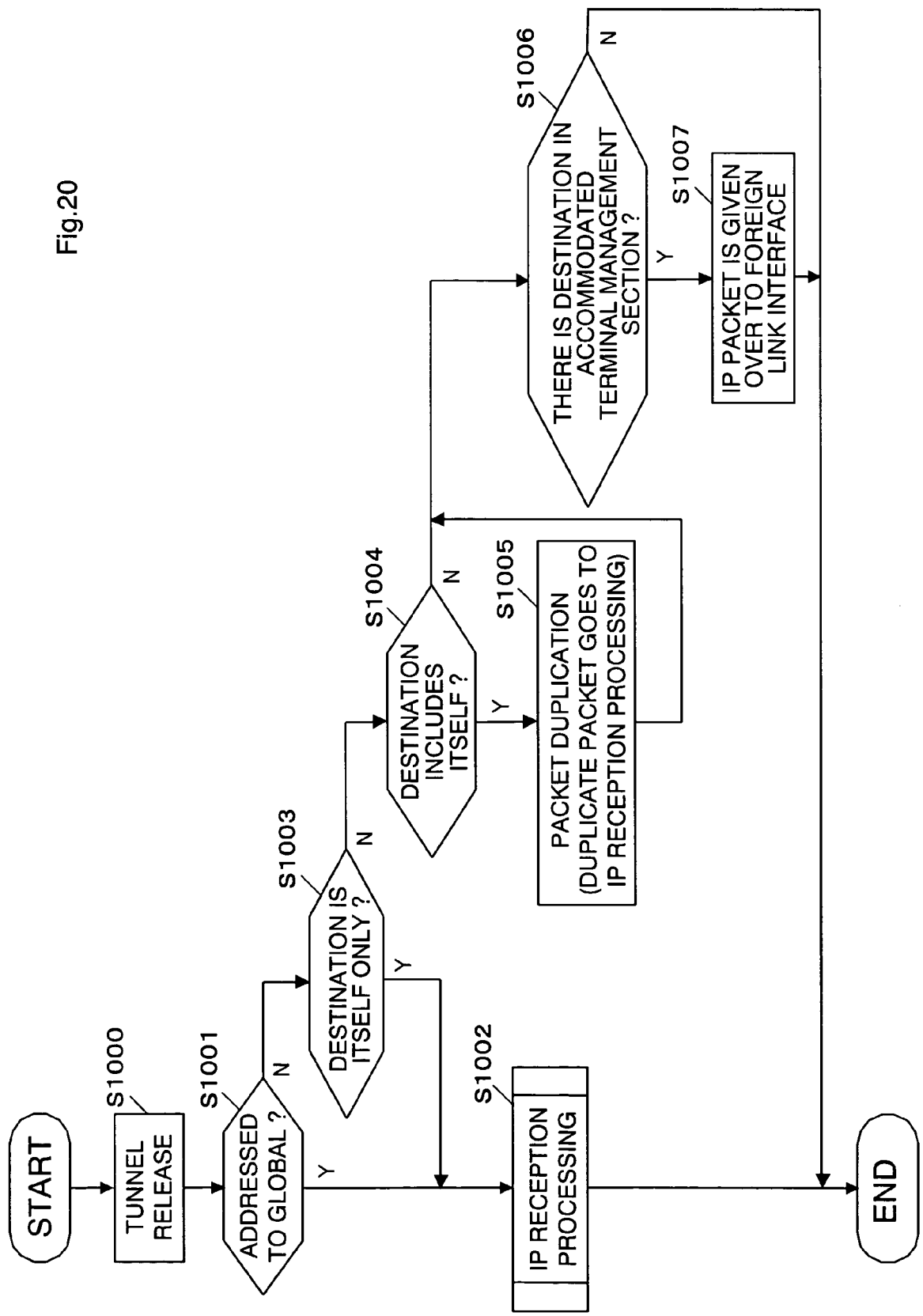
FIG. 20 is a flow chart of a processing procedure in the second exemplary embodiment of the invention.

FIG. 20 is a flow chart which shows tunnel processing (step S402) in stand-by processing (basic state).

In FIG. 20, firstly, the tunnel packet processing section 84 carries out uncapsulation of a tunnel packet (step S1000). That is, it deletes a tunnel header portion of a packet, and enables to refer to an original transmission address and a destination address which exist in the packet.

Next, the tunnel packet processing section 84 judges whether a destination address is a global scope address or not (step S1001). In case that a destination address is a global scope address, the IP processing section 81 carries out IP reception processing (step S1002).

In this IP reception processing, in case of a global scope address destination of the mobile router 15a itself, the IP processing section 81 carries out reception processing by itself, and in case of a global scope address destination of another equipment, it gives over a received packet to the foreign link interface 43, according to need, in accordance with a routing table in the IP processing section 81.

On one hand, in case that a destination address is not a global scope address, i.e., in case of a local scope address, the tunnel packet processing section 84 judges whether a destination is the mobile router 15a itself or not (step S1003). In case that a destination is the mobile router 15a itself only, it proceeds on to the step S1002.

In the step S1003, in case that a destination is not the mobile router 15a itself only, i.e., in case that it is a local scope address destination, and it is not only a destination of the mobile router 15a itself, the tunnel packet processing section 84 judges whether a destination of the mobile router 15a itself is included or not (step S1004). In case that a destination of the mobile router 15a itself is included, the tunnel packet processing section 84 duplicates a packet, and IP-reception-processes the duplicate packet and processes it by itself, and proceeds on to a step S1006.

In case that a destination of the mobile router 15a itself is not included, or it is only a destination other than the mobile router 15a itself, or multicast which doesn't include the mobile router 15a, the tunnel packet processing section 84 judges whether a destination of this packet is recorded in the accommodated terminal table of the accommodated terminal management section 89 or not (step S1006). And, in case that a destination of this packet is recorded in the accommodated terminal table, it gives over a packet to the foreign link interface 43, and sends it out to the foreign link 5 (step S1007). A terminal device on the foreign link 5 receives a packet which addressed to itself (in case that a destination is a local address of itself or local multicast address included itself).

On one hand, in the step S1006, in case that a destination of this packet is not recorded in the accommodated terminal table, it means that a terminal device, which corresponds to a destination address, is not connected on the foreign link 5 which is managed by the mobile router 15a, and therefore, transmission of a packet is not carried out and is discarded. Meanwhile, in this case, it is all right if the tunnel packet processing section 84 transmits an error message to the home agent apparatus 10, together with discard of a packet.

What was described above is an operation explanation of tunnel processing.

Next, local reception processing (step S405) in packet inspection processing described in FIG. 14A will be described.

Figure 21:
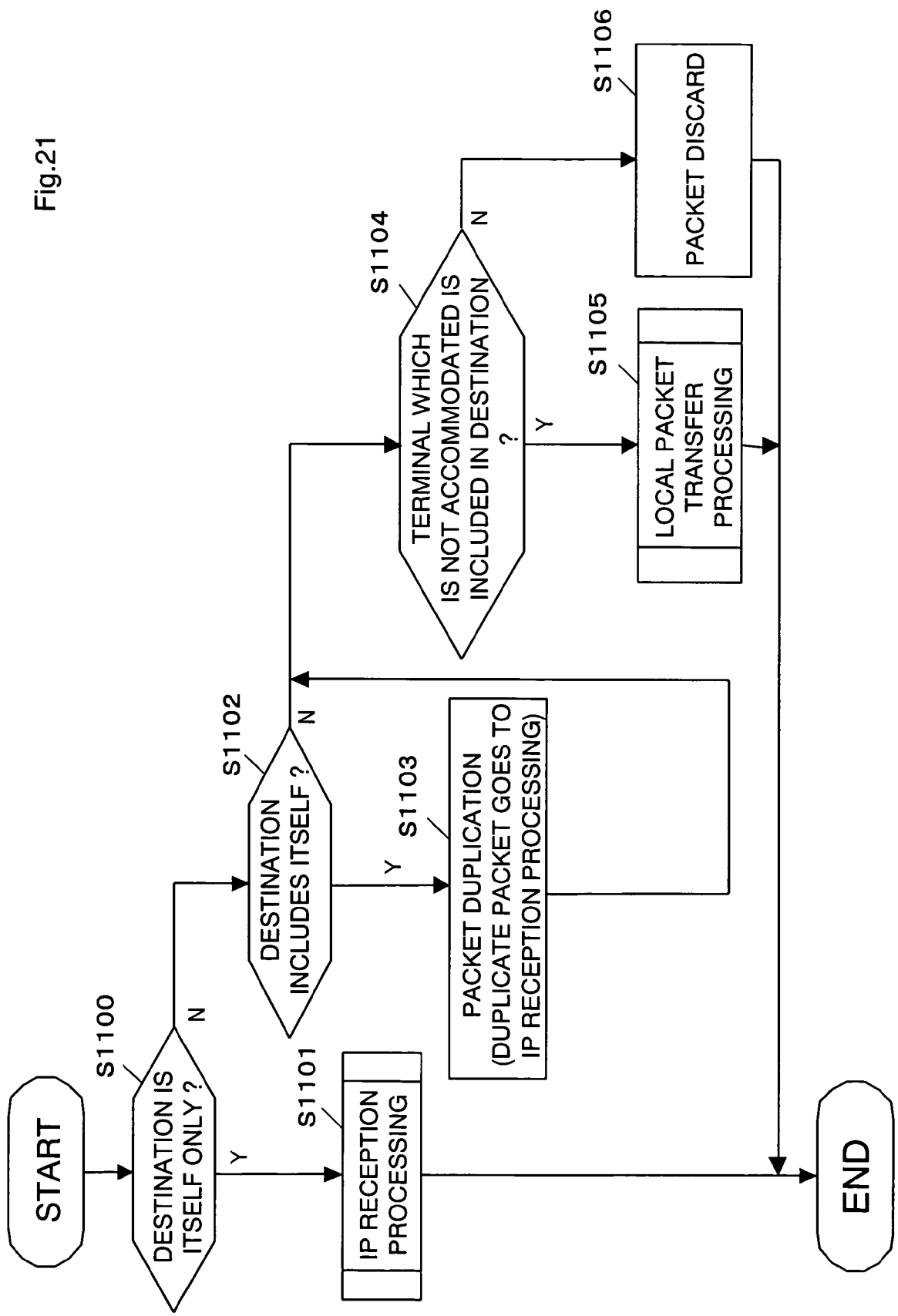
FIG. 21 is a flow chart of a processing procedure in the second exemplary embodiment of the invention.

FIG. 21 is a flow chart which shows an operation of local reception processing (step S405).

In this local reception processing, processing of apacket with a local scope address destination, which was received from the foreign link 5, is carried out.

Firstly, the local packet reception processing section 86 judges whether a destination of a packet is the mobile router 15a itself only or not (step S1100). In case that a destination is the mobile router 15a itself only, the IP processing section 81 carries out IP reception processing (step S1101). Here, a packet addressed to the mobile router 15a from a terminal device on the foreign link 5 is reception-processed.

In case that a destination is not the mobile router 15a itself only, i.e., in case that a destination includes a destination other than the mobile router 15a itself, the local packet reception processing section 86 judges whether a destination of the mobile router 15a itself is included or not (step S1102), and in case that a destination of the mobile router 15a itself is included, it duplicates a packet, and IP-reception-processes the duplicate packet (step S1103). After that, it proceeds on to a step S1104.

On one hand, in case that a destination of the mobile router 15a itself is not included, the local packet reception processing section 86 carries out local packet transfer processing which corresponded to a destination other than itself.

Next, the local packet reception processing section 86 judges whether a destination of a received packet includes a terminal which is not accommodated in itself or not (step S1104). In case that a terminal, which is not accommodated in the mobile router 15a itself, is included, i.e., in case that a destination of this packet is not recorded in the accommodated terminal table of the accommodated terminal management section 89, the local packet reception processing section 86 carries out local packet transfer processing (step S1105).

On one hand, in case that all of destinations of received packets are terminal devices which are accommodated in the mobile router 15a itself, the packets have been already sent out on the foreign link 5, and the relevant terminal device receives them, and therefore, the packets are discarded without carrying out transmission of the packets (step S1106).

Meanwhile, the above-described local packet transfer processing (step S1105) is identical to one in the first exemplary embodiment.

Next, an operation of local transmission processing (step S14) in stand-by processing (basic state) will be hereinafter described.

Figure 22:
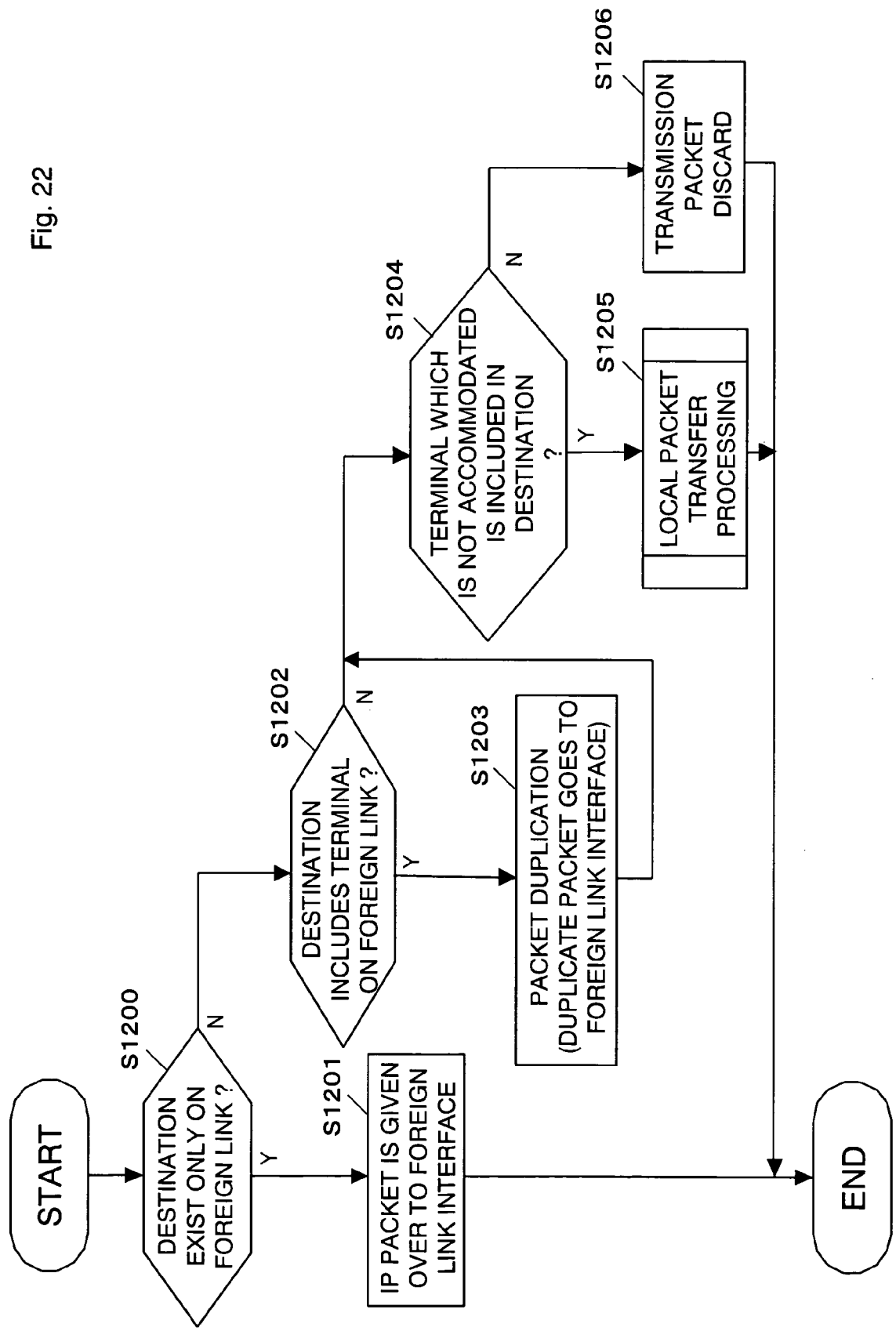
FIG. 22 is a flow chart of a processing procedure in the second exemplary embodiment of the invention.

FIG. 22 is a flow chart which shows an operation of local transmission processing.

Firstly, in case that a transmission packet is generated in an inside of the mobile router 15a, the local packet transmission processing section 88 investigates the accommodated terminal table of the accommodated terminal management section 89, and judges whether a destination is a terminal device only, which exists on the foreign link 5 (step S1200). In case that a destination exists on the foreign link 5, it gives over a packet to the foreign link interface 43, and sends it out on the foreign link 5 (step S1201). In case that a destination does not exist on the foreign link 5, the local packet transmission processing section 88 judges, with reference to the accommodated terminal table, whether a destination includes a terminal device on the foreign link 5 or not (step S1202). In case that a destination includes a terminal device on the foreign link 5, the local packet transmission processing section 88 duplicates a packet and gives it over to the foreign link interface 43, and sends it out on the foreign link 5 (step S1203). After that, it proceeds on to a step S1204.

On one hand, in case that a destination does not include a terminal device on the foreign link 5, it carries out local packet transfer processing which corresponded to a destination other than a terminal device on the foreign link 5. That is, the local packet transmission processing section 88 judges whether a destination of a transmission packet includes a terminal which is not accommodated in itself or not (step S1204). In case that it includes a terminal which is not accommodated, i.e., in case that a destination of this packet is not recorded in the accommodated terminal table of the accommodated terminal management section 89, it carries out local packet transfer processing (step S1205). On one hand, in case that it does not includes a terminal which is not accommodated, it means that transmission to the foreign link 5 has been already finished, and therefore, a packet is discarded without carrying out transmission of a packet (step S1206).

Meanwhile, the home agent apparatus 10 and the home gateway 11 were shown in the figure as different devices, respectively, but it is possible to integrate them as one device, by making the home gateway hold a home agent function.

As above, in this embodiment, the home agent apparatus 10 manages terminal devices on the home link 2 of itself, or the mobile router 15 manages terminal devices on the foreign link 5 of itself, and therefore, the home agent apparatus and the mobile router receive only a packet addressed to a terminal device which is managed by itself, among received packets addressed to terminal devices, and does not transfer a packet addressed to a terminal device which is not managed by itself even if it received it. By this, a home agent apparatus and a mobile router do not carry out useless packet transmission, onto a network of itself. In this manner, a home agent apparatus, and a mobile router does not need to make transmission to a terminal device of a destination to which transmission is unnecessary, by using address information of terminal devices which are accommodated in itself. In addition, a home agent apparatus is to carry out communication of a packet only to a terminal device of a destination, by managing information of terminal devices which are accommodated in a mobile router, and it is possible to reduce transmission of useless packets to be discarded. In this manner, according to the invention, it is possible to reduce useless transmission processing, reception processing at each node of a communication network, and further to prevent generation of congestion of communication.

In addition, as an intermediate mode of the first exemplary embodiment and this embodiment, it is all right even if the following is realized. It is designed in such a manner that the home agent apparatus 10a manages only an address of a terminal device which exists in an external network, in the terminal device management table of the terminal device management section 70, and does not manage as to correspondence with a mobile router to which a terminal device belongs. Even in case of the such like terminal device management table, the home agent apparatus 10a is not required to make transmission onto the home link 2, in case that a destination of a received packet from a certain external network does not include a destination of a terminal device on the home link 2, and therefore, it is possible to reduce useless transmission. Further, it is also possible to prevent transmission of a packet addressed to a terminal device which is not connected, in midstream of movement to an external network.

In addition, it was designed in such a manner that, in case that a packet addressed to a terminal device which does not exist in the terminal device management table, destination re-search is carried out, but in lieu of this, assuming that a terminal device of a destination exists somewhere, it may be designed in such a manner that tunnel transfer is carried out to a mobile router other than a transmission source mobile router among mobile routers which are managed by the mobile router movement management table. In case that a terminal device of a destination does not exist in any kind of a foreign link, a packet is not received.

Meanwhile, in this embodiment, the home agent apparatus 10a, and the mobile router 15a, in case that they received a packet for which itself is a transmission source, by itself, discards this packet in general, since there is such a possibility that an equipment at a transmission destination receives it again, if this is re-transmitted. In this regard, however, in case that an equipment at a transmission destination has not yet received, a packet circulates in a network, and therefore, it is not limited to this in such a system that a transmission source itself receives a packet which was sent out, again.

In addition, in the flow charts of this embodiment, in packet duplication processing in the steps S703, S805, S903, S1005, S1103, and S1203, IP reception processing to a duplicated packet, processing for giving it over to a home link interface, or processing for giving it over to a foreign link interface, etc. may be carried out in parallel with next processing which is continuous with the above-described each step.

3rd Exemplary Embodiment

Next, in the network configuration shown in FIG. 1, a neighbor discovery method, in which the home agent apparatus 10 manages a location and movement of the mobile router 15, and a location and movement of a terminal device, and the mobile router 15 manages a terminal device which is accommodated on a foreign link of itself, and notifies to the home agent apparatus 10a, will be described. Meanwhile, the home agent apparatus 10 and the mobile router 15 of this embodiment have the functions which have been described in the 2nd exemplary embodiment.

(1) Firstly, since the mobile router 15 operates the terminal devices 12, 13 on the home network, and the terminal device 14 on the external network on the assumption that they exist virtually on a private network, it captures a neighbor advertisement packet generated by the terminal device 14 which is accommodated in the mobile router 15 on the external network, and adds a connection identifier (H flag which will be described later) which shows that it is connected to an external network, to neighbor terminal device information, i.e., an address of a terminal device, and transmits it as a tunnel packet, to the home agent apparatus 10. And, the home agent apparatus 10 receives this, and stores the obtained information, in the terminal device management table of the terminal device management section 70. Meanwhile, the connection identifier is a thing which shows, to which of a home agent apparatus and a mobile router, a terminal device is connected. In addition, the neighbor terminal information means address information of a terminal device which is connected to a home network, an external network etc.

FIG. 23 is a sequence diagram which shows a procedure of neighbor discovery at this time.

Firstly, a terminal device (LFN) which moved onto a foreign link carries out neighbor discovery, normally by using a neighbor advertisement message which is used in Ipv6 (step S2301).

Next, a mobile router MR captures a neighbor advertisement message which is transmitted from a terminal device, and as described later, described predetermined information in the neighbor advertisement message and caries out neighbor advertisement (step S2303). The mobile router MR prepares a neighbor cache (neighbor cache, in which a terminal device address value in the accommodated terminal table is recorded, means an address of a terminal device in the terminal device management table, and the accommodated terminal table) in the accommodated terminal table of itself, and thereby, updates the accommodated terminal table (step S2302).

Next, the mobile router MR changes the neighbor advertisement message to a tunnel packet, and carries out neighbor advertisement tunnel transfer, to the home agent apparatus (step S2304).

Next, the home agent apparatus adds a neighbor cache of a terminal device to the terminal device management table of the terminal device management section 70, in accordance with the received neighbor advertisement message, and updates the terminal device management table (step S2305).

Here, the neighbor advertisement message will be described.

Figures 24A, 24B:
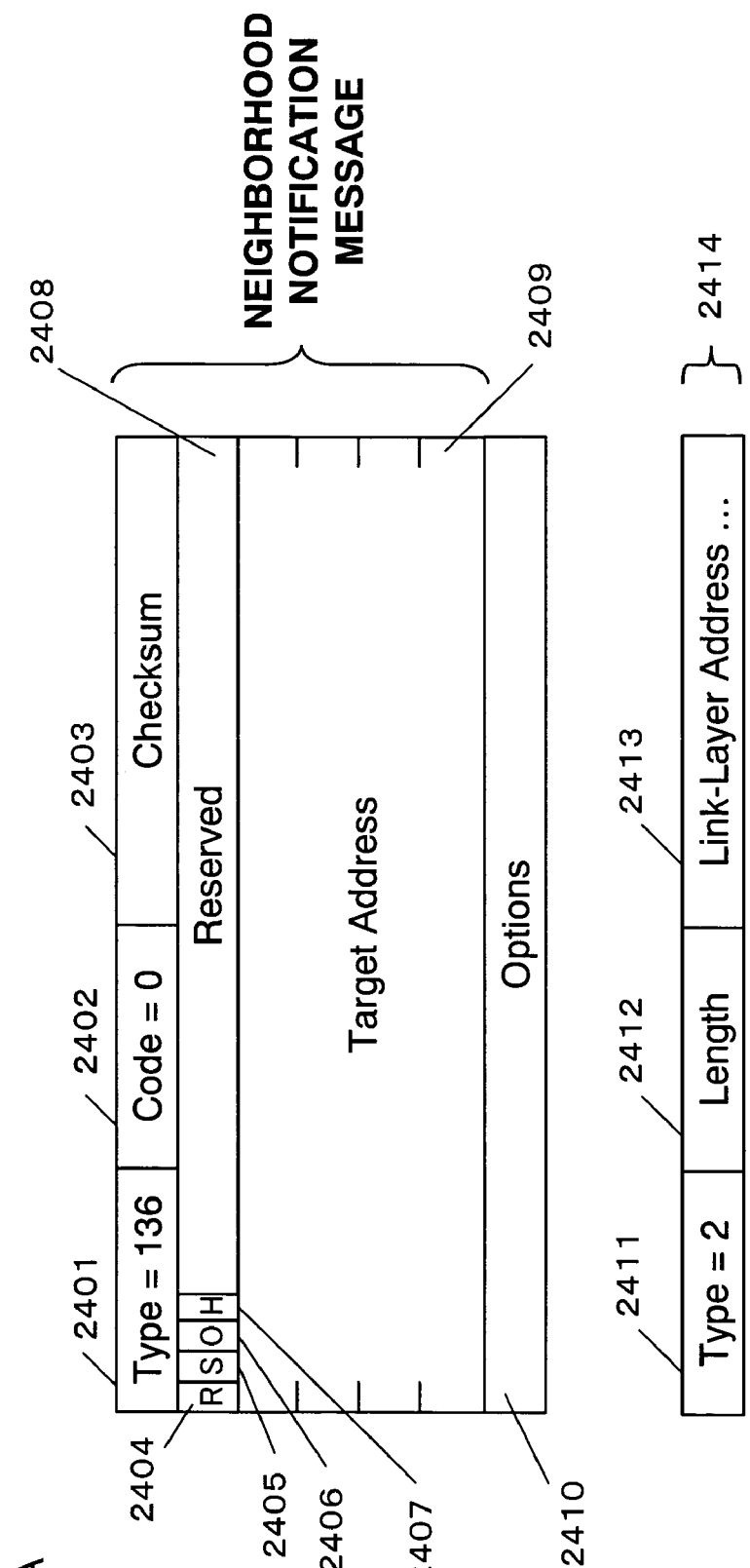
FIGS. 24A, B are the neighbor advertisement message formats which are used in the third exemplary embodiment of the invention.

FIG. 24A shows one example of a format of the neighbor advertisement message which is transmitted by a terminal device (LFN).

In this manner, it is possible to make the most use of one of ICMPv6 (Internet Control Message Protocol for the Ipv6) messages. In FIG. 24A, meaning of each portion is as follows.

Type (8 bit) 2401 is a field which shows an identifier of the ICMPv6 message. A value 136 shows a neighbor advertisement message. Code (8 bit) 2402 shows a field which is used for further breaking up a message. At this moment, it is 0, and it is of such a state that an operation is not generated in particular. CheckSum (16 bit) 2403 shows a code (error detection code) for inspecting rightfulness of the ICMPv6 message. R flag (1 bit) 2404 shows, in case that it is set, that a device which transmits a neighbor advertisement message is a router. S flag (1 bit) 2405 shows, in case that it is set, that this message is a response to a neighbor solicitation message. 0 flag (1 bit) 2406 shows, in case that it is set, that a relevant neighbor cache (NC) should be overwritten. H flag (1 bit) 2407 shows, in case that it is set, that it is connected to a mobile router, and if it is not set, shows that it is connected to a home agent apparatus. Reserved (24 bit) 2408 shows a reservation field, and all is padded with 0. This field is ignored during reception process. Target Address (128 bit) 2409 is an object address, and an Ipv6 address of a terminal device is put therein.

As an option 2410 in the above-described neighbor advertisement message, disposed is an object link layer address option 2414 which is shown in FIG. 24B.

Type (8 bit) 2411 is a field which shows an identifier of an option field of the ICMPv6 message. A value 2 shows an object link layer address option. Length (8 bit) 2412 shows this option length by 8 octet unit. In a MAC address pursuant to IEEE802., it becomes a value 1. Link-Layer Address Length 2413 shows a MAC address.

Further, it is possible to realize such a configuration that the home agent apparatus can discriminate an accommodated terminal device with respect to each mobile router, by adding identifier information (means a home address or a care-of address of a mobile router, an Ipv6 address, etc.) of a mobile router itself.

FIG. 25A shows a format of a neighbor advertisement message which is transmitted by a mobile router.

In FIG. 25A, A flag 2501 is added to the format of the neighbor advertisement message of FIG. 24A. This A flag (1 bit) 2501 shows, in case that it is set, that an accommodating mobile router address option is included. Therefore, the reservation field becomes 67 bit.

As an option in the neighbor advertisement message, an object link layer address option shown in FIG. 25B, and a accomodating MR address option 2502 shown in FIG. 25C are added.

In FIG. 25C, Type (8 bit) 2503 shows a field which shows an identifier of an option field of the ICMPv6 message. A value 6 is an example, and it is all right even if it is another value if it is defined uniquely. Reserved (48 bit) 2505 is a reservation field. It shows that all is padded with 0. This field is ignored during reception process. Length (8 bit) 2504 shows this option length by 8 octet unit. Here, it becomes a value 3. MR Address (128 bit) 2506 shows an Ipv6 address (care-of address) of a mobile router which is connected.

(2) The home agent apparatus transmits a message which requests for an IP address and a link layer address of a terminal device which is accommodated in a mobile router, to the mobile router. And, a mobile router, which received this request message, carries out a neighbor solicitation to a terminal device which is accommodated in itself, and as a result of that, adds neighbor terminal device information collected, and notifies neighbor information to a home agent apparatus. Here, the neighbor information means address information of a mobile router which are connected to an external network and terminal device which is accommodated the mobile router.

FIG. 26 is a sequence diagram which shows a procedure of proxy neighbor discovery at this time.

Firstly, the home agent apparatus request a mobile router which it manages, to carry out neighbor discovery by proxy of the home agent apparatus, by use of a proxy neighbor solicitation message which will be described later (step S2601).

Next, a mobile router, which received the request, requests a terminal device on a foreign link of itself, to carry out a neighbor advertisement (step S2602).

Next, each terminal device LFN1-n on the foreign link carries out neighbor advertisement through the use of a neighbor advertisement message which is normally used in Ipv6 (step S2603).

Next, a mobile router updates the accommodated terminal table by preparing a neighbor cache of a terminal device, in the accommodated terminal table of itself (step S2604).

Next, a mobile router prepares a notification packet by use of a proxy neighbor advertisement message which will be described later (step S2605), and encapsulates it to a tunnel packet, and carries out neighbor advertisement tunnel transfer to the home agent apparatus (step S2606).

Next, the home agent apparatus adds a neighbor cache of a terminal device, to the terminal device management table of the terminal device management section 70, in accordance with the received proxy neighbor advertisement message, and updates the terminal device management table (step S2607).

FIGS. 28A through C shows a format of the proxy neighbor solicitation message. In FIG. 28A, meaning of each information is as follows.

Type (8 bit) 2801 is a field which shows an identifier of an ICMPv6 message. A value '138' of Type shows that it is a proxy neighbor solicitation message. This value '138' is one example, and it is all right even if it is another value, if it is defined uniquely. P flag (1 bit) 2082 shows, in case that it is set, that a neighbor cache option is included. Ho flag (1 bit) 2803 shows, if it is set, that it is a request from a mobile router. In Target Address 2804, shows an address of the other party which should respond to the proxy neighbor solicitation message. That is, in case of a request from a home agent apparatus, it is an address of a mobile router, and in case of a request from a mobile router, it is an address of a home agent apparatus.

As an option 2805 in a proxy neighbor solicitation message, disposed is an entry number option 2806 which is shown in FIG. 28B.

Type (8 bit) 2807 is a field which shows an identifier of an option field of an ICMPv6 message. A value '7' is one example, and it is all right even if it is another value if it is defined uniquely. Length (8 bit) 2808 shows this option length by 8 octet unit. Here, it becomes a value '1'. Reserved (16 bit) 2817 is a reservation field, and all is padded with 0. This field is ignored during reception process. Number of NC entries (32 bit) 2818 shows a number of neighbor cache options which are hereinafter described.

As an option in the proxy neighbor solicitation message, further disposed is a neighbor cache option 2809 which is shown in FIG. 28C.

Type (8 bit) 2810 is a field which shows an identifier of an option field of an ICMPv6 message. A value '8' is an example, and it is all right even if it is another value if it is defined uniquely. Length (8 bit) 2811 shows this option length by 8 octet unit. H flag (1 bit) 2812 shows, in case that it is set, that it is not connected directly to a home link. Reserved (15 bit) 2813 shows a reservation field, and all is padded with 0. This field is ignored during reception process. Address (128 bit) 2814 shows an Ipv6 address of a terminal device which is accommodated in itself. Link-Layer Address Length (8 bit) 2815 shows a Link-Layer address length by octet number. In case of IEEE802, it is a value 6. Link-Layer Address 2816 shows a MAC address. In case that multiple number of 8 octed including Link-Layer Address length is not satisfied, 0 padding is carried out so as to realize multiple number of 8 octet. Meanwhile, this neighbor cache option is disposed only by entry number of a terminal device.

FIGS. 29A through C shows a format of the proxy neighbor advertisement message. In FIG. 29A, meaning of each information is as follows.

Type (8 bit) 2901 is a field which shows an identifier of an ICMPv6 message. It is shown by this value that it is a proxy neighbor advertisement message. A value 139 is one example, and it is all right even if it is another value if it is defined uniquely. R flag (1 bit) 2902 shows, in case that it is set, that a device which is transmitting a proxy neighbor advertise message is a router. S flag (1 bit) 2903 shows, in case that it is set, that this message is a response to a proxy neighbor solicitation message. 0 flag (1 bit) 2904 shows, in case that it is set, that a relevant neighbor cache (NC) should be overwritten. In Target Address 2905, an address of itself to be notified is entered. That is, in case of notification from a mobile router, it is an address of the mobile router, and in case of notification from a home agent apparatus, it is an address of the home agent apparatus.

As an option 2906 in the proxy neighbor advertisement message, disposed is an entry number option 2907 which is shown in FIG. 29B.

Type (8 bit) 2908 is a field which shows an identifier of an option field of an ICMPv6 message. A value 7 is an example, and it is all right even if it is another value if it is defined uniquely. Length (8 bit) 2909 shows this option length by 8 octet unit. Here, it becomes a value 1. Reserved (16 bit) 2910 is a reservation field, and all is padded with 0. This field is ignored during reception process. Number of NC entries (32 bit) 2911 shows the number of neighbor cache options.

As an option in the proxy neighbor advertisement message, further disposed is a neighbor cache option 2912 which is shown in FIG. 29C.

Type (8 bit) 2913 is a field which shows an identifier of an option field of an ICMPv6 message. A value 8 is an example, and it is all right even if it is another value if it is defined uniquely. Length (8 bit) 2914 shows this option length by 8 octet unit. H flag (1 bit) 2915 shows, in case that it is set, that it is not connected directly to a home link. Reserved (15 bit) 2916 is a reservation field, and all is padded with 0. This field is ignored during reception process. Address (128 bit) 2917 shows an Ipv6 address of a terminal device which is accommodated in itself. Link-Layer Address Length (8 bit) 2918 shows a Link-Layer address length by octet number. In case of IEEE802, it is a value 6. Link-Layer Address 2919 shows a MAC address. In case that multiple number of 8 octed including Link-Layer Address length is not satisfied, 0 padding is carried out so as to realize multiple number of 8 octet. Meanwhile, this neighbor cache option is disposed only by entry number of a terminal device.

(3) A mobile router transmits a message which requests for neighbor information which is owned by a home agent apparatus, to the home agent apparatus. And, the home agent apparatus, which received this request message, carries out a neighbor soliciation to a terminal device which is connected onto a home link, and adds neighbor terminal device information collected, and notifies it to a mobile router.

FIG. 27 is a sequence diagram which shows a procedure of proxy neighbor discovery at this time.

Firstly, a mobile router transmits the proxy neighbor solicitation message which was explained in FIG. 28A, to carry out neighbor discovery by proxy of the mobile router, to a home agent apparatus. (step S2701).

Next, the home agent apparatus, which received the request, carries out a neighbor solicitation to a terminal device on a home link of itself, so as to carry out a neighbor advertisement (step S2702).

Next, each terminal device LFN1-n on the home link carries out neighbor advertisement through the use of a neighbor advertisement message which is normally used in Ipv6 (step S2703).

Next, the home agent apparatus prepares a neighbor cache of a terminal device, in the terminal device management table of the terminal device management section 70 of itself (step s2704), and updates the terminal device management table of the terminal device management section 70. Next, the home agent apparatus prepares a notification packet by use of the proxy neighbor advertisement message which was explained in FIG. 29A (step S2705), and encapsulates it to a tunnel packet, and carries out neighbor advertisement tunnel transfer to a mobile router (step S2706).

Next, the mobile router adds a neighbor cache of a terminal device, to the terminal device management table of the terminal device management section 70, in accordance with the received proxy neighbor advertisement message, and updates the terminal device management table (step S2707).

In this case, in the proxy neighbor solicitation message in FIG. 28A, an address of a home agent apparatus is entered in Target Address. In addition, in the proxy neighbor advertisement message in FIG. 29A, an address of a home agent apparatus is entered in Target Address.

(4) The home agent apparatus transmits a message which requests for an IP address and a link layer address of a terminal device which is accommodated in a mobile router, to the mobile router. And, the mobile router, which received this request message, adds neighbor terminal device information which is owned by itself, and notifies neighbor information to the home agent apparatus. By this, a mobile router does not carry out a neighbor soliciation to a terminal device, so that a response is quicken up.

(5) A mobile router transmits a message which request for neighbor information which is owned by the home agent apparatus, to the home agent apparatus. And, the home agent apparatus, which received this request message, adds neighbor information which is owned by itself, and notifies it to a mobile router. By this, the home agent apparatus does not carry out a neighbor soliciation, so that a response is quicken up.

Further, the mobile router adds neighbor information which is owned by itself, to a message which requests for neighbor information. By this, it is possible to simultaneously update neighbor information of the other party.

Meanwhile, as location management of a terminal device, in case of transferring a neighbor advertisement message of a terminal device which is accommodated by a mobile router to a home link, a flag of a connection identifier, which shows Away from Home, i.e., shows that a terminal device exists on the foreign link 5, is added in a packet. In addition, A flag, which shows that accommodating mobile router information is included, is further disposed, and in an option field, an identifier of a mobile router is stored. In addition, proxy neighbor discovery processing is defined between a home agent apparatus and a mobile router. That is, a home link search soliciatation/advertisement message, and a foreign link search solicitation/advertisement message are defined, and a location of a terminal is managed.

In addition, as a rule in search, a home agent apparatus is basically designed to respond only to a home link search request from a mobile router with binding. Therefore, after a mobile router advertised itself to a home link, a home link search solicitation from a mobile router becomes possible.

In addition, a mobile router basically responds only to a home link search solicitation from a home agent apparatus. Therefore, a mobile router, which received a proxy neighbor solicitation message from a rightful home agent apparatus, carries out neighbor discovery of a foreign link according to need, and transmits a proxy neighbor advertisement message in which information of neighbor caches owned by itself was collected up, to the home agent apparatus. In addition, the home agent apparatus, which received a proxy neighbor solicitation message from a rightful mobile router, carries out neighbor discovery of a home link according need, and transmits a proxy neighbor advertisement message in which information of neighbor caches owned by itself was collected up, to a mobile router.

Further, it is possible to store neighbor cache information of itself as an option, in the proxy neighbor solicitation message.

In addition, as described in FIG. 27, in case that a mobile router collects neighbor information of a home agent apparatus and neighbor terminal information, it is realized that the mobile router can manage addresses regarding other mobile routers, and addresses of accommodated terminal devices, and therefore, it becomes possible to carry out tunnel transfer from a certain mobile router to another mobile router, without passing through a home agent apparatus. In this case, it becomes possible to configure by reading a mobile router as a home agent apparatus. In this regard, however, it is preferable to design in such a manner that direct tunnel transfer, which is carried out without passing through a home agent apparatus, is not carried out, until a mobile router obtains neighbor information and neighbor terminal information from a home agent apparatus.

In addition, as a method for speeding up management of a terminal device due to neighbor discovery, on the occasion that the mobile router 15a received a packet which was transmitted by a terminal device on the foreign link 5, a transmission source of that packet is confirmed, and it is investigated by the accommodated terminal management section 89 whether it is a terminal which has been already managed or not. And, in case that it is a new terminal device, the mobile router 15a carries out neighbor advertisement as in this embodiment, to the home agent apparatus 10a, or carries out additional notification of the new terminal device. By this, it is all right even if the home agent apparatus 10a is designed to update the terminal management table of the terminal device management section 70.

As above, according to the invention, when a terminal device moved on a foreign link, it becomes possible for the terminal device to make transmission to an equipment on a home link, even if registration in a mobile router is not carried out. Further, by carrying out neighbor discovery which relates to the invention, a mobile router can automatically recognize a terminal device which is accommodated. In addition, a mobile router carries out movement registration of itself, to a home agent apparatus, and thereby, without generating a TCP connection, it becomes possible to generate a tunnel packet and transfer a local scope packet.

What is claimed is:

1. A home agent apparatus adapted for communicating with a plurality of mobile routers that are on an external network and for communicating with a home link on a home network of the home agent apparatus, each of the plurality of mobile routers accommodating communication between the home link and a terminal device on the external network, the home agent apparatus comprising:
  an interface connected to the plurality of mobile routers and the home link;
  a mobile router movement management section managing locations of the plurality of mobile routers that are connected to the external network and remote from the home network using a mobile router movement management table;
  an IP processing section determining a destination of a tunnel packet received from the plurality of mobile routers and outputting the tunnel packet to a tunnel packet processing section, responsive to a destination of the tunnel packet being a local scope;
  the tunnel packet processing section uncapsulating the tunnel packet and sending out the uncapsulated packet to the home link from the interface;
  a local packet reception processing section receiving a non-tunnel packet from the home link by the interface, determining a destination of the non-tunnel packet, and outputting the non-tunnel packet to a local packet transfer processing section, responsive to the destination being the local scope and having a destination other than the home agent apparatus itself; and
  the local packet transfer processing section which encapsulates the non-tunnel packet and transmits the encapsulated tunnel packet to all the mobile routers in the mobile router movement management table, regardless of the destination of the non-tunnel packet.

2. The home agent apparatus as set forth in claim 1, wherein the local packet transfer processing section encapsulates the uncapsulated packet to generate the encapsulated tunnel packet addressed to a mobile router other than a transmission source mobile router of the packet, which is managed by the mobile router movement management section, and then, transmits the encapsulated tunnel packet to all the mobile routers in the mobile router movement management table.

3. A mobile router of a plurality of mobile routers that are on an external network, the mobile router having a first interface for accommodating at least one terminal device, and a second interface for connecting with an Internet, and carrying out communication over the Internet, or between access networks for connecting with the Internet, comprising:
  a packet inspection section judging, from which of the first and second interfaces either a tunnel packet or a non-tunnel packet is received;
  a tunnel packet processing section receiving by way of the second interface the tunnel packet from a home agent apparatus having a mobile router movement management table for managing locations of the plurality of the mobile routers that are connected to the external network, the tunnel packet having been transmitted to all of the mobile routers in the mobile router movement management table, regardless of a destination of the non-tunnel packet, the tunnel packet processing section uncapsulating the tunnel packet which is received from the second interface, and transmitting the uncapsulated tunnel packet to the at least one terminal device responsive to a destination of the tunnel packet being of a local scope; and
  a local packet reception processing section receiving a non-tunnel packet from the at least one terminal device, determining a destination of the non-tunnel packet, and outputting the non-tunnel packet, responsive to the destination being the local scope and having a destination other than the mobile router itself; and
  a local packet transfer processing section encapsulating the received non-tunnel packet from the at least one terminal device to generate a tunnel packet, and then, transmitting the encapsulated tunnel packet to a home agent apparatus in which a home address of the mobile router is registered responsive to: (1) a transmission source of the received non-tunnel packet being the at least one terminal device; (2) the received non-tunnel packet being received via the first interface; (3) the destination of the received non-tunnel packet being of the local scope; and (4) the mobile router itself not being connected to a home link.

4. The mobile router as set forth in claim 3 further comprising:
  a unit adapted to manage whether the terminal device is accommodated in the mobile router itself or in the home link; and
  another unit adapted to generate and transmit the tunnel packet to the home agent apparatus in which the mobile router itself registers the home address, only responsive to the terminal device becoming a destination of the tunnel packet addressed to the local scope and the terminal device being connected to the home link.

5. The mobile router as set forth in claim 3 further comprising an accommodated terminal management section managing the terminal device which is accommodated in the mobile router itself,
  wherein, responsive to: (1) the destination of a packet that is received from the terminal device being of the local scope; (2) the terminal device being included in the destination; and (3) the terminal device, which is being managed, not being accommodated in the mobile router itself, said local packet transfer processing section encapsulates the received packet to generate an encapsulated tunnel packet addressed to a home agent device in which the home address of the mobile router itself is registered, and transmits the encapsulated tunnel packet.

6. The mobile router as set forth in claim 3 further comprising an accommodated terminal management section managing the terminal device which is accommodated in the mobile router itself, wherein, responsive to the destination of an uncapsulated packet being of the local scope and including the terminal device that is being accommodated, the tunnel packet processing section transmits the uncapsulated packet to the terminal device which is accommodated.

7. A communication system, comprising:
  a gateway device for connecting an Internet and a home network;
  at least one access router for connecting the Internet and an external network;

a home agent apparatus;

a plurality of mobile routers that are on the external network, each including:

a first interface for accommodating at least one terminal device, a second interface for connecting with the Internet, and carrying out communication over the Internet, or between access networks for connecting with the Internet, a packet inspection section judging from which of the first and second interfaces a packet is received, a tunnel packet processing section uncapsulating a tunnel packet which is received from the second interface, and transmitting the uncapsulated tunnel packet to the terminal device that is accommodated, responsive to a destination of the tunnel packet being a local scope, a local packet reception processing section receiving a non-tunnel packet from the terminal device, determining a destination of the non-tunnel packet, and outputting the non-tunnel packet, responsive to the destination being the local scope and having a destination other than the mobile router itself, and a local packet transfer processing section encapsulating the non-tunnel packet to generate an encapsulated tunnel packet, and then transmitting the encapsulated tunnel packet to the home agent apparatus in which a home address of the mobile router itself is registered, responsive to: (1) the received packet being received from the first interface; (2) the received packet having a transmission source that is the terminal device which is accommodated; (3) a destination of the non-tunnel packet being the local scope; and (4) the mobile router itself is not being connected to a home link, wherein:

the home agent apparatus includes:

a mobile router movement management part managing locations of the plurality of mobile router that are connected to the external network and remote from the home network using mobile router movement management table, a tunnel packet processing part uncapsulating the tunnel packet received, and sending out the uncapsulated packet to the home link, and a local packet transfer processing part encapsulating a non-tunnel packet to generate an encapsulated tunnel packet addressed to the mobile router and then, transmitting the encapsulated tunnel packet to all mobile routers in the mobile router movement management table, responsive to: (1) a destination of the non-tunnel packet received by an interface connected to the home link being of the local scope; and (2) the destination of the non-tunnel packet being other than that of the home agent apparatus itself.

8. A communication method between either a terminal device or a home agent apparatus on a home network and either another terminal device or a plurality of mobile routers on an external network comprising:

a step in which a home agent apparatus encapsulates a packet addressed to a local scope which is generated on the home network, to generate a tunnel packet addressed to one of the mobile routers on the external network, and then, transmits the tunnel packet to all mobile routers in a mobile route movement management table, regardless of a destination of the packet; and a step in which at least one of the mobile routers uncapsulates the tunnel packet received, and transmits the uncapsulated packet addressed to the local scope to the other terminal device on the external network.

9. A communication method between either a terminal device or a home agent apparatus on a home network and either another terminal device or a plurality of mobile routers on an external network comprising:

a step in which the home agent apparatus responsive to a destination of an uncapsulated packet being of a local scope generated on the home network and including any terminal device connected to the external network or any mobile router, encapsulates the packet to generate a tunnel packet addressed to one of the mobile routers, and then, transmits the tunnel packet to all mobile routers in a mobile route movement management table, regardless of a destination of the uncapsulated packet; and a step in which at least one of the mobile routers uncapsulates the tunnel packet received, and transmits the packet to the other terminal device on the external network, responsive to a destination of the uncapsulated packet being the other terminal device.

10. A communication method between either a terminal device or a home agent apparatus on a home network and either another terminal device or a plurality of mobile routers on an external network comprising:

a step in which the home agent apparatus encapsulates a local scope packet to generate a tunnel packet addressed to one of the mobile routers in which the other terminal device that is accommodated is a destination of the local scope packet or to the one of the mobile routers that is the destination, and transmits the tunnel packet to all of the mobile routers in a mobile route movement management table, regardless of a destination of the local scope packet, responsive to a destination of the local scope packet generated on the home network including the terminal device or the one of the mobile routers connected to the external network; and a step in which at least one of the mobile routers transmits a packet to the other terminal device on the external network, responsive to the tunnel packet received being uncapsulated, and a destination of the uncapsulated packet being the other terminal device.

11. A communication method between either a terminal device or a home agent apparatus on a home network and either another terminal device or a plurality of mobile routers on an external network, comprising:

a step in which the home agent apparatus encapsulates a local scope packet to generate a tunnel packet addressed to one of the mobile routers in which the other terminal device that is accommodated is a destination of the local scope packet or to the one of the mobile routers that is the destination of the local scope packet, and transmits the tunnel packet to all of the mobile routers in a mobile route movement management table, regardless of a destination of the local scope packet, responsive to a destination of the local scope packet generated on the home network including the terminal device or the one of the mobile routers connected to the external network;

a step in which at least one of the mobile routers transmits a packet to the other terminal device on the external network, responsive to the tunnel packet received being uncapsulated, and a destination of the uncapsulated packet being the other terminal device;

a step in which the mobile router encapsulates a packet addressed to the local scope which is generated on the external network, and then, transmits the encapsulated tunnel packet to the home agent apparatus; and a step in which the home agent apparatus uncapsulates the encapsulated tunnel packet received, and transmits the uncapsulated packet addressed to the local scope to the terminal device on the home network.

12. A communication method between either a terminal device or a home agent apparatus on a home network and either another terminal device or a plurality of mobile routers on an external network, comprising:
a step in which the home agent apparatus encapsulates a local scope packet to generate a tunnel packet addressed to one of the mobile routers in which the other terminal device that is accommodated is a destination of the local scope packet or to the one of the mobile routers that is the destination of the local scope packet, and transmits the tunnel packet to all of the mobile routers in a mobile route movement management table, regardless of a destination of the local scope packet, responsive to a destination of the local scope packet generated on the home network including the terminal device or the one of the mobile routers connected to the external network;
a step in which at least one of the mobile routers transmits a packet to the other terminal device on the external network, responsive to the tunnel packet received being uncapsulated, and a destination of the uncapsulated packet being the other terminal device;
a step in which the mobile router encapsulates a packet addressed to the local scope to generate a tunnel packet addressed to the home agent apparatus, and then, transmits the tunnel packet, responsive to the packet addressed to the local scope being generated on the external network and including a destination other than the other terminal device on the external network; and
a step in which the home agent apparatus uncapsulates the received tunnel packet, and transmits the uncapsulated packet addressed to the local scope to the terminal device on the home network.

13. A communication method between either a terminal device or a home agent apparatus on a home network and either another terminal device or a plurality of mobile routers on a plurality of external networks, comprising:
a step in which a mobile router encapsulates a tunnel packet addressed to a local scope which is generated on one of the external networks to generate a tunnel packet addressed to the home agent apparatus, and then, transmits the encapsulated tunnel packet; and
a step in which the home agent apparatus uncapsulates the received encapsulated tunnel packet, and transmits the uncapsulated packet addressed to the local scope to the terminal device on the home network, and further, encapsulates the uncapsulated packet addressed to the local scope, to generate another tunnel packet addressed to one of the mobile routers other than a transmission source mobile router of the received tunnel packet, and then, transmits the other tunnel packet to all of the mobile routers in a mobile route movement management table, regardless of a destination of the uncapsulated packet.

14. A communication method between either a terminal device or a home agent apparatus on a home network and either another terminal device or a plurality of mobile routers on an external network, comprising:
a step in which the home agent apparatus encapsulates a packet to generate a tunnel packet addressed to one of the mobile routers in which the other terminal device that is accommodated is a destination of the packet or to the one of the mobile routers that is the destination of the packet, and transmits the tunnel packet to all of the mobile routers in a mobile route movement management table, regardless of a destination of the packet, responsive to a destination of the packet generated on the home network including the terminal device or the one of the mobile routers connected to the external network;
a step in which at least one of the mobile routers transmits a packet to the other terminal device on the external network, responsive to the tunnel packet received being uncapsulated, and a destination of the uncapsulated packet being the other terminal device;
a step in which a mobile router generates a tunnel packet and transmits the tunnel packet to the home agent apparatus, responsive to a destination of a packet being addressed to a local scope which is generated on the external network including the terminal device or the home agent apparatus which is connected on the home network; and
a step in which the home agent apparatus uncapsulates a tunnel packet, and transmits the uncapsulated packet to the terminal device on the home network, responsive to a destination of the uncapsulated packet addressed to the local scope being the terminal device.

15. A communication method between either a terminal device or a home agent apparatus on a home network and either another terminal device or a plurality of mobile routers on an external network, comprising:
a step in which one of the mobile routers encapsulates a local scope packet to generate a tunnel packet addressed to the home agent apparatus, and transmits the tunnel packet to the home agent apparatus, responsive to a destination of the local scope packet generated on the external network including a terminal device which is not accommodated in the one mobile router itself; and
a step in which the home agent apparatus: (1) uncapsulates the received tunnel packet; (2) transmits the uncapsulated packet to the terminal on the home network, responsive to a destination of the uncapsulated packet being addressed to the local scope and including the terminal device connected on the home network; and (3) encapsulates the uncapsulated tunnel packet addressed to a second one of the mobile routers which is different from a transmission source, and then, transmits the encapsulated tunnel packet, responsive to the destination including the second one of mobile routers which is different from the transmission source of the tunnel packet or the terminal device accommodated in the mobile router, to all of the mobile routers in a mobile route movement management table, regardless of a destination of the uncapsulated tunnel packet.

16. The home agent apparatus as set forth in claim 1, wherein when the local scope includes a plurality of external networks, the local packet transfer processing section encapsulates the non-tunnel packet to generate a plurality of encapsulated tunnel packets, and transmits first and second ones of the encapsulated tunnel packets to first and second mobile routers on the plurality of external networks.

* * * * *